(12) United States Patent
Ebert et al.

(10) Patent No.: US 7,667,604 B2
(45) Date of Patent: Feb. 23, 2010

(54) CONTEXT-AWARE AND REAL-TIME ITEM TRACKING SYSTEM ARCHITECTURE AND SCENARIOS

(75) Inventors: Peter S. Ebert, Menlo Park, CA (US); Richard J. Swan, Portola Valley, CA (US); Tao Lin, Palo Alto, CA (US); Jie Weng, Sunnyvale, CA (US); Hartmut K. Vogler, Foster City, CA (US); Brian S. Mo, Palo Alto, CA (US); Stephan Haller, Karlsruhe (DE)

(73) Assignee: SAP AG (DE)

( * ) Notice: Subject to any disclaimer, the term of this patent is extended or adjusted under 35 U.S.C. 154(b) by 0 days.

(21) Appl. No.: 12/208,124

(22) Filed: Sep. 10, 2008

(65) Prior Publication Data

US 2009/0008450 A1   Jan. 8, 2009

Related U.S. Application Data

(63) Continuation of application No. 10/340,208, filed on Jan. 10, 2003, and a continuation-in-part of application No. 10/285,381, filed on Oct. 30, 2002, now Pat. No. 6,843,415, and a continuation-in-part of application No. 10/255,115, filed on Sep. 24, 2002, now abandoned, and a continuation-in-part of application No. 10/232,764, filed on Aug. 30, 2002, now Pat. No. 6,901,304, and a continuation-in-part of application No. 10/210,859, filed on Jul. 31, 2002, now Pat. No. 7,290,708, and a continuation-in-part of application No. 10/136,852, filed on Apr. 30, 2002, now Pat. No. 7,233,958, which is a continuation-in-part of application No. 10/137,207, filed on Apr. 30, 2002, now Pat. No. 7,151,453.

(60) Provisional application No. 60/347,672, filed on Jan. 11, 2002, provisional application No. 60/353,198, filed on Feb. 1, 2002, provisional application No. 60/353,439, filed on Feb. 1, 2002.

(51) Int. Cl.
G08B 13/14 (2006.01)
(52) U.S. Cl. .................. 340/572.4; 340/572.1; 340/10.4
(58) Field of Classification Search ............. 340/572.1, 340/572.4, 573.1, 568.1, 539.1, 505, 10.1, 340/10.3, 10.4; 235/438, 539; 342/44, 51; 707/201; 700/17, 83
See application file for complete search history.

(56) References Cited

U.S. PATENT DOCUMENTS 4,974,166 A  11/1990  Maney et al.

(Continued)

FOREIGN PATENT DOCUMENTS

CN  1251675  4/2000

(Continued)

OTHER PUBLICATIONS

Auto-ID Center, Technical Manual, "The Object Name Service", Version 0.5 (Beta), Oat Systems & MIT Auto-ID Center, Feb. 1, 2002.

(Continued)

Primary Examiner—Van T. Trieu
(74) Attorney, Agent, or Firm—Fish & Richardson P.C.

(57) ABSTRACT

Methods and apparatus, including computer program products, for real-time and context-aware tracking of items. Tags bound to items are read and information read from the tags and location information about the tags is provided by at least two enterprises and used to maintain disposition information about the items, which is made visible to enterprises in the supply chain. The disposition information can be mapped to a world model that tracks the items and circumstances affecting the items, for example, geo-spatial events and traffic delays. Visibility of the disposition information can be controlled through authorization. Visible information can include relationships between particular items and business documents such as order and shipping documents.

20 Claims, 43 Drawing Sheets

U.S. PATENT DOCUMENTS

| | | | |
|---|---|---|---|
| 5,144,314 A * | 9/1992 | Malmberg et al. | 342/44 |
| 5,166,884 A | 11/1992 | Maney et al. | |
| 5,425,032 A * | 6/1995 | Shloss et al. | 370/346 |
| 5,469,363 A | 11/1995 | Saliga | |
| 5,661,517 A * | 8/1997 | Budow et al. | 725/60 |
| 5,936,527 A | 8/1999 | Isaacman et al. | |
| 5,963,134 A | 10/1999 | Bowers et al. | |
| 5,971,592 A | 10/1999 | Kralj et al. | |
| 6,021,443 A | 2/2000 | Bracho et al. | |
| 6,032,127 A | 2/2000 | Schkolnick et al. | |
| 6,067,477 A * | 5/2000 | Wewalaarachchi et al. | 700/83 |
| 6,094,618 A | 7/2000 | Harada | |
| 6,148,291 A | 11/2000 | Radican | |
| 6,177,860 B1 | 1/2001 | Cromer et al. | |
| 6,195,006 B1 | 2/2001 | Bowers et al. | |
| 6,225,901 B1 | 5/2001 | Kail, IV | |
| 6,259,367 B1 | 7/2001 | Klein | |
| 6,292,894 B1 | 9/2001 | Chipman et al. | |
| 6,301,621 B1 | 10/2001 | Haverstock et al. | |
| 6,321,230 B1 | 11/2001 | Joslin et al. | |
| RE37,635 E | 4/2002 | Clark et al. | |
| 6,477,434 B1 * | 11/2002 | Wewalaarachchi et al. | 700/83 |
| 6,671,698 B2 | 12/2003 | Pickett et al. | |
| 6,684,119 B2 | 1/2004 | Burnard et al. | |
| 6,757,696 B2 * | 6/2004 | Multer et al. | 707/201 |
| 7,007,041 B2 * | 2/2006 | Multer et al. | 707/201 |
| 2001/0000019 A1 | 3/2001 | Bowers et al. | |
| 2002/0041712 A1 | 4/2002 | Roustaei et al. | |
| 2005/0257748 A1 | 11/2005 | Kriesel et al. | |
| 2006/0043186 A1 | 3/2006 | Nadabar | |
| 2006/0108422 A1 | 5/2006 | Melick et al. | |
| 2007/0136152 A1 | 6/2007 | Dunsker et al. | |

FOREIGN PATENT DOCUMENTS

| | | |
|---|---|---|
| CN | 1279638 | 1/2001 |
| DE | 4341880 | 6/1995 |
| DE | 19623893 | 12/1997 |
| DE | 19805465 | 8/1999 |
| DE | 19844631 | 4/2000 |
| DE | 19951060 | 5/2000 |
| DE | 19955120 | 5/2001 |
| DE | 10126527 | 12/2002 |
| EP | 0748080 | 12/1996 |
| EP | 0908643 | 4/1999 |
| EP | 0913758 | 5/1999 |
| EP | 1174807 | 1/2002 |
| GB | 2308947 | 7/1997 |
| WO | 00/26111 | 5/2000 |
| WO | 00/45324 | 8/2000 |
| WO | 02/19046 | 3/2002 |
| WO | 02/47014 | 6/2002 |

OTHER PUBLICATIONS

Auto-ID Center Website—Technology Section, *Introduction to Auto-ID*, http://www.autoidcenter.org/technology, Jan. 7, 2002.

David L. Brock, MIT Auto-ID Center, MIT-AUTOID-WH-002, "The Electronic Product Code", Jan. 2001.

David L. Brock, *The Physical Markup Language*, MIT Auto-ID Center, Feb. 2001.

Checkpoint Systems Inc., *Electronic Signatures technologies support supply chain logistics*, Retail News vol. 2, 2001.

George Cole, *The little label with an explosion of applications*, Financial Times- FT.com, http://news.ft.com/ft/gx.cgi/ftc?pagename=View&c=Article&cid=FT30414MGWC, Jan. 14, 2002.

EAN International, Uniform Code Council, Inc., *EAN.UCC White Paper on Radio Frequency Identification*, Nov. 1999.

Mary Ann Falkman editor, *RFID smart labels track chilled foods door to door*, Packeting Digest, Nov. 2000.

"FedEx and Technology—Maintaining a Competitive Edge," Gale Group Newsletter, Dec. 9, 1996, pp. 1-3.

Elgar Fleisch et al., *From computing visions to show cases*, M-Lab, First M-Lab Steering Committee Meeting, Nov. 22-23, 2001, Zurich.

Hoffman, Kurt C., "Real-time Location Systems Take Asset Tracking to New Level," http://www.supplychainbrain.com/archives/10.01, Oct. 2001, 5 pgs., XP002259982.

Infineon press release, *Infineon enters fast growing "smart label" market with my-d, defines new paradigm for cost effective radio frequency identification solutions*, Sep. 11, 2001.

Jakobs et al., "Next generation tracking & tracing—A new integrated approach," *IEEE Intelligent Transportation Systems Conference Proceedings*, Oakland, CA, 2001, pps. 603-607.

Sylvia Tiisetso Khabele, *RFID Security, CSC400W: Network and Internetwork Security*, skhabele@cs.uct.ac.za, May 18, 2001.

KnowNow Product Brief: "KnowNow Architecture Overview", 2002.

"KnowNow Unveils 'n-way' EAI over the Internet," SEARCHWEBSERVICES, Jun. 28, 2001, 2 pgs., XP002259981.

Margulius, David L., "Dawn of Real-time enterprise," Infoworld, http://www.infoworld.com/article/02/01/17/020121 fetca_1.html, Jan. 17, 2002, 2 pgs.,.

Masunaga and Ukai, "Toward a 3D moving object data model—A preliminary consideration," *International Symposium on Database Applications in Non-Traditional Environments*, 1999, pp. 302-312.

M-Lab - A Joint Initiative of ETH Zurich and HSG, *The Mobile and Ubiquitous Computing Lab—Project Plan*, www.m-lab.ch, English version 1.02e, St. Gallen/Zurich, Jun. 21, 2001.

Rachel Melcer, *P&G's Vision*, Business Courier, May 18, 2001.

MIT Auto-ID Center, MIT-AUTOID-WH-001, "The Networked Physical World", MIT Auto-ID Center, Dec. 2000.

Charles J. Murray, *Motorola cuts bar code replacement effort*, EE Times, Nov. 16, 2001.

Nakamura and Dekihara, "An efficient management method of moving spatial objects," *IEEE Pacific Rim Conference on Communications, Computers and Signal Processing*, 1999, pp. 55-58.

Raghu das et al., *The Internet of Things*, IDTechEx Ltd., http://www.idtechex.com/book9.html, 2001.

Cheryl Rosen, *RFID Chips Put To The Test*, Informationweek.com, http://www.Informationweek.com/story/IWK20010628S0008, Jul. 2, 2001.

SAMSys, Inc. press release, *International Paper selects SAMSys Technologies as primary RFID reader supplier*, Jan. 5, 2001.

Sanjay Sarma, *Auto-ID Center: Lessons Learned*, Auto-ID Center- MIT, Nov. 23, 2001.

Sanjay Sarma et al., *White Paper- The Networked Physical World*, MIT Auto-ID Center, Oct. 1, 2000.

Savi Technology Inc. Press Release, *CHEP to deploy Savi Technology's Asset Management Software*, Nov. 6, 2001.

Segall et al., "Content Based Routing with Elvin4" Jun. 2000.

Kevin R. Sharp, Senior Technical Editor, IDSystems.com, *Planning for RFID Ubiquity*, http://www.idsystems.com/reader/2000_07/plan0700.htm, Jul. 2000.

John Stermer, *Radio Frequency ID: A New Era for Marketers?*, Consumer Insight, Winter 2001.

Tryfona and Hadzilacos, "Logical data modeling of spatiotemporal applications: Definitions and a model," *International Database Engineering and Application Symposium*, 1998, pp. 14-23.

Wang et al., "A GIS Based Information Integration Framework for Dynamic Vehicle Routing and Scheduling," *Proceedings of the IEEE International Vehicle Electronics Conference*, Changchun, China, Sep. 6, 1999, pp. 474-479.

Fan Weihu and Xin Hua, "Elementary Explorations on the Logistics Information System," Software World Monthly, $8^{th}$ edition of 2001, p. 96 (non-English language).

White Paper, SAP® Consumer Products, From Demand Planning to Vendor Managed Inventory with SAP APO. "DRP and VMI for the Consumer Products Industry", 1999.

Jay Wrolstad, *American Airlines Deploys Wireless System to Monitor Cargo*, CRNDaily.com, Oct. 12, 2001.

Jay Wrolstad, *Wireless tags help grocers deliver fresh food*, CRMDaily.com, Oct. 2, 2001.

* cited by examiner

FIG._ 3

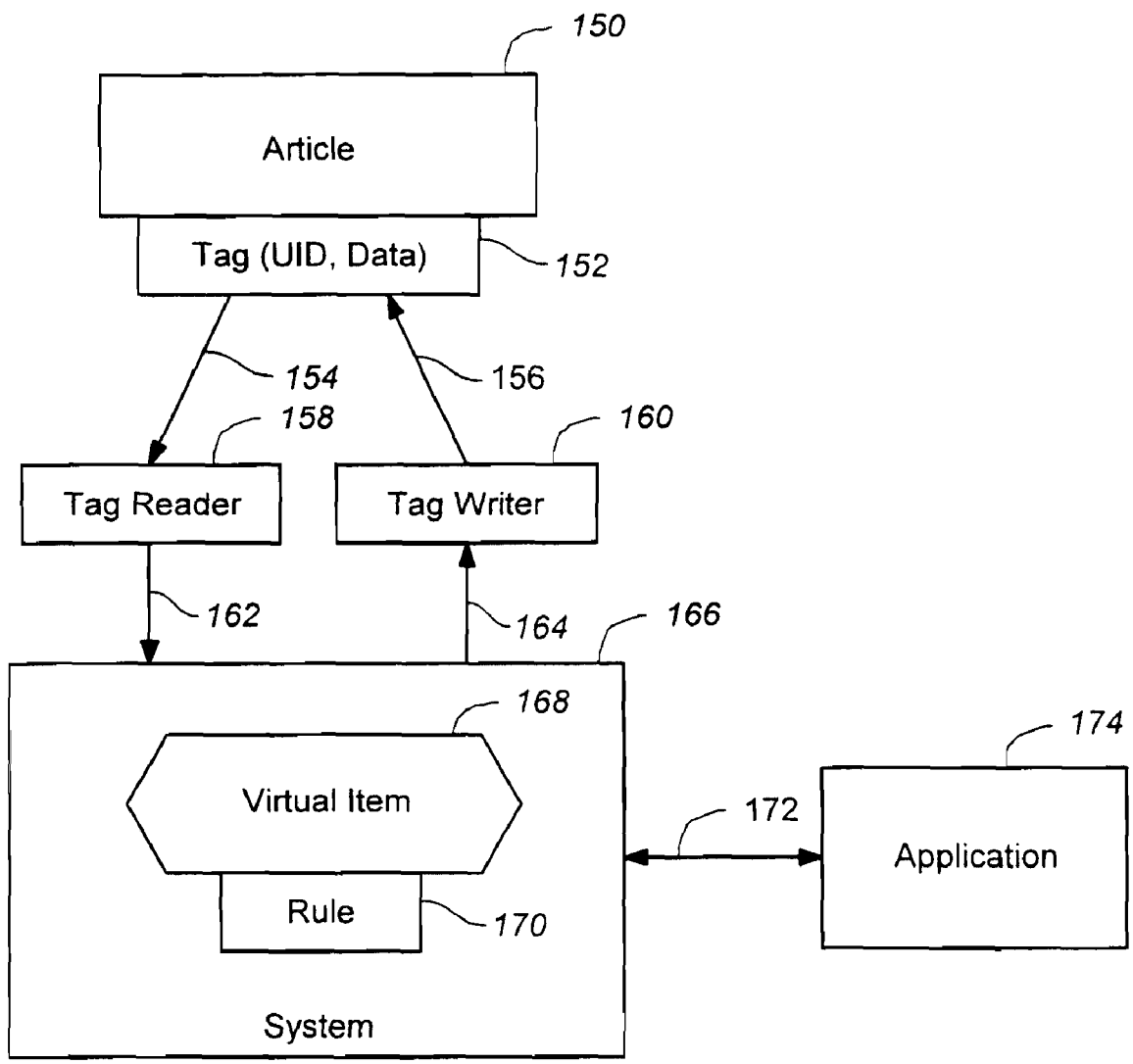
FIG._10

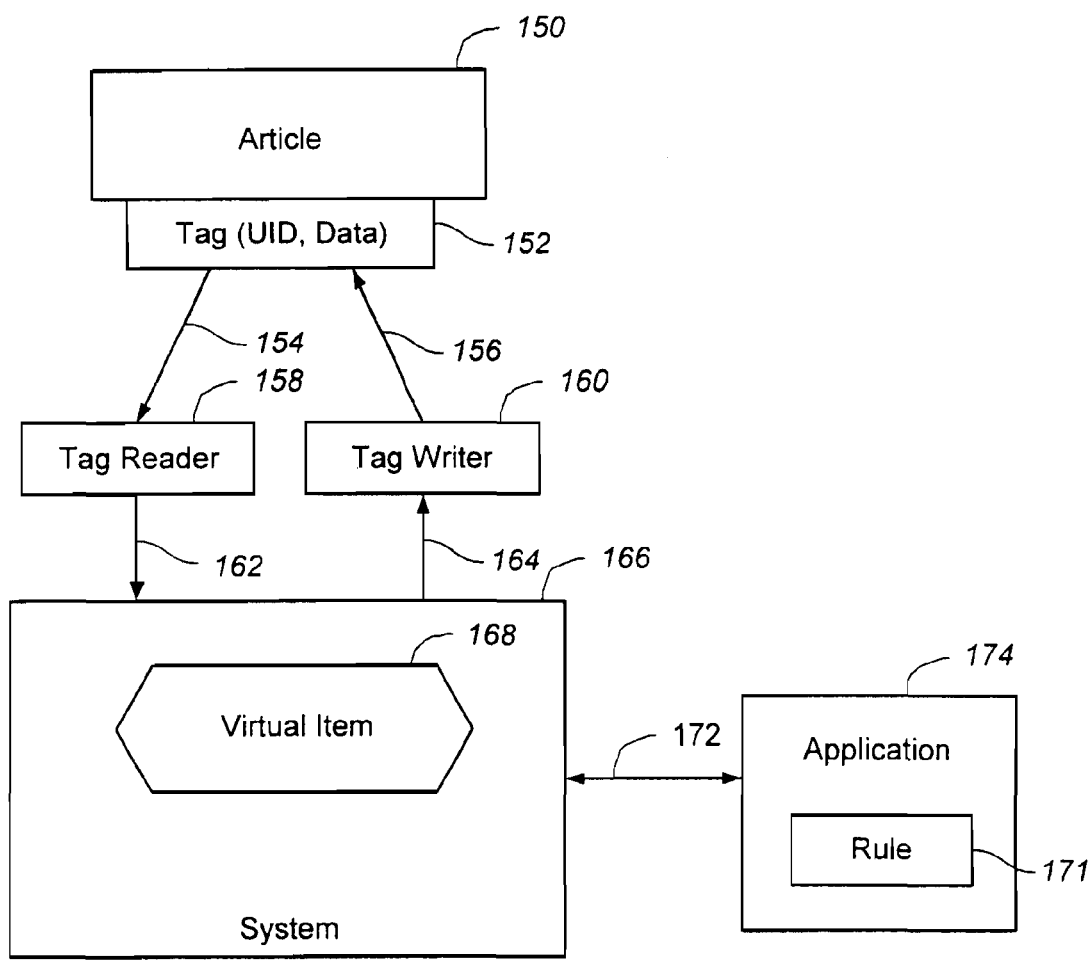
FIG._11

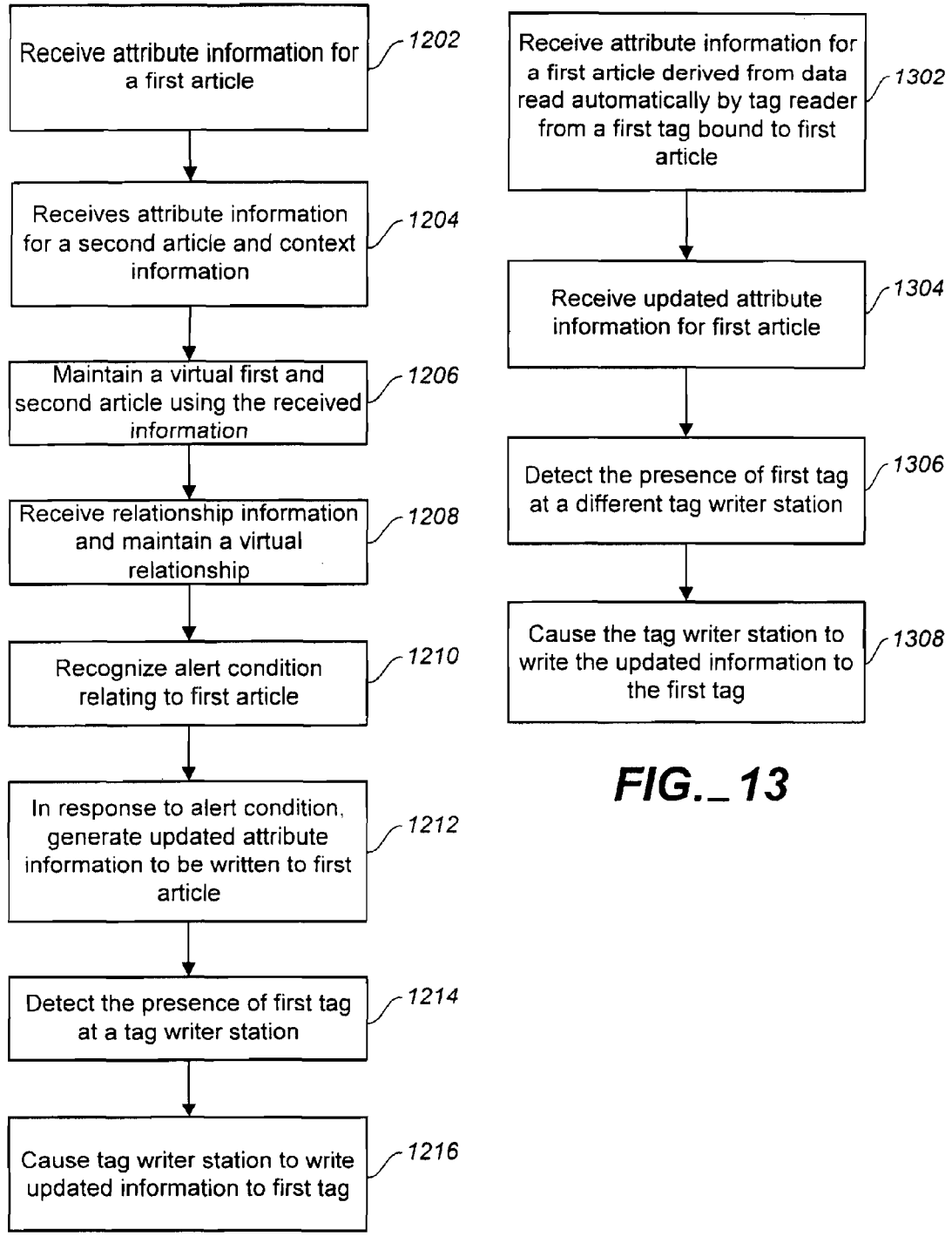

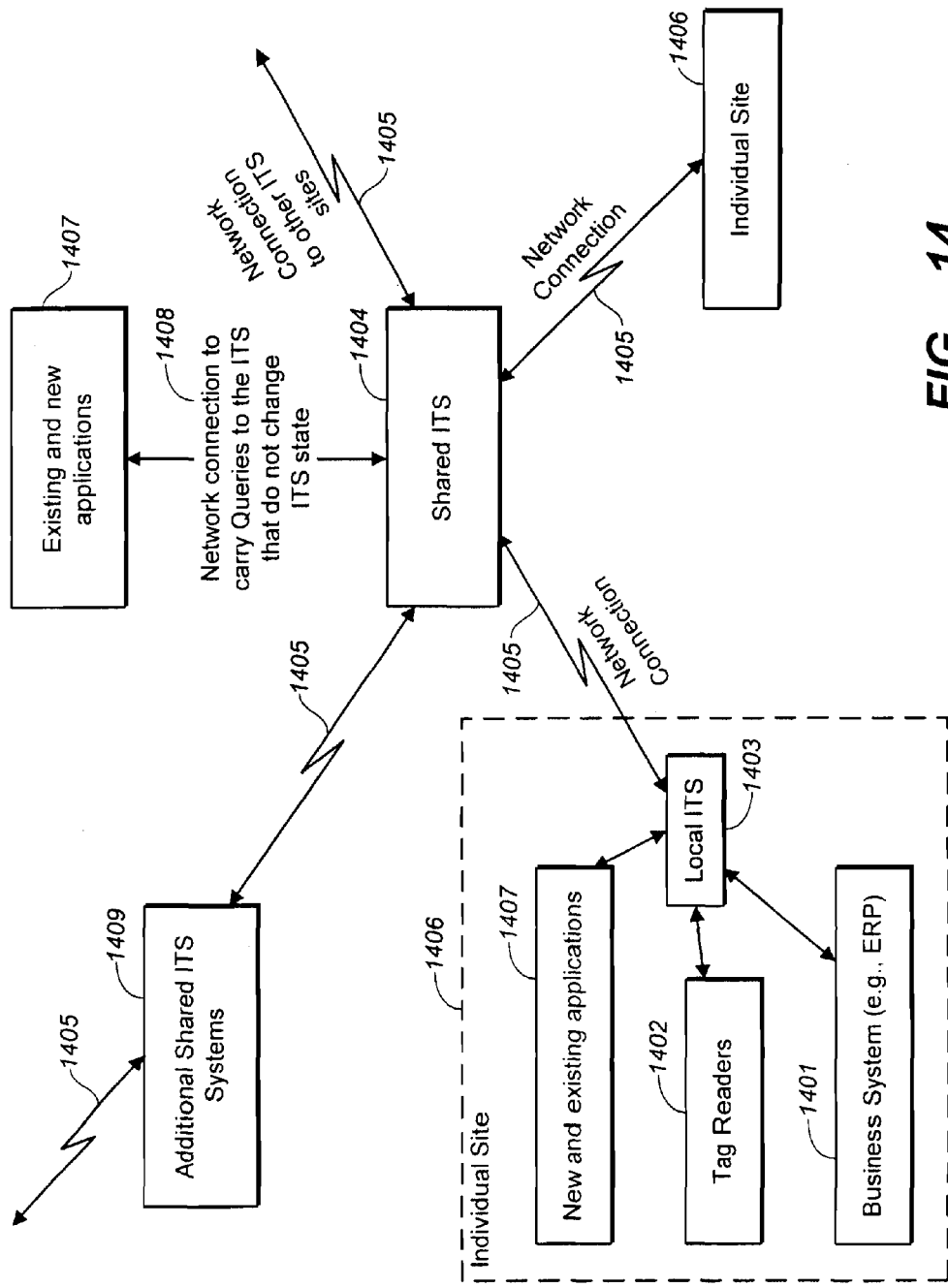
FIG._14

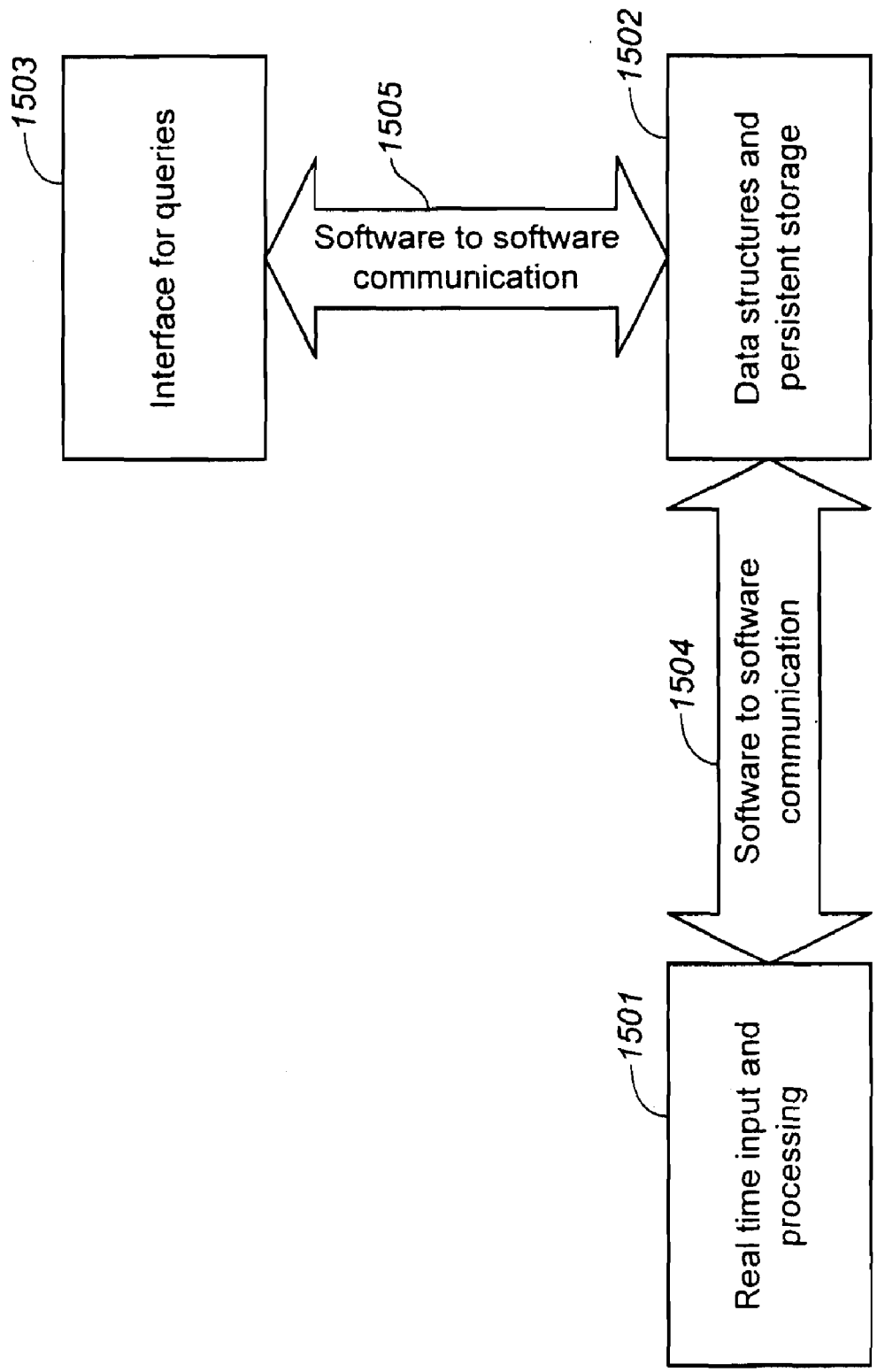
FIG._15

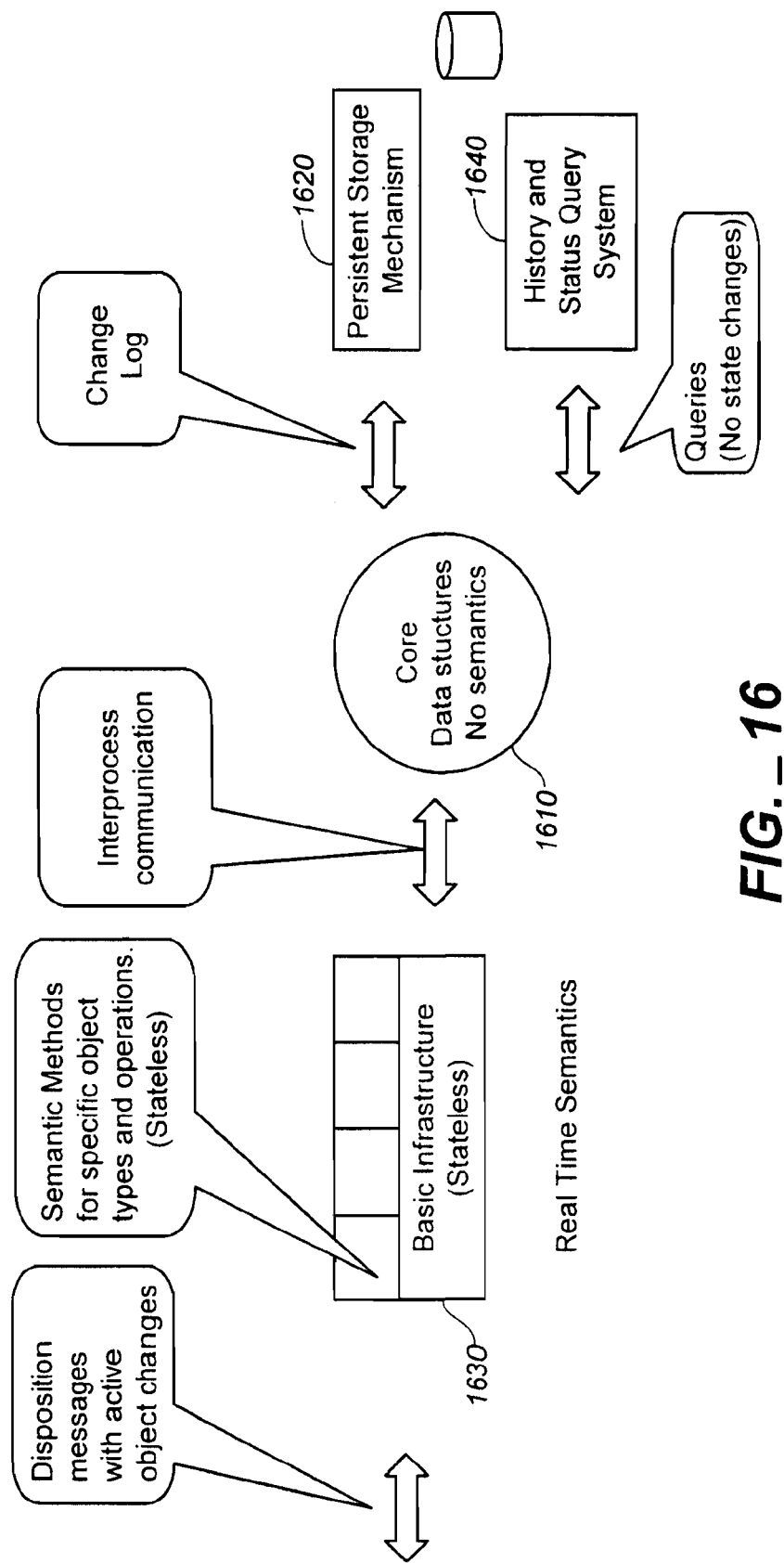
FIG._16

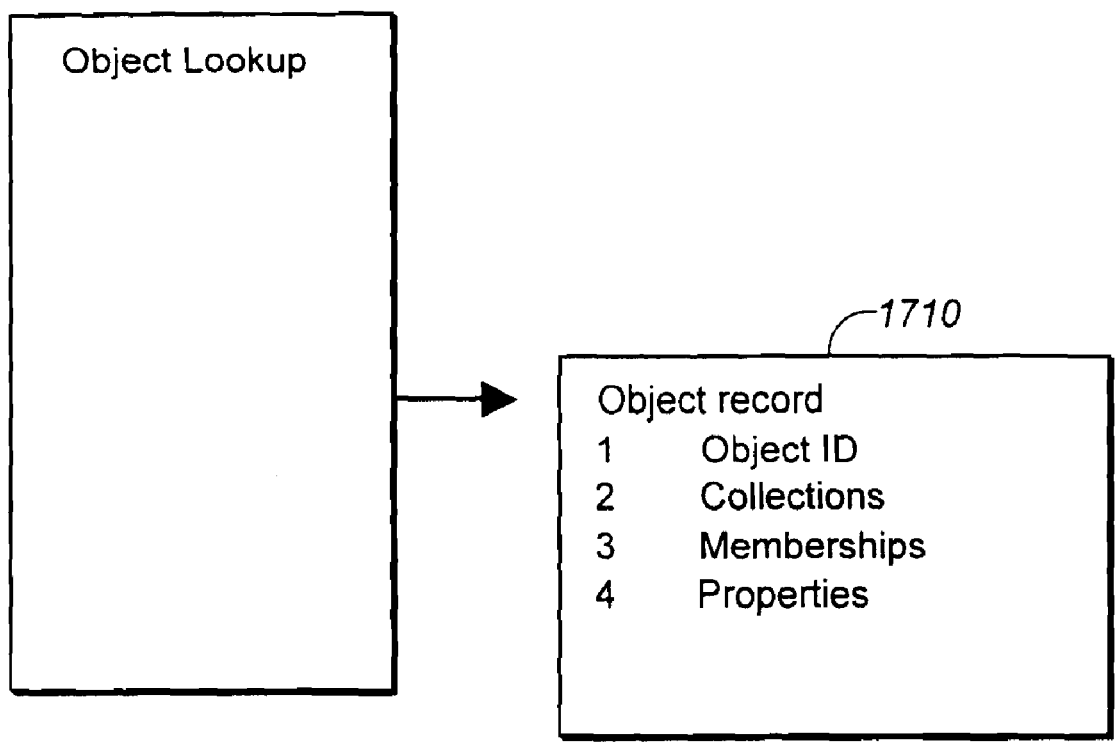
FIG._17

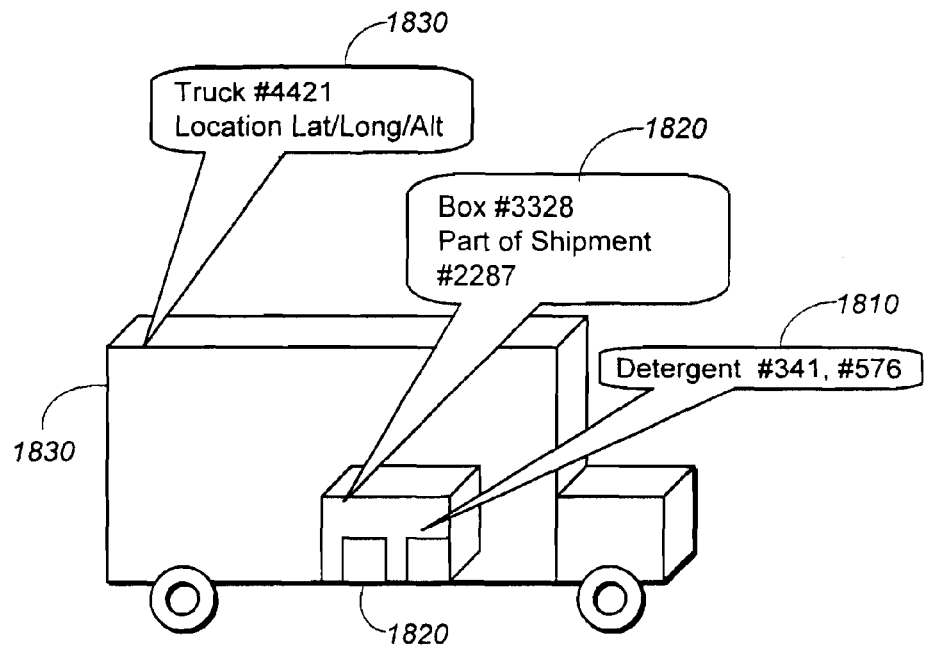
FIG._18
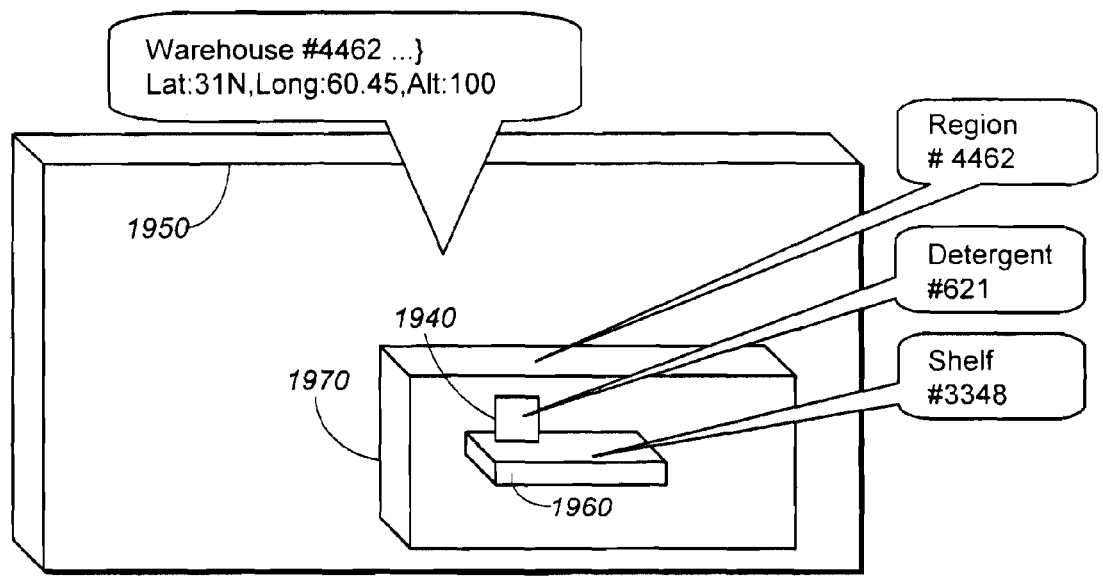
FIG._19

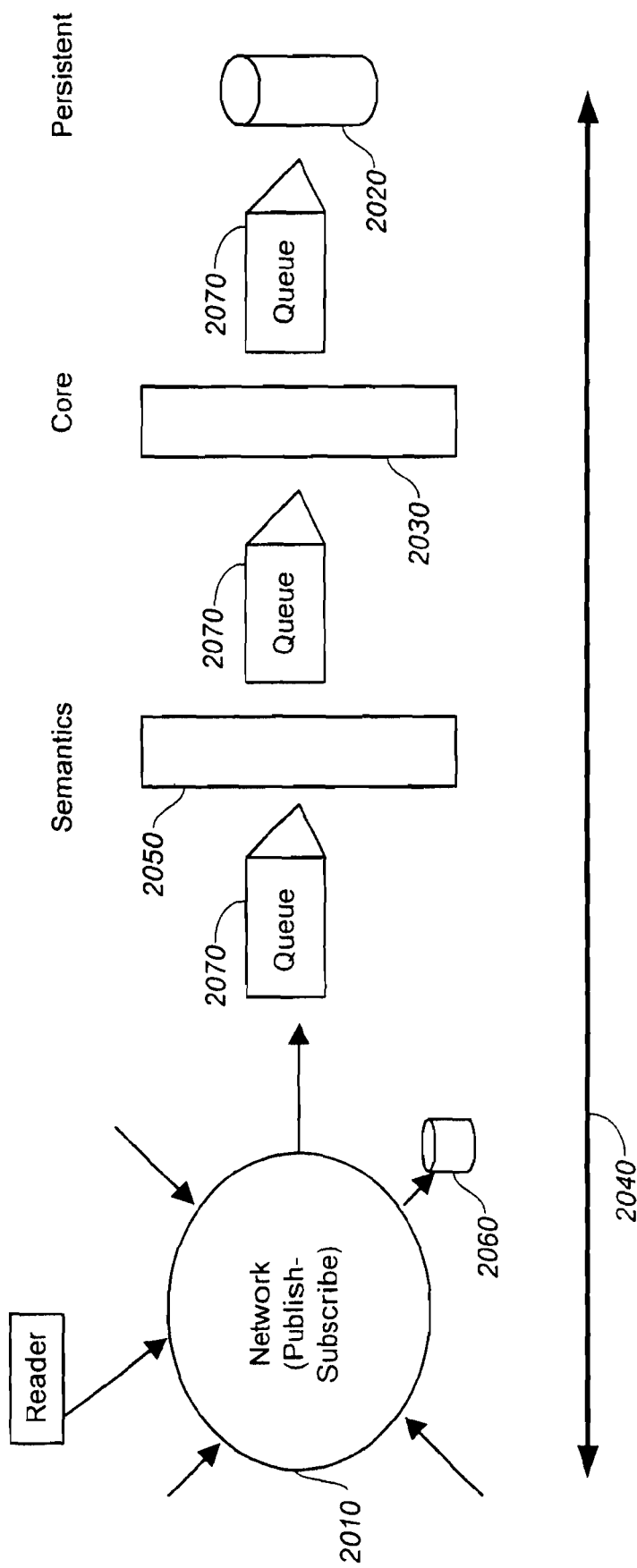

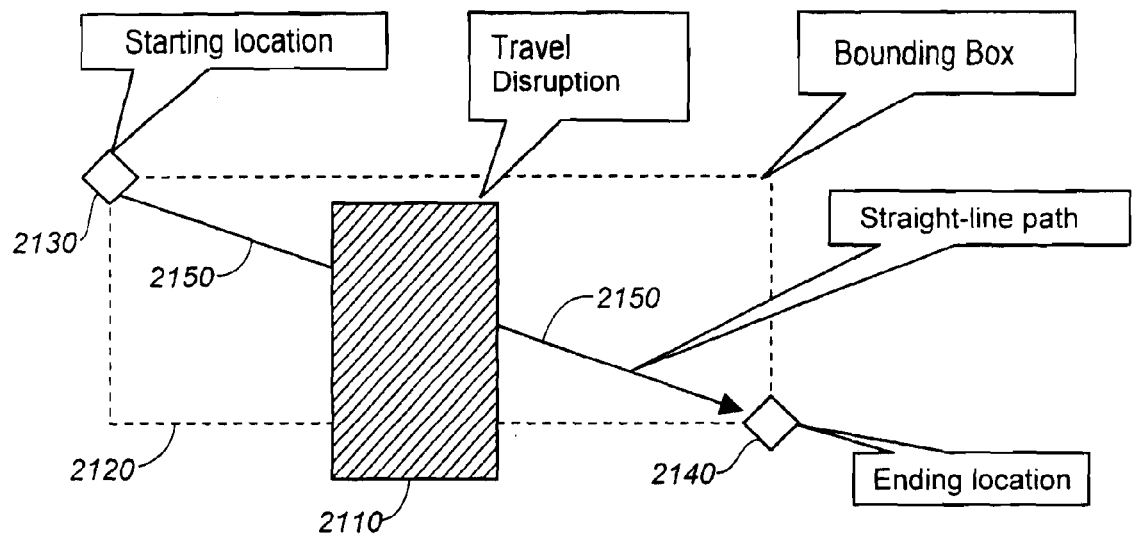
FIG._21
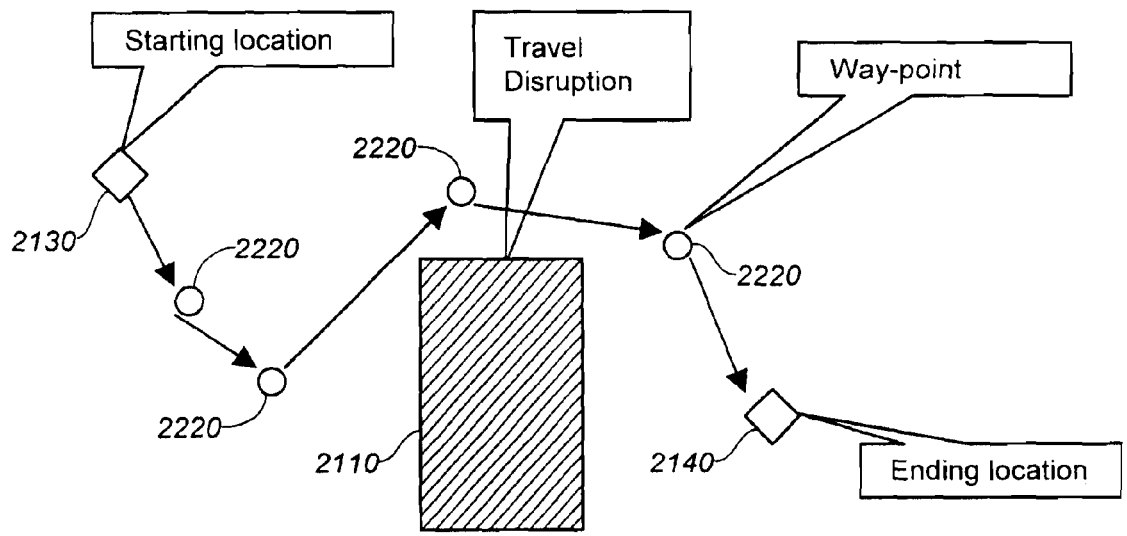
FIG._22

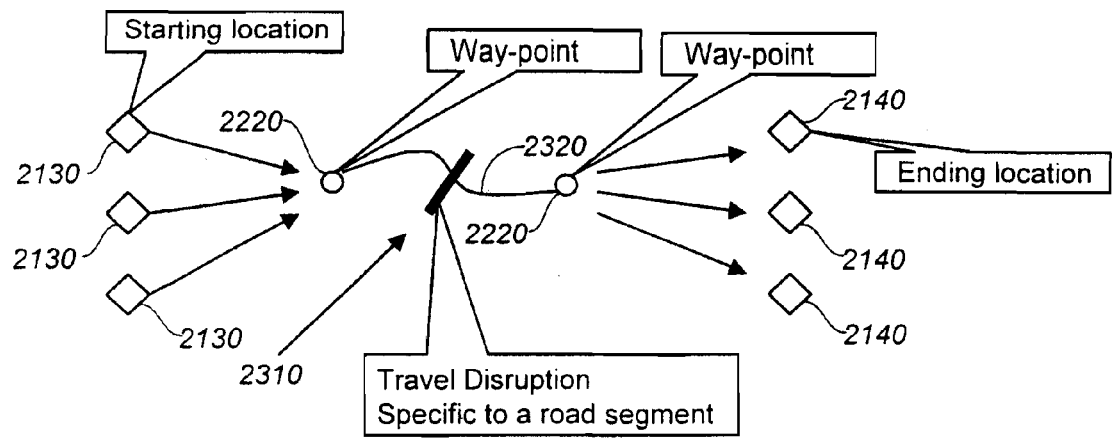
FIG._23
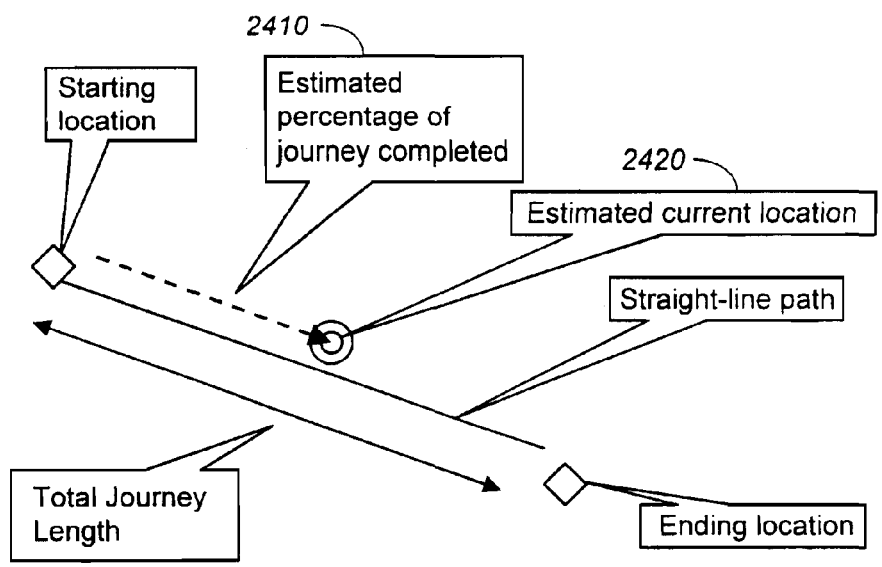
FIG._24

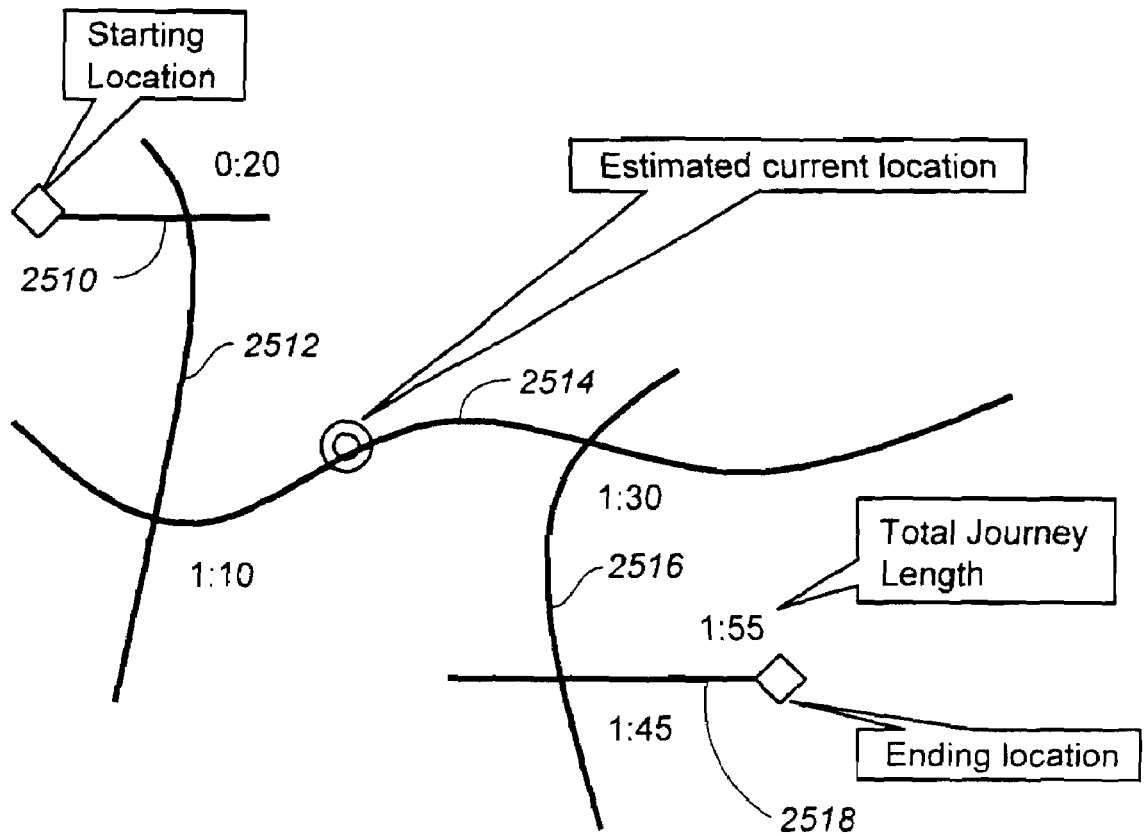
FIG._25

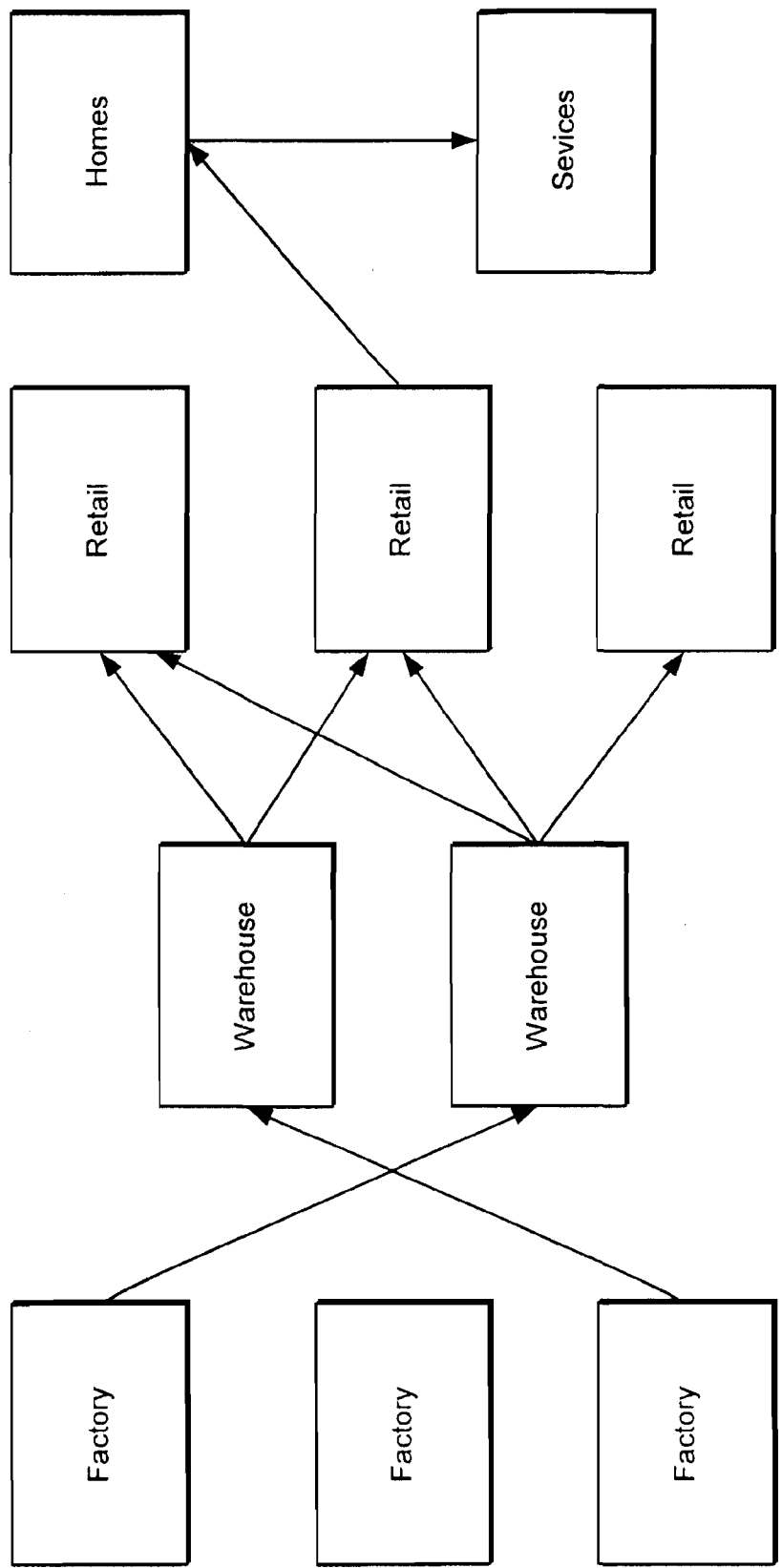
FIG._26

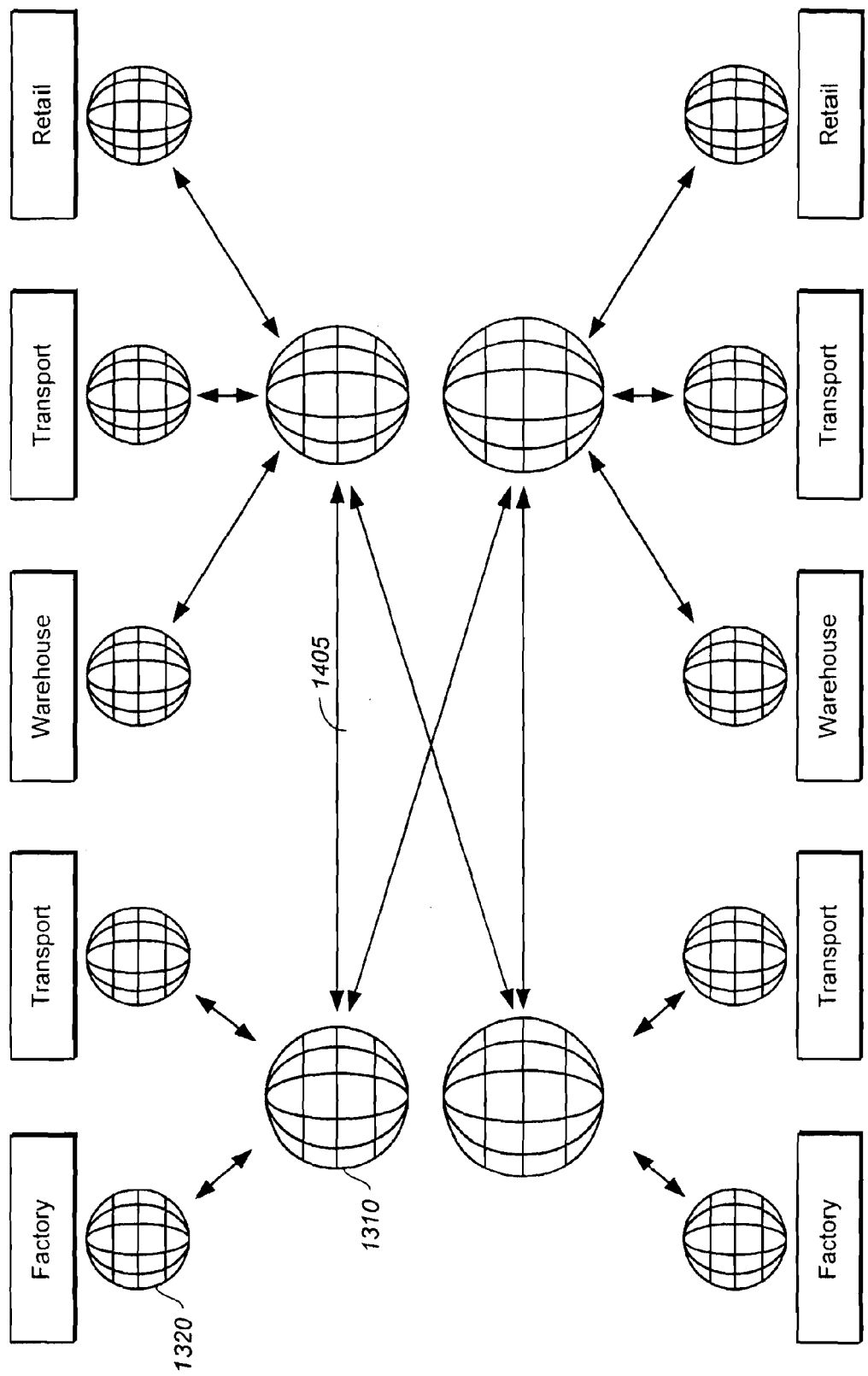
FIG._27

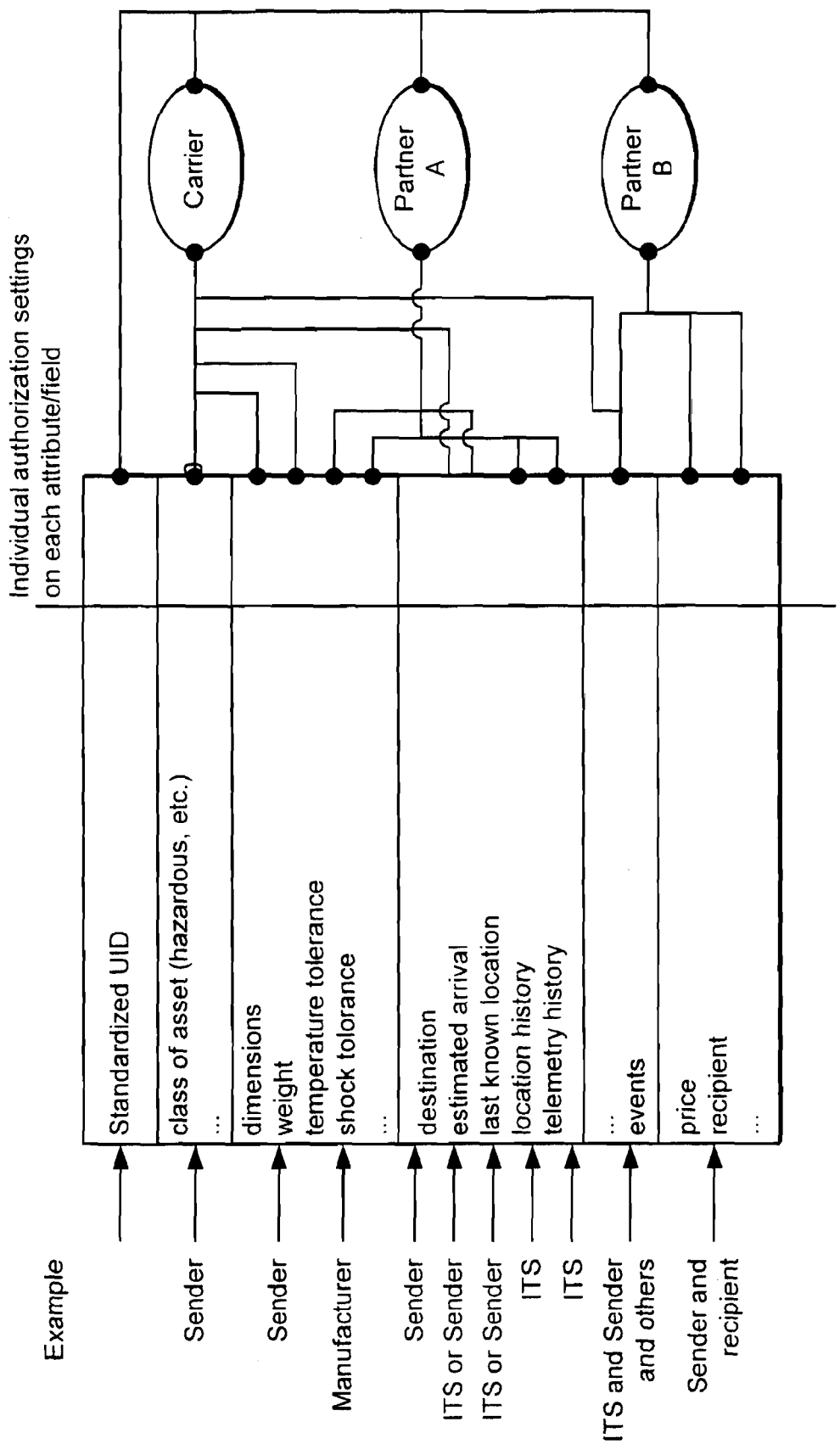
FIG._28

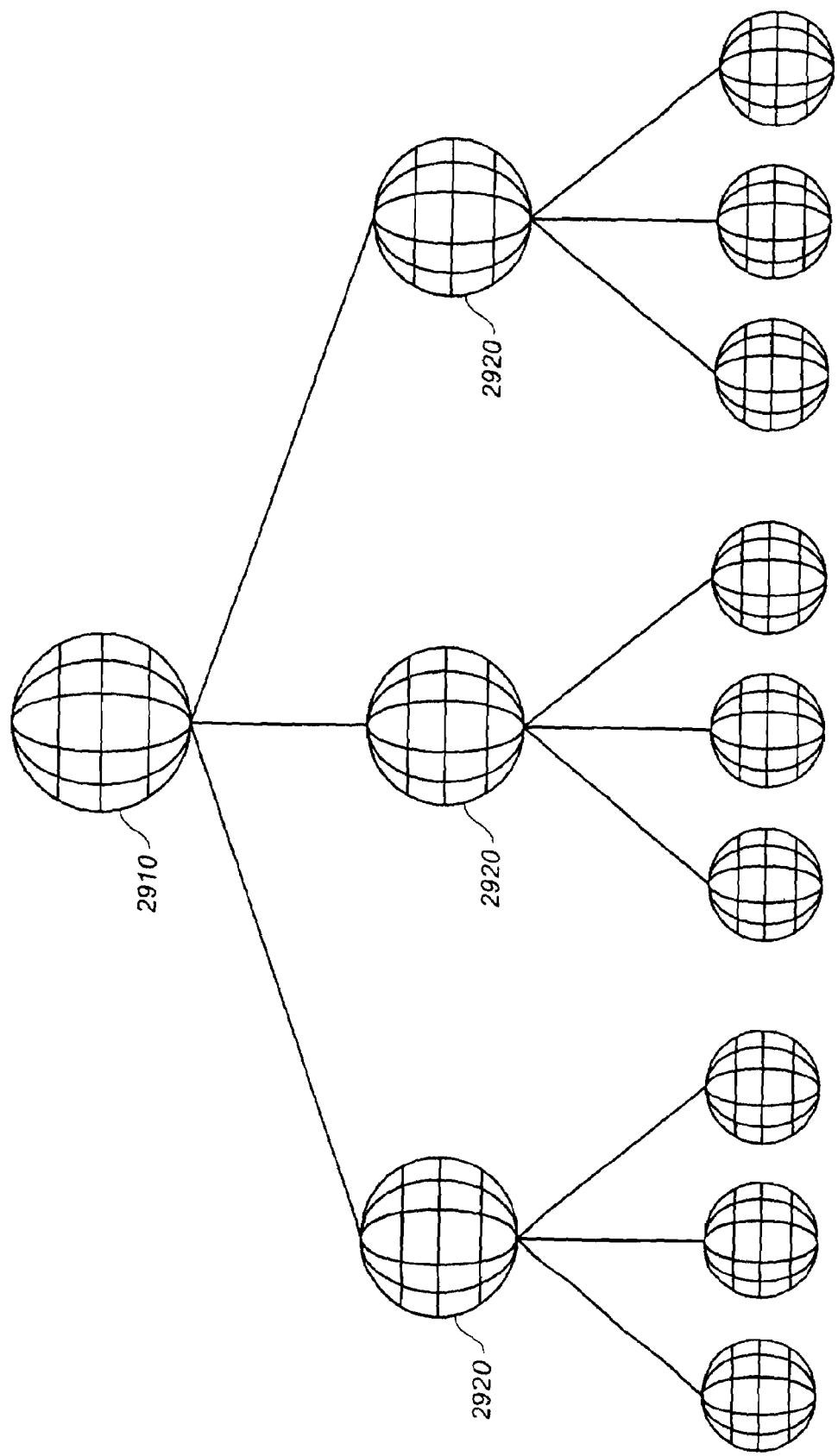
FIG._29

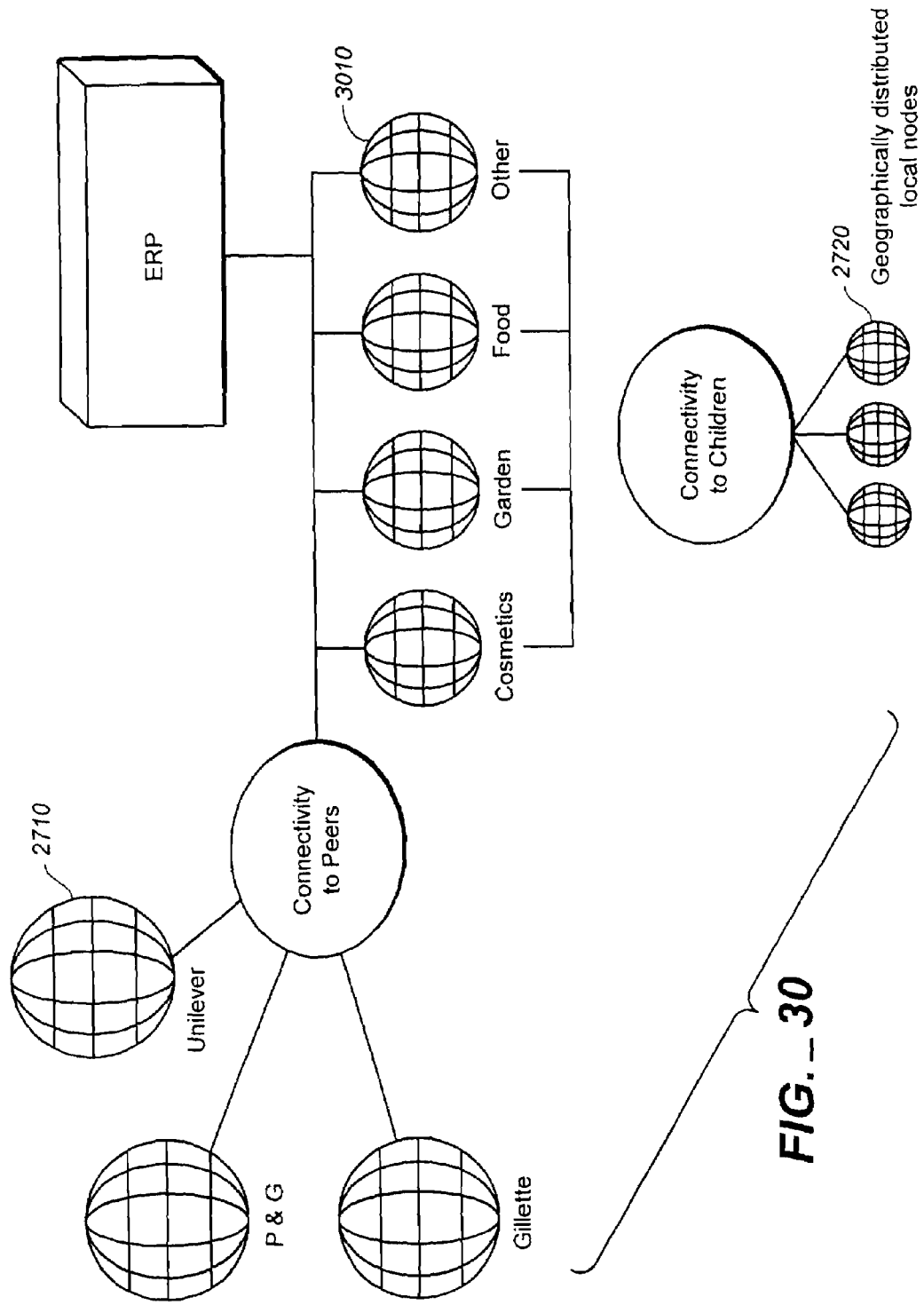
FIG._30

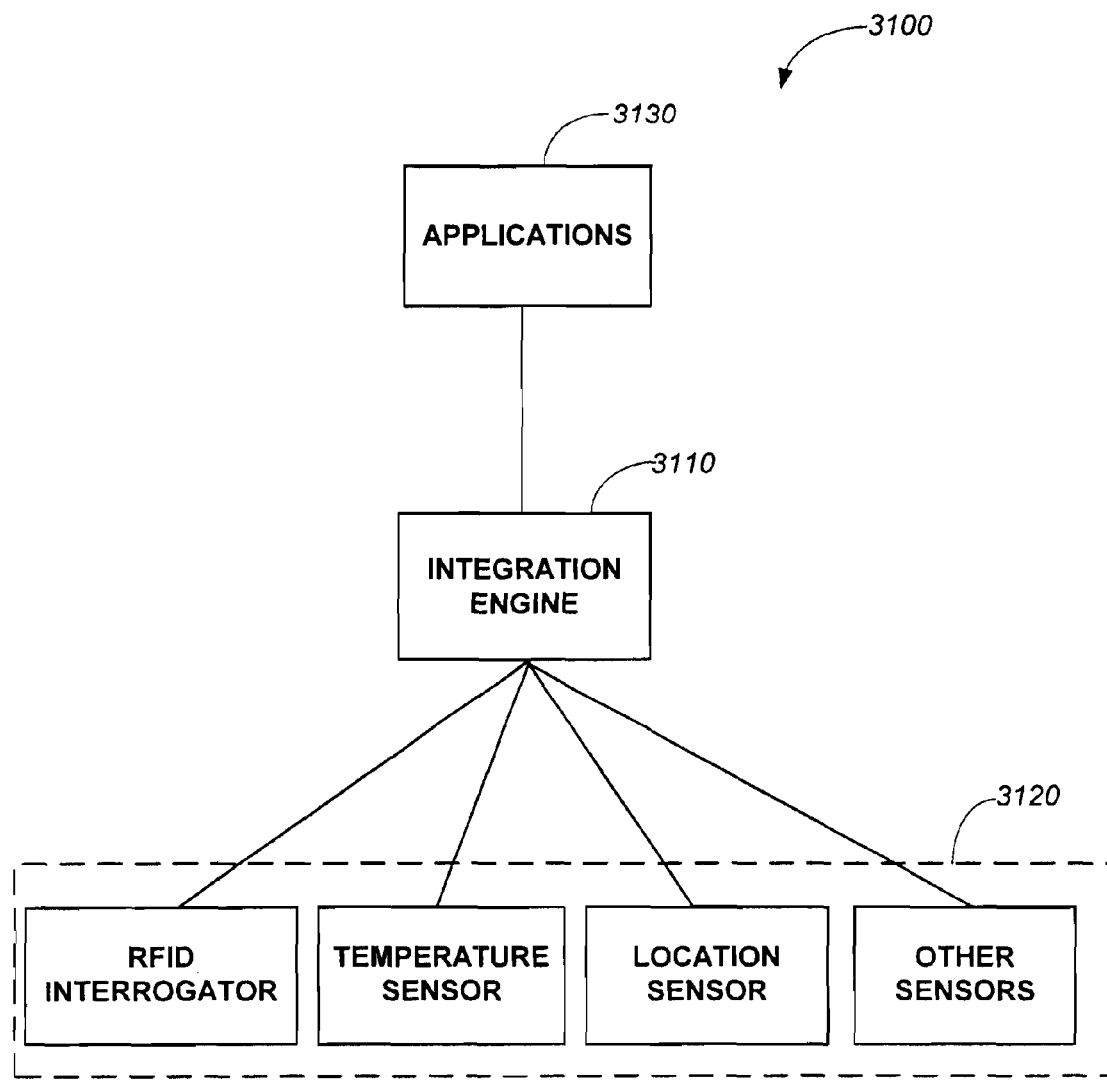
FIG._31

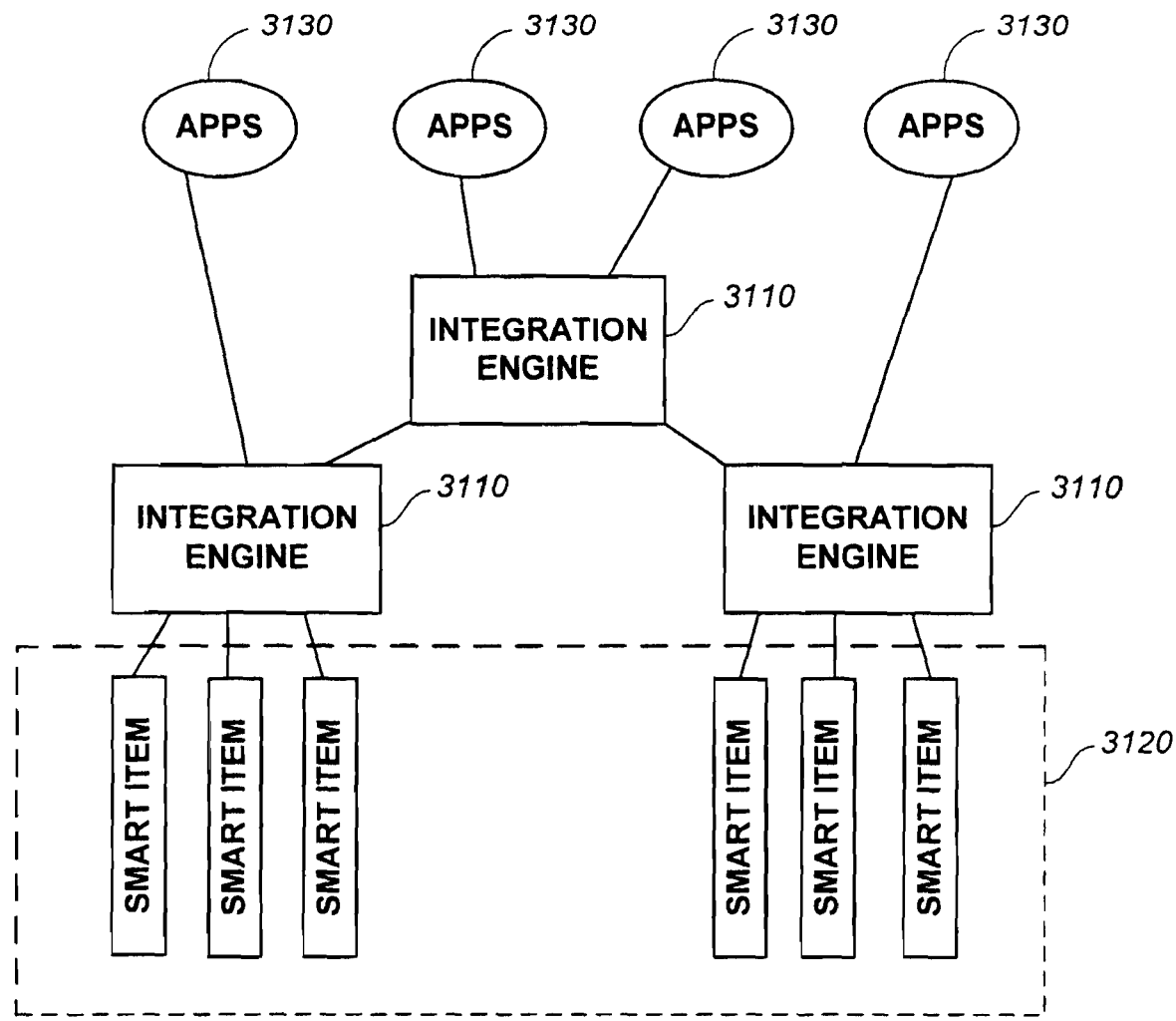
FIG._32

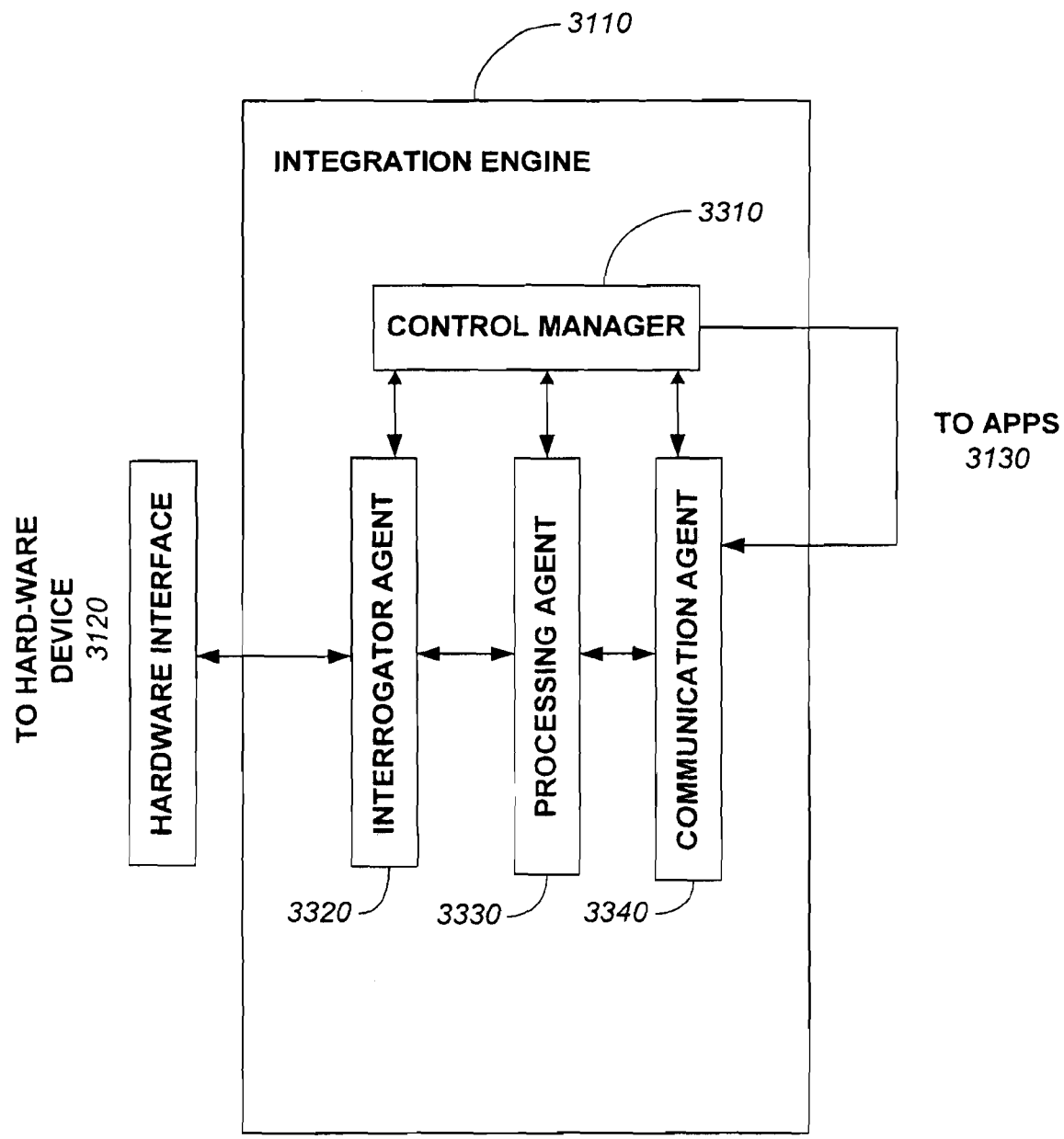
FIG._33

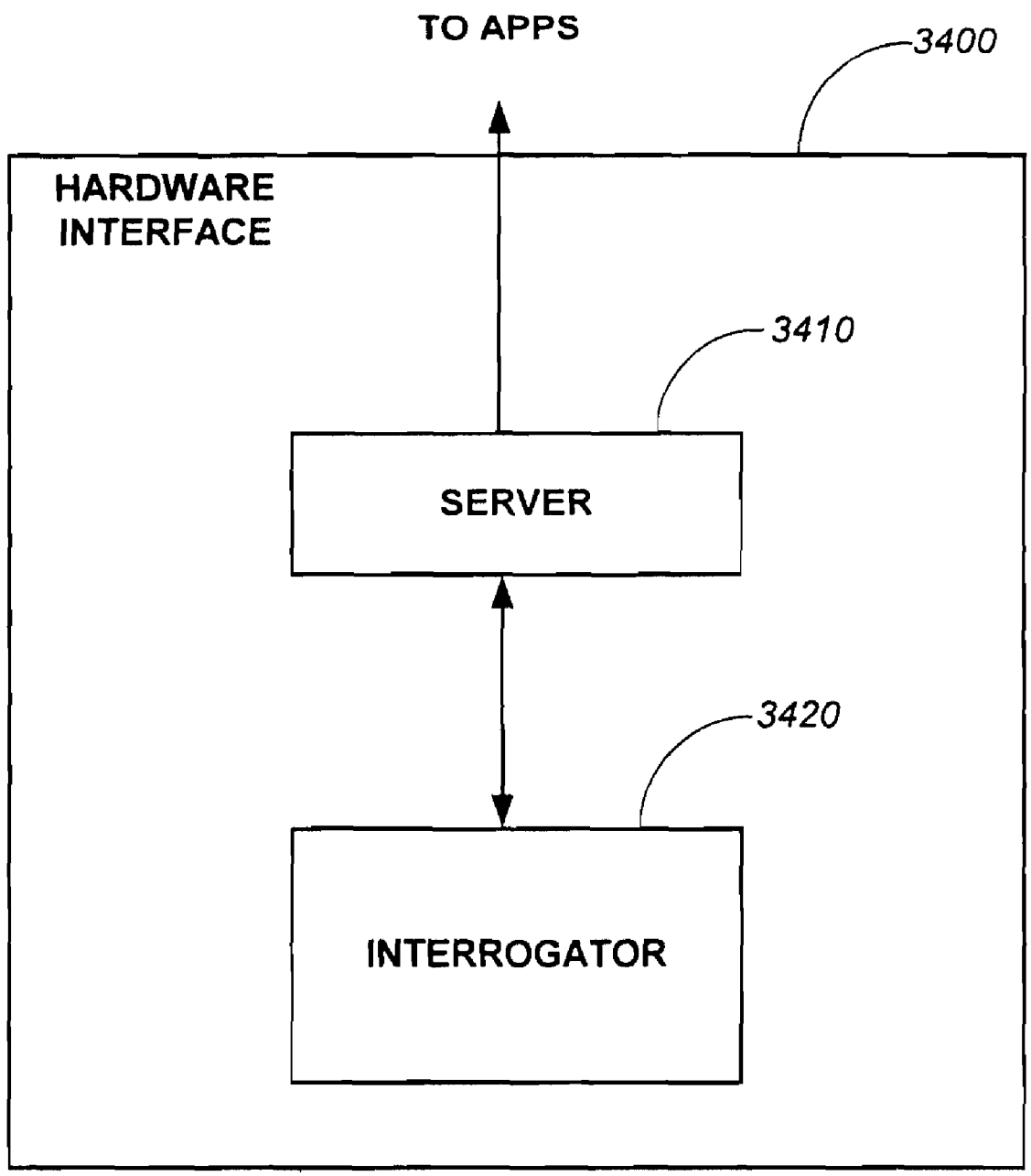
FIG._34

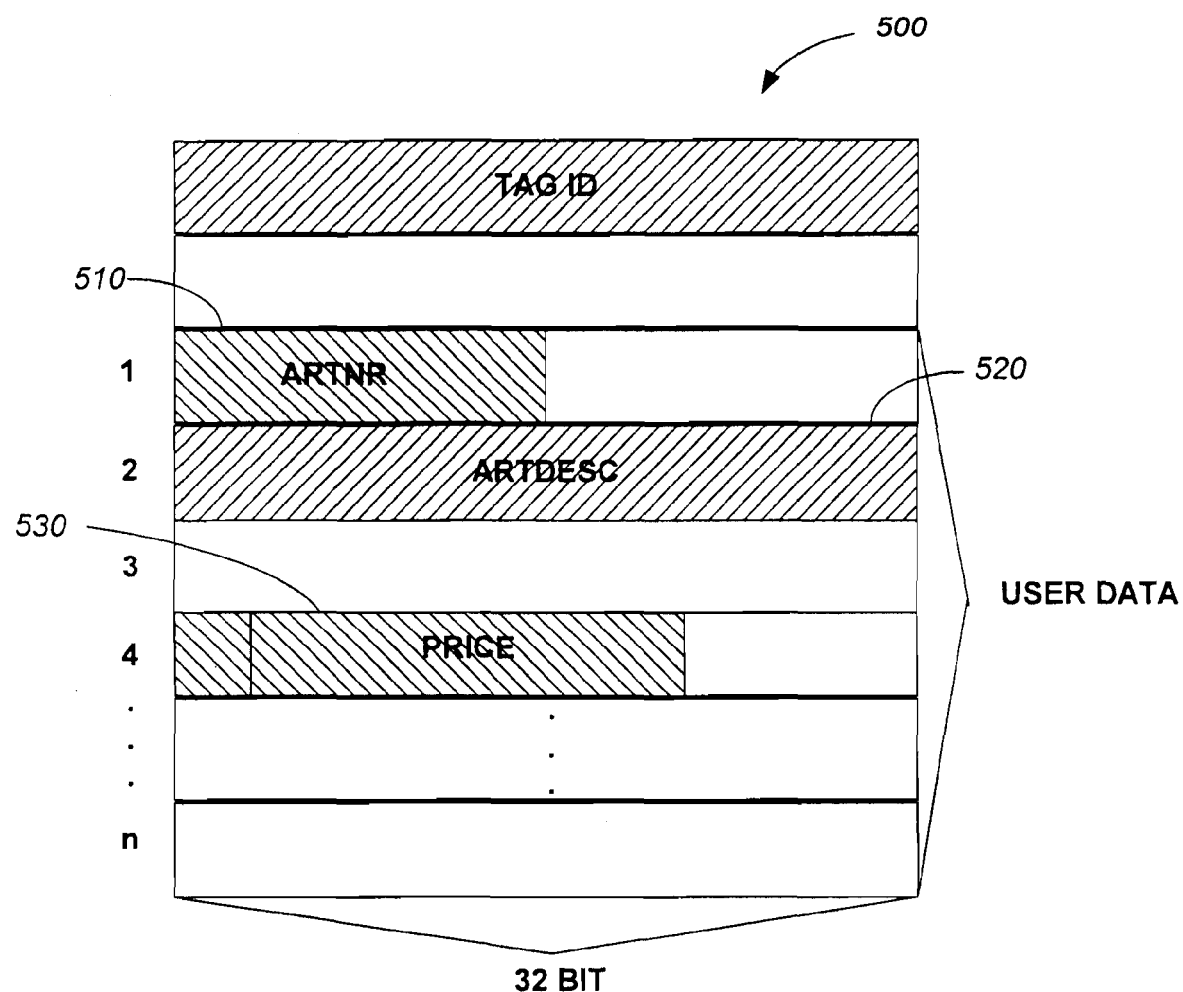
FIG._35

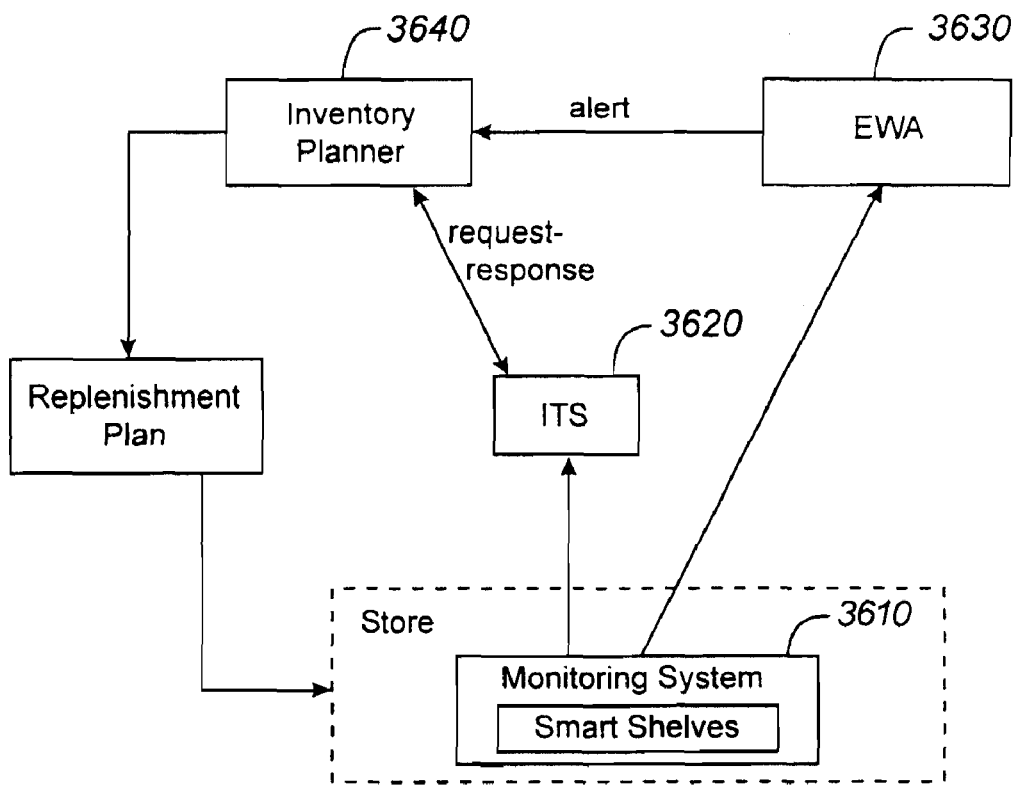
FIG. _36
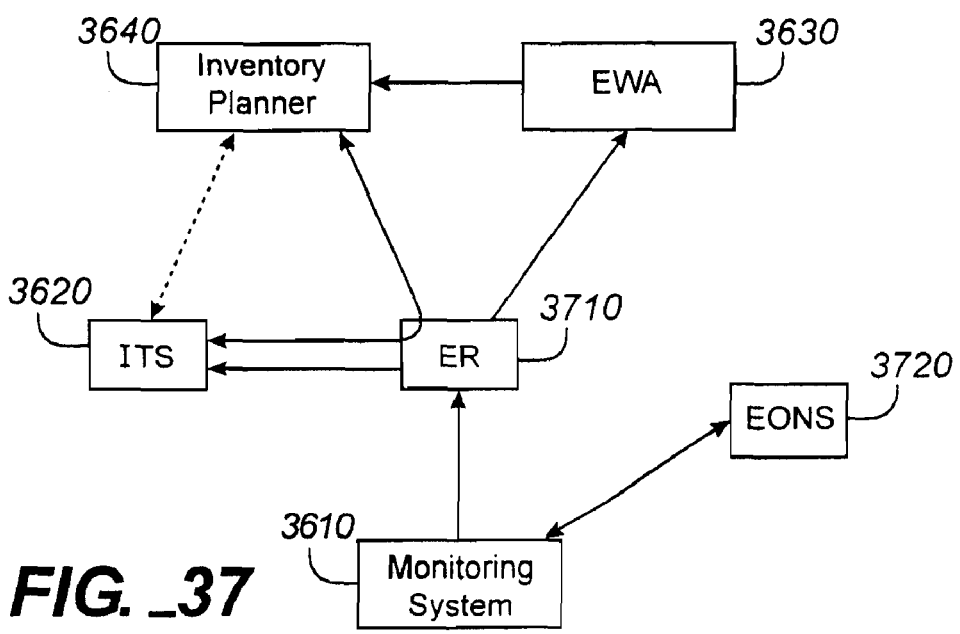
FIG. _37

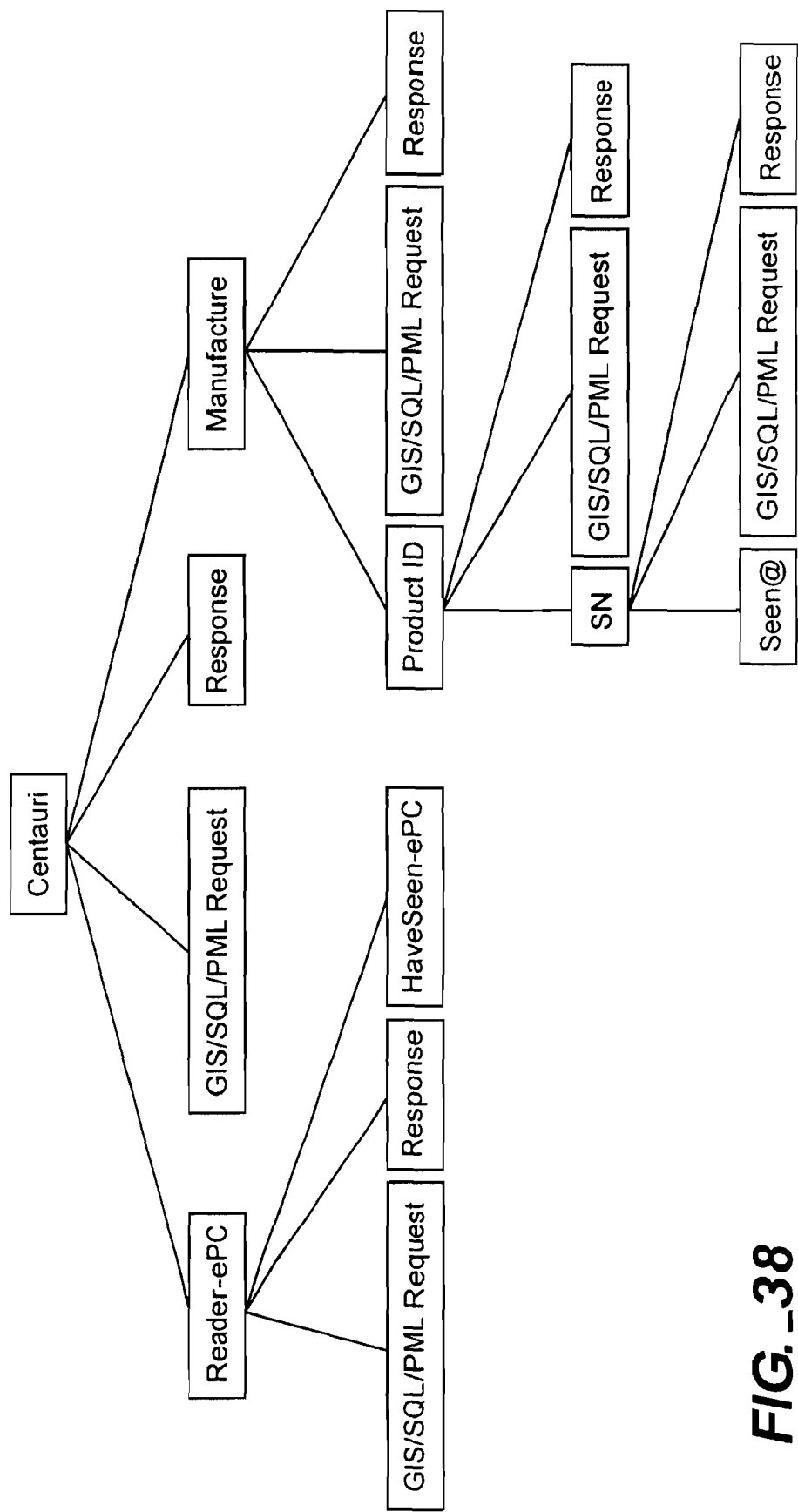
FIG._38

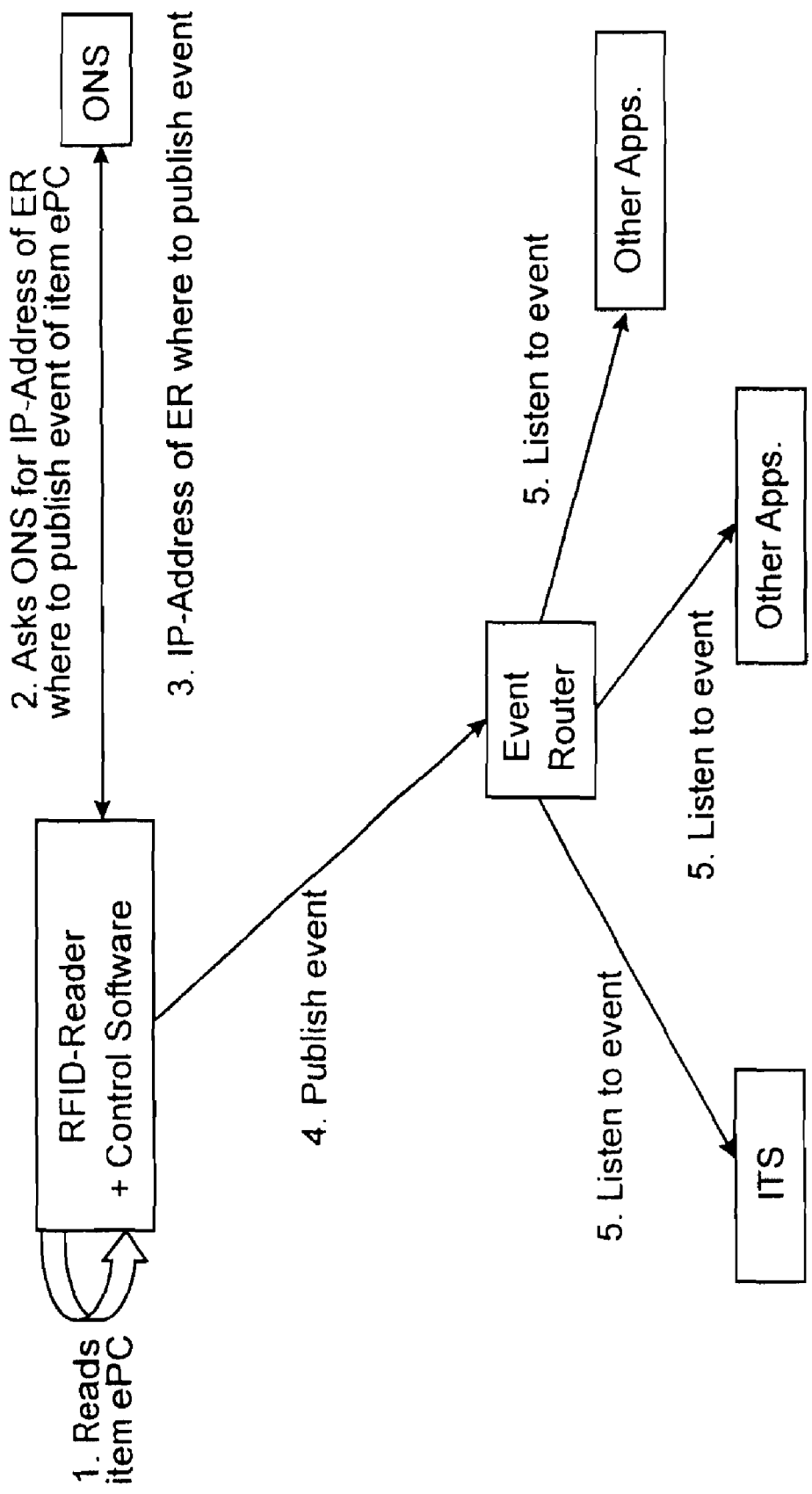
FIG._39

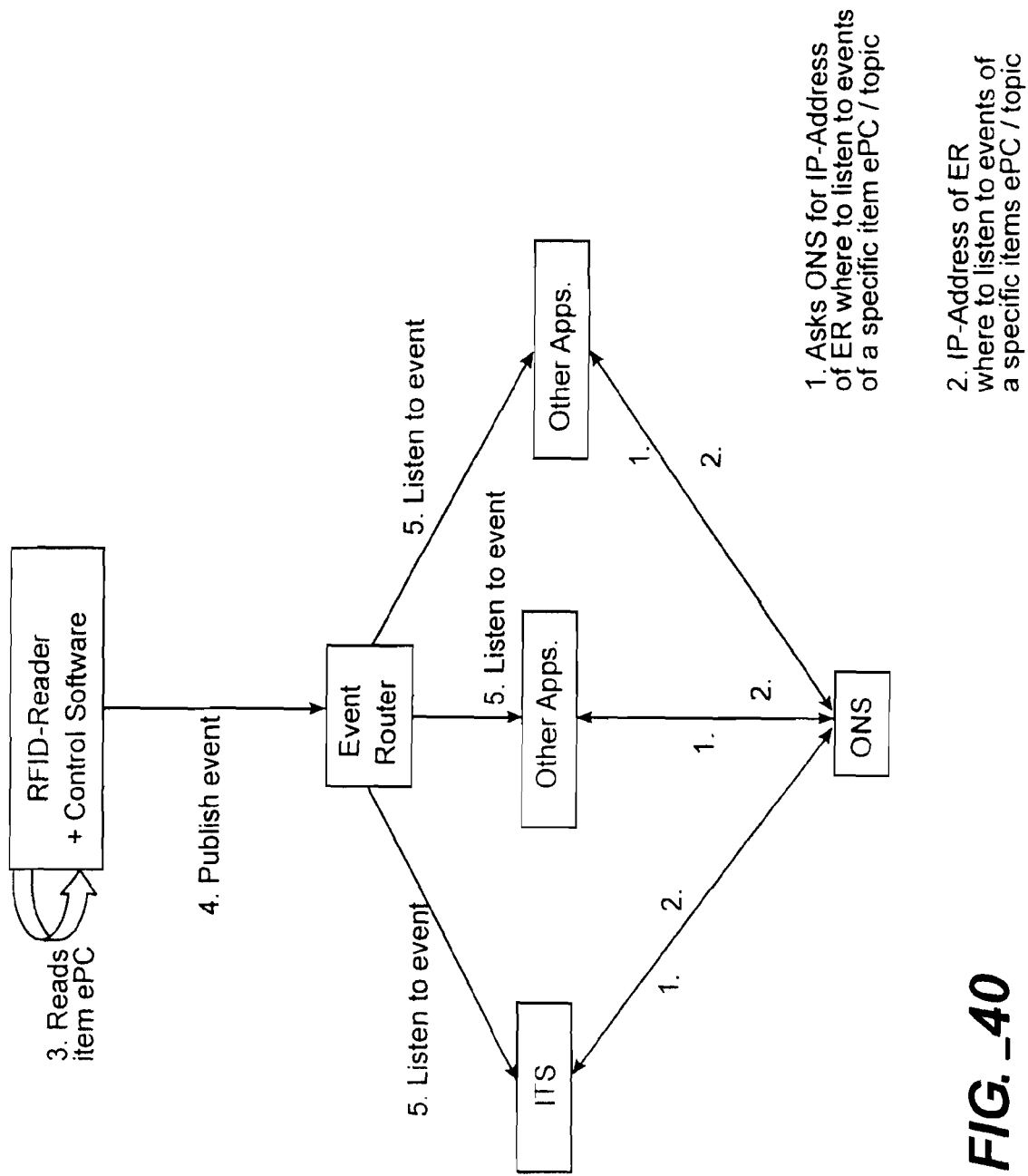
FIG._40

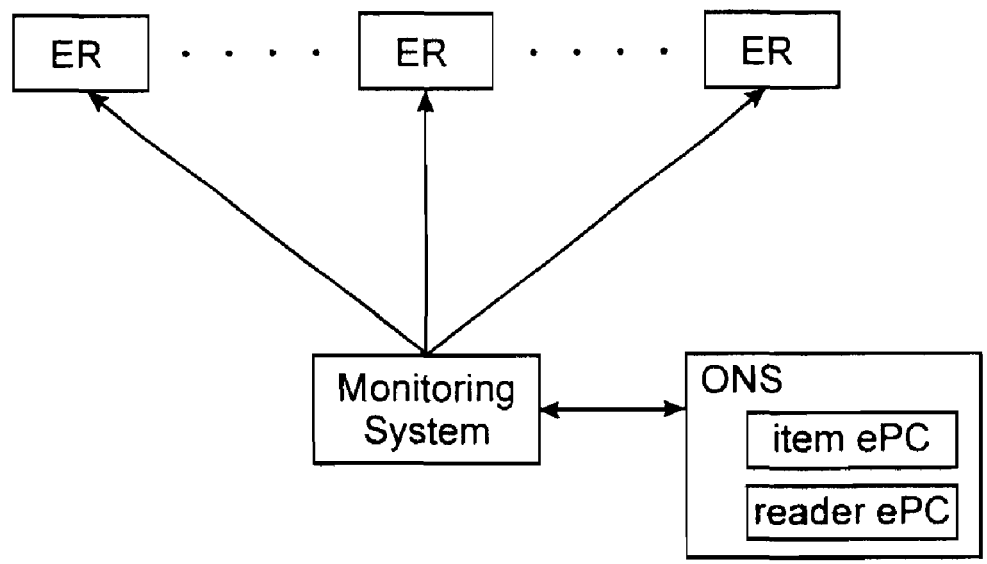
FIG. _41
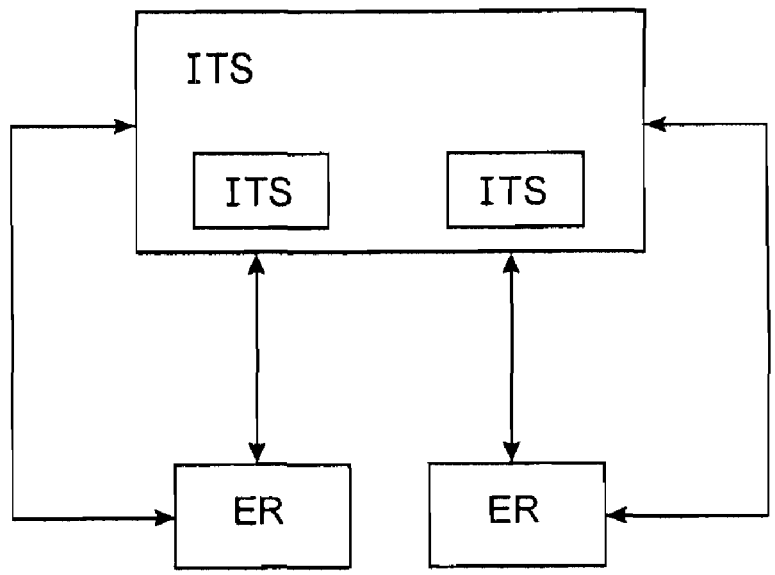
FIG. _42

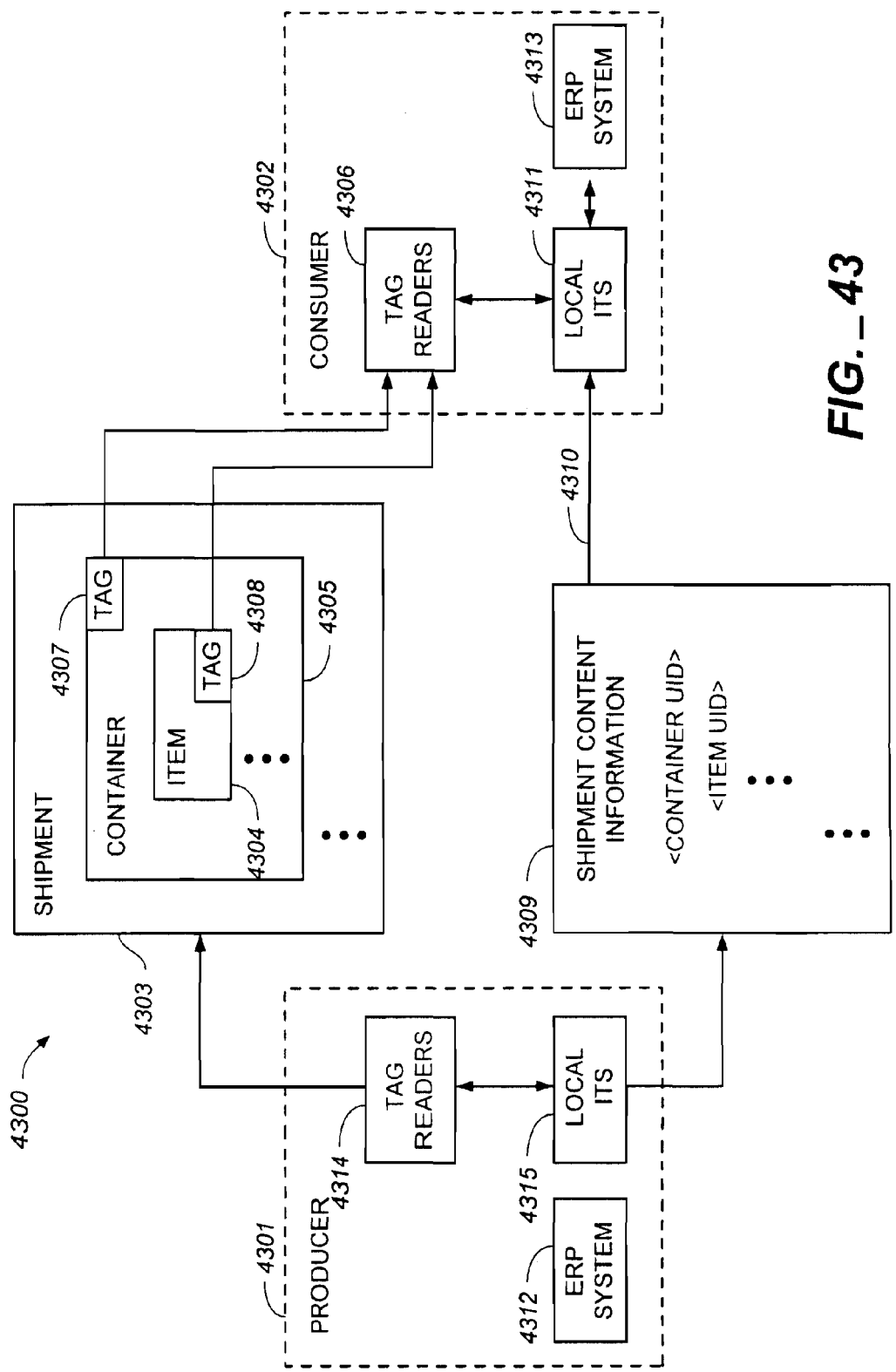
FIG._43

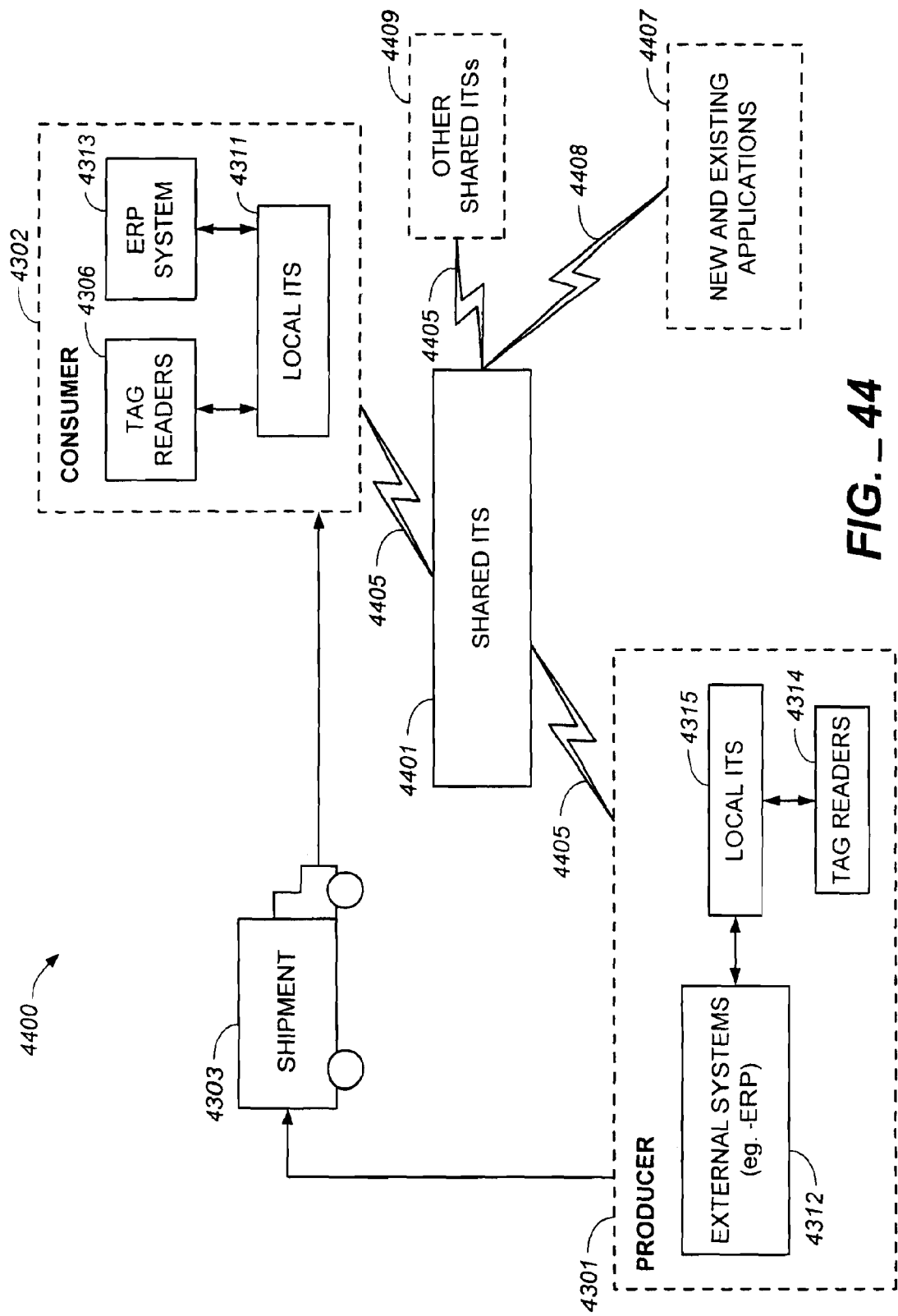
FIG._44

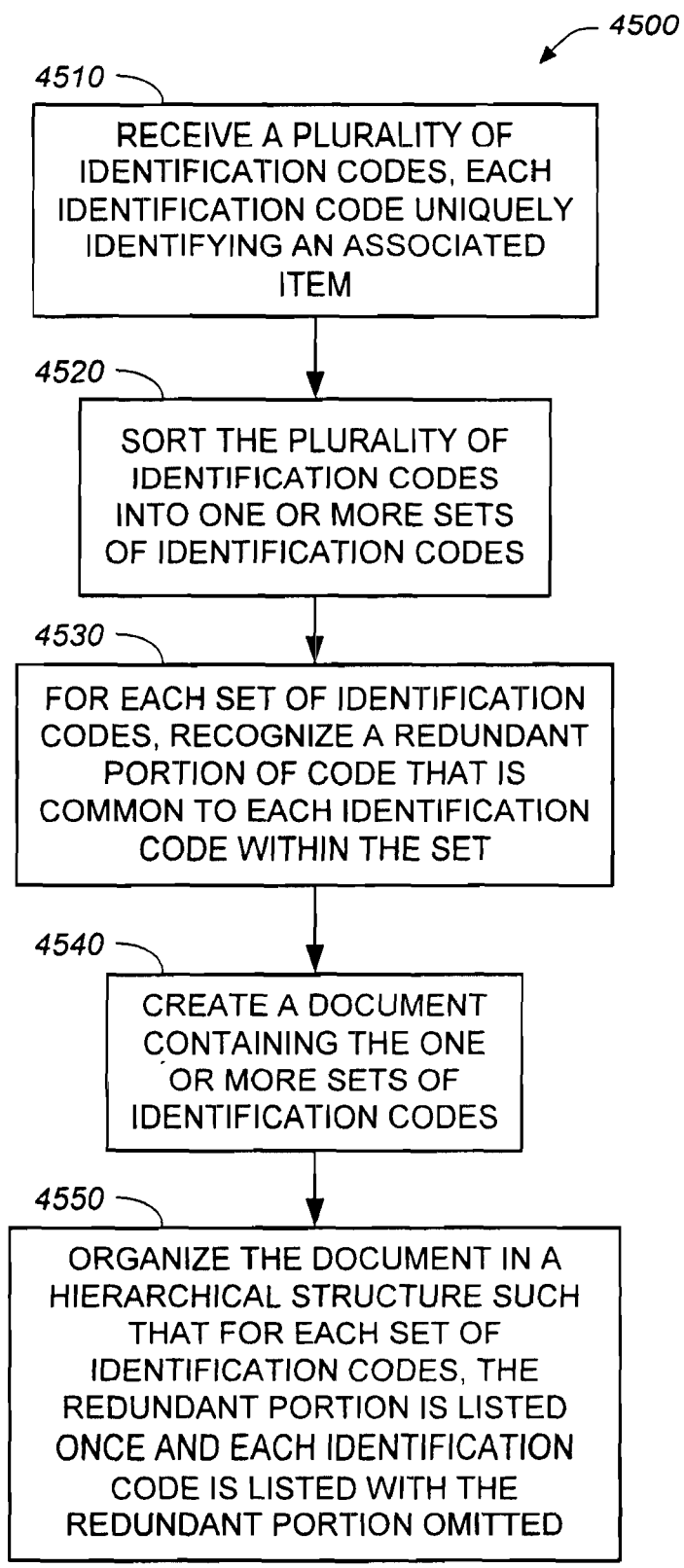
FIG._45

| 4610 | 4620 | 4630 | 4640 |
|---|---|---|---|
| 01 | 0000A89 | 00016F | 000169DC0 |
| Header bits 0-7 | ePC Manager bits 8-35 | Object Class bits 36-59 | Serial Number bits 60-95 |

FIG._46

```
<SHIPMENT ID = 1234567>
    <ITEM_LIST NAME = "BASKETBALL" EPC_PREFIX = >
        <ITEM>
        <EPC> 01.000A89.00016F000169DC0 </EPC>
        </ITEM>
        <ITEM>
        <EPC> 01.000A89.00016F000169DC1 </EPC>
        </ITEM>
        <ITEM>
        <EPC> 01.000A89.00016F000169DCA </EPC>
        </ITEM>
         •
         •
         •
    </ITEM_LIST>
<SHIPMENT>
```

```
<SHIPMENT ID = 1234567>
    <ITEM_LIST NAME = "BASKETBALL" EPC_PREFIX = 01.00A89.00016F>
                                                              ⎣—4802
        <ITEM>
            <EPC> 000169DC0 </EPC>
        </ITEM>
        <ITEM>
            <EPC> 000169DC1 </EPC>
        </ITEM>
        <ITEM>
            <EPC> 000169DCA </EPC>
        </ITEM>           ⎣—4803
        •
        •
    </ITEM_LIST>
<SHIPMENT>
```

FIG._48

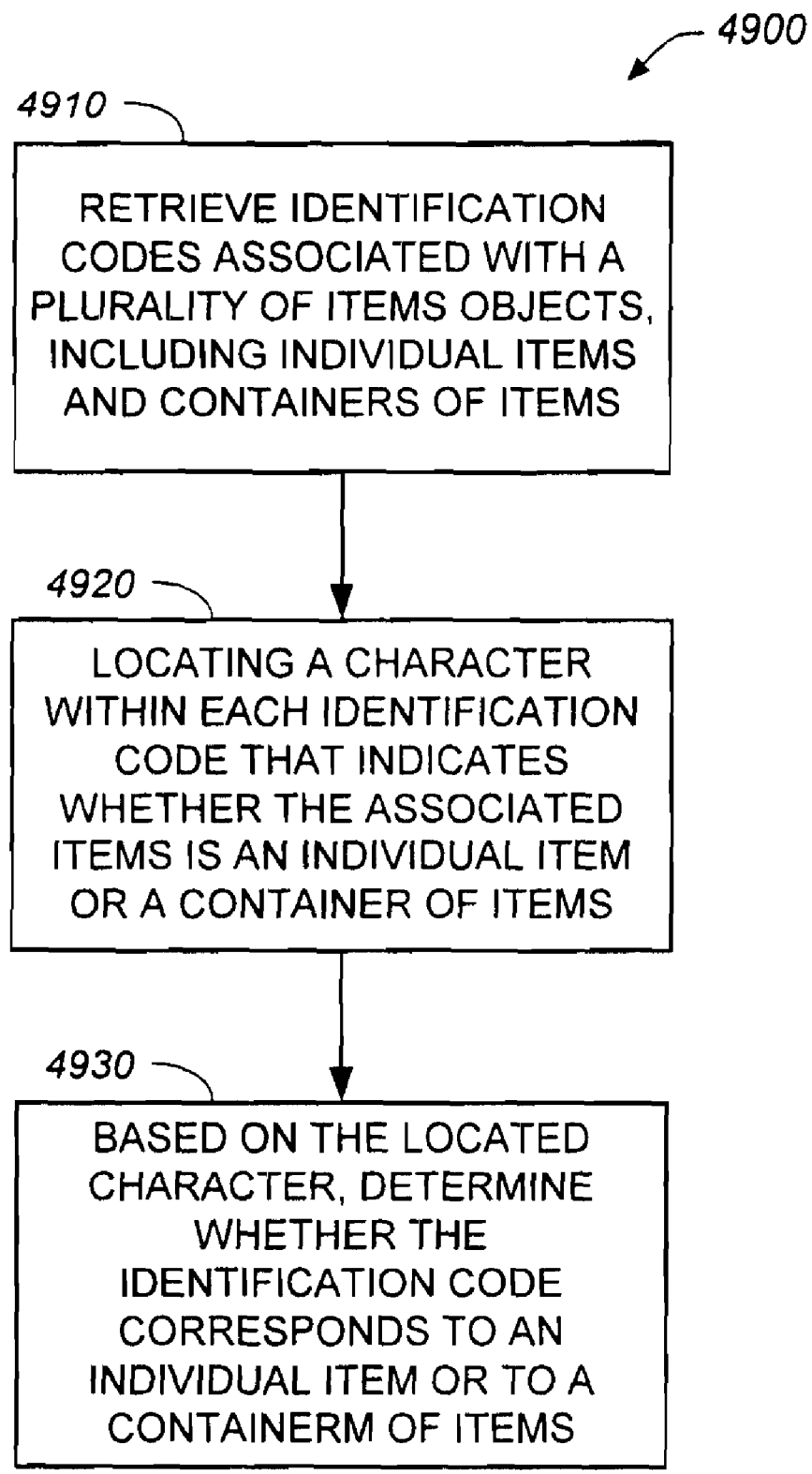
FIG._49

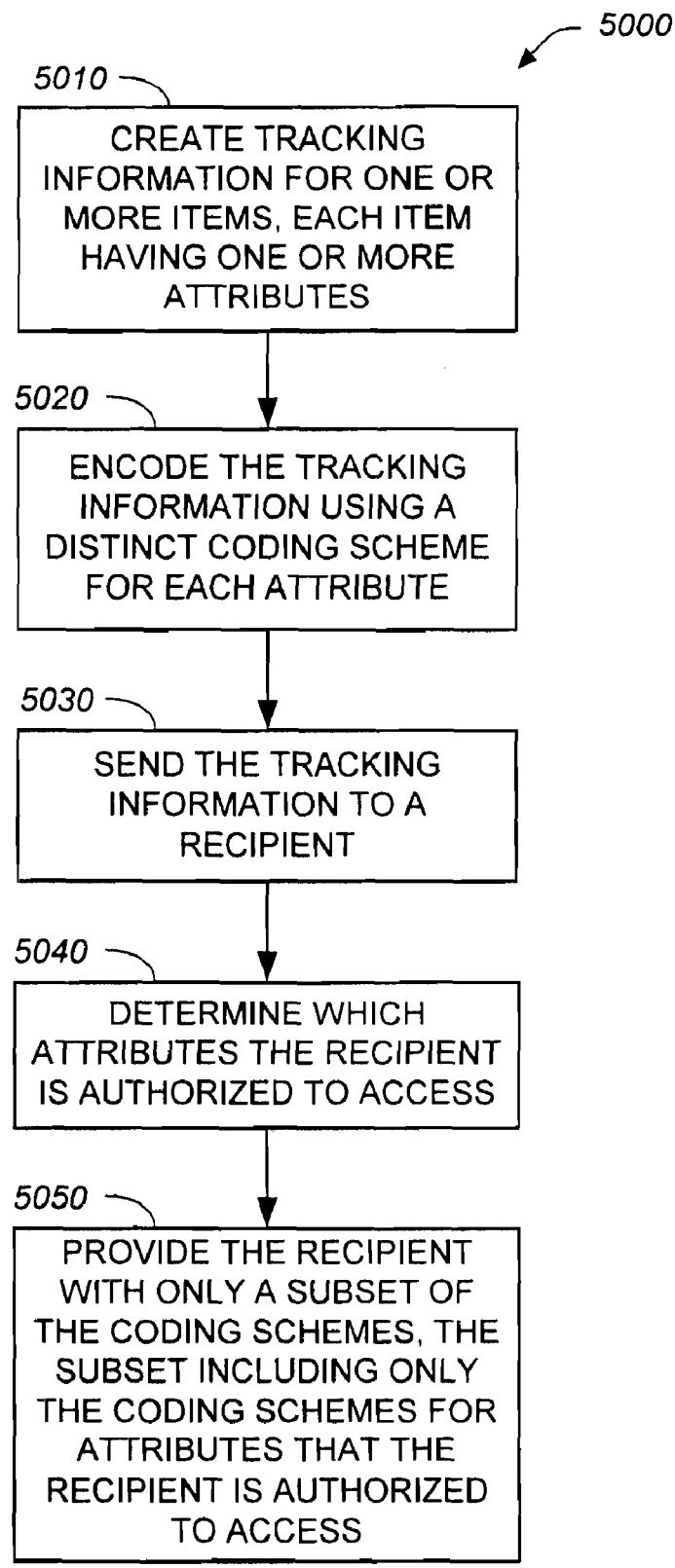
FIG._50

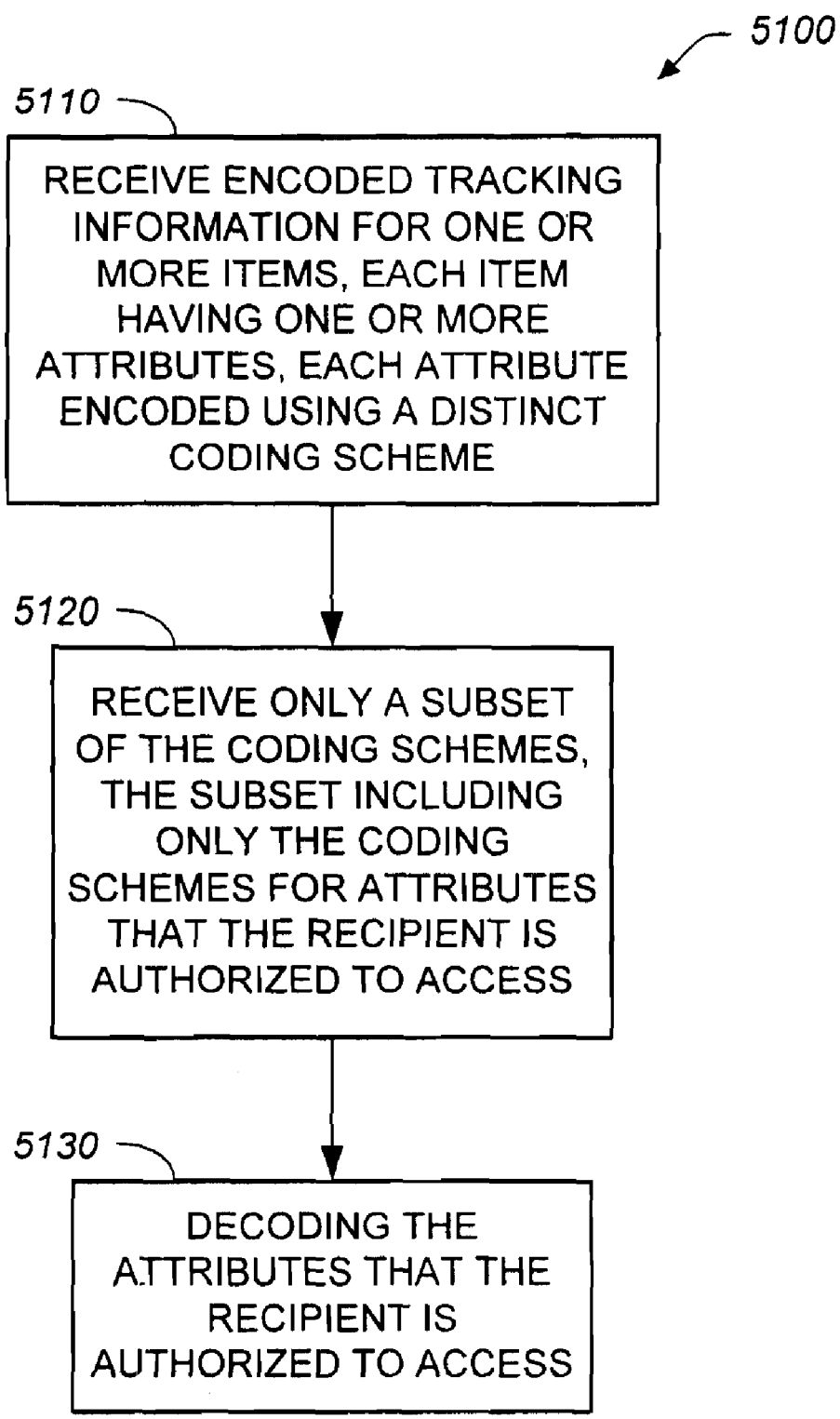
FIG._51

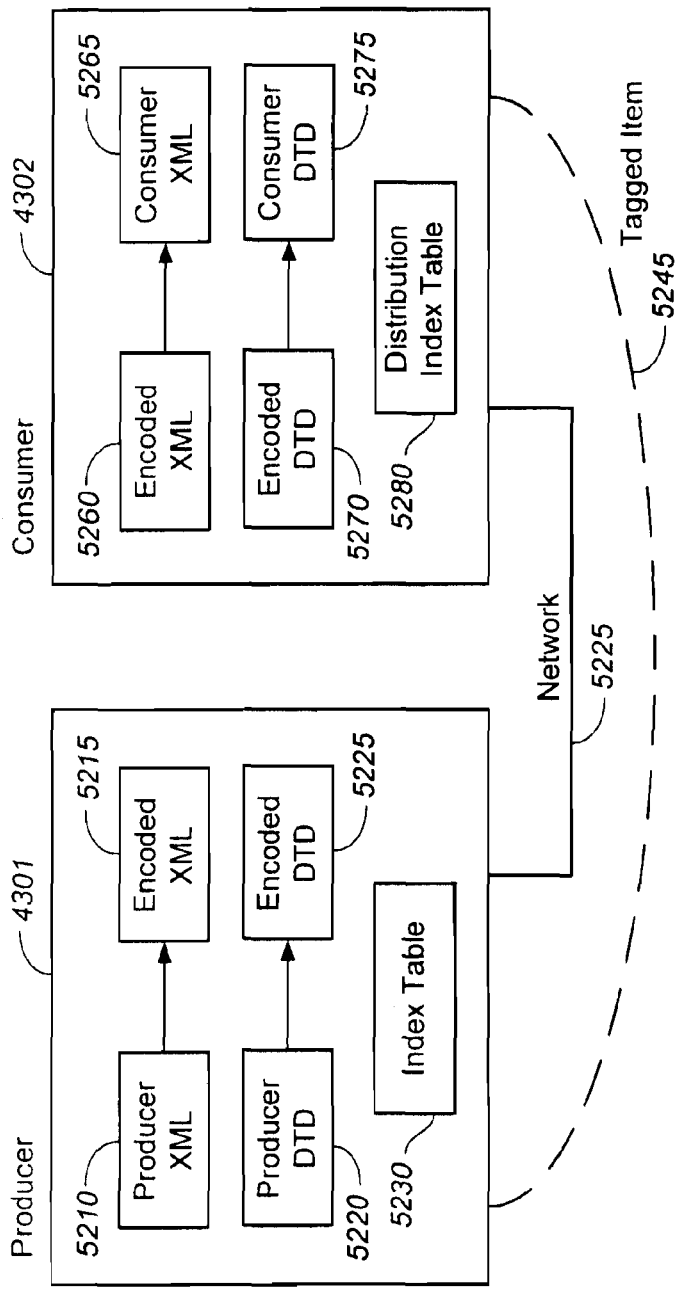
FIG._52
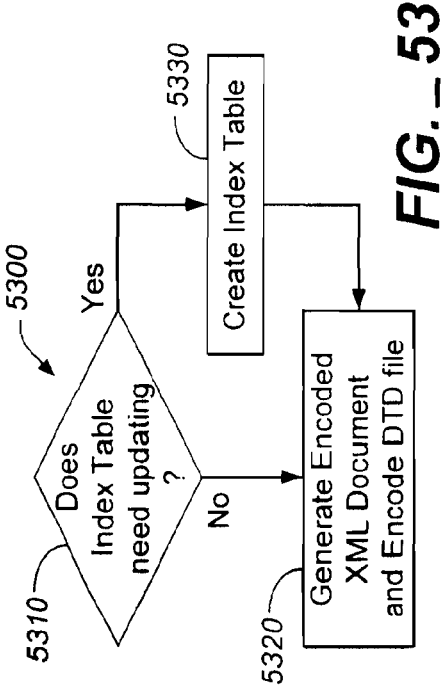
FIG._53

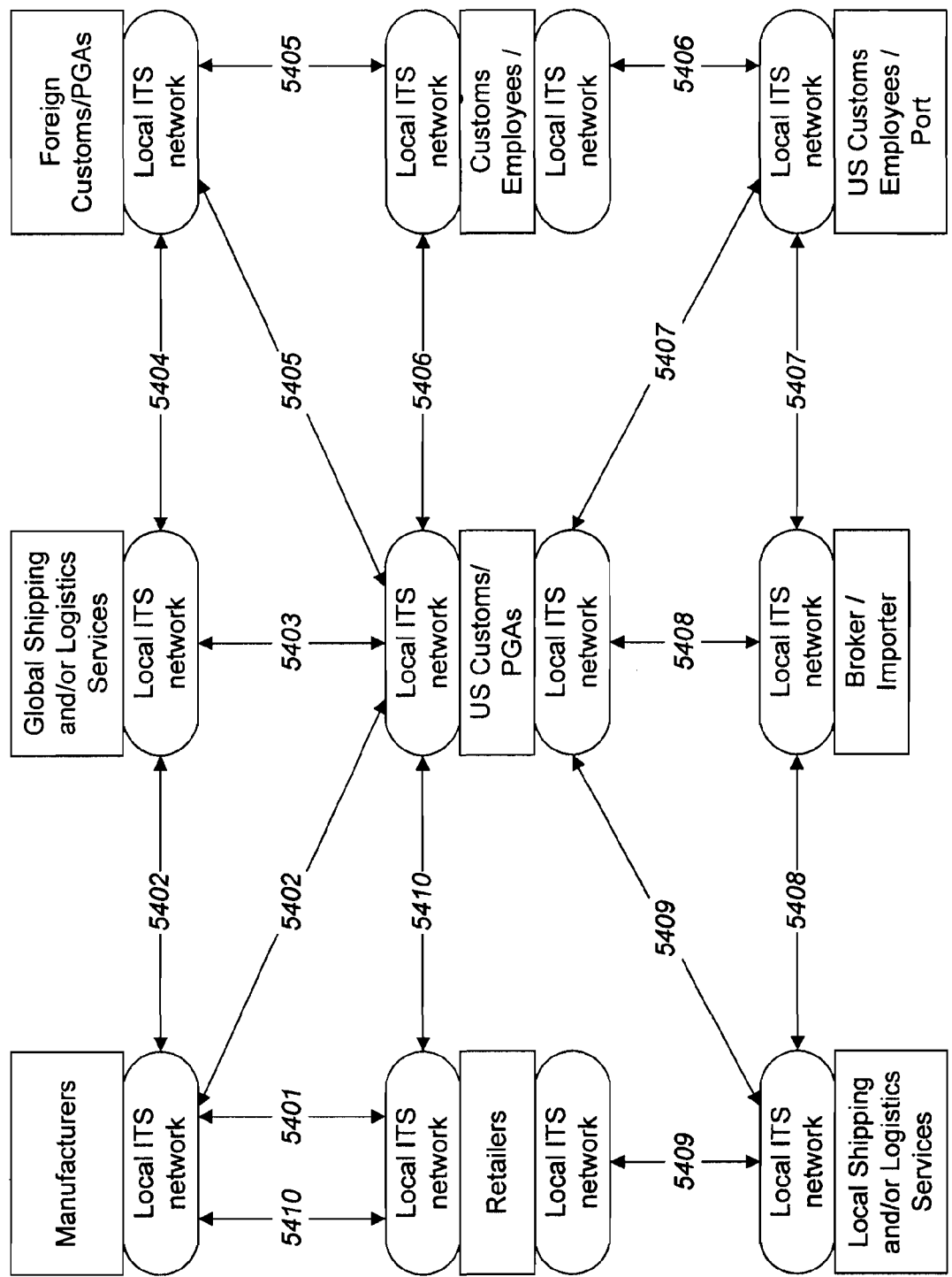
FIG._54

CONTEXT-AWARE AND REAL-TIME ITEM TRACKING SYSTEM ARCHITECTURE AND SCENARIOS

CROSS-REFERENCE TO RELATED APPLICATIONS

This application is a continuation of U.S. application Ser. No. 10/340,208, filed on Jan. 10, 2003 by Peter S. Ebert et al. and entitled "Context-Aware and Real-Time Item Tracking System Architecture and Scenarios," the entirety of which is incorporated by reference herein. U.S. application Ser. No. 10/340,208 is also a continuation-in-part of U.S. patent application Ser. No. 10/137,207 now U.S. Pat. No. 7,151,453, Ser. No. 10/255,115 now abandoned, Ser. No. 10/210,859 now U.S. Pat. No. 7,290,708, Ser. No. 10/285,381 now U.S. Pat. No. 6,843,415, Ser. No. 10/136,852 now U.S. Pat. No. 7,233,958, and Ser. No. 10/232,764 now U.S. Pat. No. 6,901,304, and claims the benefit of each of the foregoing applications under 35 U.S.C. §120 and further claims the benefit of U.S. Patent Applications No. 60/347,672, filed on Jan. 11, 2002, 60/353,198 and 60/353,439, both filed Feb. 1, 2002, under 35 U.S.C. §119. The disclosures of all of the above applications are incorporated by this reference.

BACKGROUND OF THE INVENTION

The present invention relates to tracking tangible items.

A conventional system for tracking tangible items usually includes computing devices and software. Such systems maintain information that indicates the status, such as a current location, of an object being tracked. This can be thought of as a virtual world.

With conventional systems, there can easily be a discrepancy between the actual status of the item and the status as indicated by the system. Discrepancies are often caused by flawed manual data input and system limitations. As a result of such problems, conventional systems can have a distorted and fragmented picture of reality. In addition, most conventional systems see with a very limited scope and resolution, for example, systems that can only distinguish between product classes and quantities and not between individual items.

SUMMARY OF THE INVENTION

This specification describes methods and apparatus, including computer program products, for context-aware and real-time tracking of items.

The word 'item' is used in this specification to refer to a real, tangible, object, so as to avoid ambiguity from use of the word 'object', which will in the following text be used only to refer to a data processing construct.

In general, in one aspect, the invention features systems and methods, and components configured to perform aspects of the methods, for tracking items. A system in accordance with the invention includes a tagging component that includes information specifying standards for tagging one or more items with tags, each tag including a globally unique identifier; an object interface component that includes devices for communicating with the tags and that further includes devices for receiving context information; a context-aware intelligence that includes logic for processing context information and logic specifying actions for the system to perform in response to the context information; and a communication middleware component for communication between and among the components of the system and for communicating with devices external to the system.

In general, in another aspect, the invention features systems and methods, and components configured to perform aspects of the methods, for context-aware and real-time tracking of items. A method in accordance with this aspect performs the actions of receiving multiple instances of tag-read-data, each instance including information read from a tag bound to an item, the information read including a unique digital identifier read automatically from the tag, each instance also including status information including a location of the corresponding tag and its bound item when the unique identifier was read from the tag, the multiple instances of tag-read-data collectively including information read from tags bound to multiple items; receiving one or more instances of context information, each instance describing an associated non-taggable physical circumstance, the context information indicating a status including a location of the circumstance, the multiple instances of context information collectively including information describing multiple circumstances; using the received tag-read-data and context information to maintain virtual items and virtual circumstances in a virtual world, the virtual items including an object for each of the multiple items and the virtual circumstances including an object for each of the multiple circumstances, each of the objects representing the status of its corresponding item or circumstance; and detecting interactions occurring in the virtual world between the circumstances and the items as represented by the virtual items and virtual circumstances.

In general, in another aspect, the invention features systems and methods, and components configured to perform aspects of the methods, for making information available between enterprises. A method in accordance with this aspect performs the actions of receiving from a first enterprise multiple instances of tag-read-data, each instance including information read automatically from a tag bound to an item including at least a unique digital identifier, each instance also including status information including a location of the corresponding tag and its bound item, the multiple instances of tag-read-data received from the first enterprise collectively including information read from tags bound to first multiple items, the tag-read-data including data derived from a first data processing system of the first enterprise; using the tag-read-data received from the first enterprise to maintain virtual representatives in a virtual world, the virtual representatives including a virtual representative for each one of the multiple items, each virtual representative representing the status of its corresponding item; receiving from a second enterprise multiple instances of second tag-read-data, each instance including information read automatically from a tag bound to an item including at least a unique digital identifier, each instance also including status information including a location of the corresponding tag and its bound item, the multiple instances of tag-read-data received from the second enterprise collectively including information read from a tag bound to at least one of the first multiple items, the tag-read-data received from the second enterprise including data derived from a second data processing system of the second enterprise; using the tag-read-data received from the second enterprise to maintain virtual representatives in the virtual world, the virtual representatives including a virtual representative for each of the second multiple items, each a virtual representative representing the status of its corresponding item, where tag-read-data received from either enterprise for a particular item is used to update the virtual representative corresponding to the item; and making available information from updated virtual representatives and from the virtual world to both the first enterprise and the second enterprise.

In general, in another aspect, the invention features systems and methods, and components configured to perform aspects of the methods, for updating information on a writable tag bound to an item. A method in accordance with this aspect performs the actions of receiving in a system first attribute information for a first item, where the first attribute information was derived from data read automatically from a first tag bound to the first item, the first attribute information including a first identifier identifying the first item; receiving in the system second attribute information for a second item, where the second attribute information was derived from data read automatically from a second tag bound to the second item, the second attribute information including a second identifier identifying the second item; receiving in the system sensor information derived from data read automatically from a sensor coupled to the second item; receiving in the system relationship information specifying a relationship between the first item and the second item; maintaining in the system a first and a second virtual item representing the first and the second item, respectively, the objects maintaining information representing the first attribute information and the second attribute information and sensor information, respectively, and maintaining in the system a virtual circumstance representing the relationship between the first and second items; recognizing an alert condition from information in the physical and virtual circumstances, the alert condition relating to the first item; generating updated attribute information to be written to the first item in response to the alert condition; detecting in the system the presence of the first tag at a tag writer station after the alert condition was recognized; and causing the tag writer station to write the updated information to the first tag at the tag writer station upon detecting the presence of the first tag at the tag writer station.

Advantageous implementations can have one or more of the following features. The information in the virtual world about the items and circumstances is mapped to virtual-world-wide standardized dimensions of time, three-dimensional space, and unique identity, whereby the items and circumstances can be tracked relative to each other through space and time. The method also generates an alert for a user of the virtual world whenever a detected interaction is determined to affect any of the multiple items, where the user is a human being or a computer program. The method also maintains in the virtual world a representation of a current location of each of the items and a representation of a current location of each of the circumstances, the representations each reflecting most recently received tag-read-data and context information. The method also represents locations and circumstances by latitudes, longitudes, and altitudes. The method also maintains a history of the locations of items and a history of the locations of the circumstances. The method also derives a prediction from the virtual world of a future location of at least one of the items based on the history of the locations of items. The method also derives the prediction of the future location also based on the history of the locations of the circumstances. The method also maintains in the virtual world a representation of a current state of each of the items and a representation of a current state of each of the circumstances, the representations each reflecting most recently received tag-read-data and context information. The method also maintains a history of the states of items and a history of the states of the circumstances. The method also derives a prediction from the virtual world of a future state for at least one of the items based on the history of the states of items. The method also derives the prediction of the future state also based on the history of the states of the circumstances. The method also associates time stamps with each instance of tag-read-data and context information, each time stamp being synchronized to a single standard. The non-taggable circumstances include a weather-related circumstance; and the location of the weather-related circumstance is described by at least a latitude, longitude, and altitude. The non-taggable circumstances include a traffic accident; and the location of the traffic accident is described by at least a latitude, longitude, and altitude. The method also receives one or more instances of hierarchy information, each instance describing a hierarchy among items represented in the virtual world; and uses the received hierarchy information to maintain in the virtual world virtual circumstances each representing one of the hierarchies. At least one of the hierarchies is a relationship among items in which some particular items are contained within another item. The method also receives sensor information obtained from a sensor associated with a first item; and updates a first virtual item for the first item with the sensor information. The method also receives instances of context information from external systems. The method also receives instances of context information, where the instances include telemetry data from a sensor associated with a particular location. The method also receives telemetry data generated by a sensor associated with a particular point or area and representing a circumstance located at the particular point or area; and generates an alert for a user of the virtual world when the virtual world detects that an item that would be affected by the circumstance represented by the telemetry data is at or in the point or area, as represented in the virtual world, where the user is a human being or a computer program. The method also receives temperature data generated by a temperature sensor associated with a particular point or area and representing the current temperature of the point or area in a virtual circumstance in the virtual world; and generates an alert for a user of the virtual world when the virtual world detects that an item that would be affected by the current temperature is at or in the point or area, as the item and current temperature are represented in the virtual world, where the user is a human being or a computer program. The method also attaches a temperature exception to a virtual item, and causes an action to occur when the temperature exception is satisfied. The action comprises generating an alert for a user, where the user is a human being or a computer program. The method also attaches a rule to a virtual item, the rule being operable to trigger alert events or cause actions depending on current information in the virtual world. The method also attaches a rule to a virtual circumstance, the rule being operable to trigger alert events or cause actions depending on current information in the virtual world. The method also receives, processes, and responds to a query concerning the status of an item at a current or past time as the item is or was represented in the virtual world. The method also receives, processes, and responds to a query concerning the status of items having a particular relationship to a particular item at a current or past time as the items and particular item are or were represented in the virtual world.

In general, in another aspect, the invention features methods and apparatus, including computer program products, for providing multiple enterprises real-time access to information about items in a supply chain. Tags bound to items are read and information read from the tags and location information about the tags is provided by at least two enterprises and used to maintain disposition information about the items, which is made visible to enterprises in the supply chain. The tags can be radio-frequency identification tags having each having an ePC (electronic product code) as unique tag identifier. Visibility of the disposition information can be controlled through authorization. Visible information can include relationships between particular items and business documents such as order and shipping documents. With shipping documents visible, information read from item tags can be used to confirm the identity or completeness of a shipment. A system in accordance with the invention includes means for receiving from a first enterprise multiple instances of tag-read-data, each instance including information read from a tag bound to an item, the information read including a unique tag identifier read automatically from the tag, each instance also including a location of the corresponding tag and its bound item when the tag identifier was read from the tag, the multiple instances of tag-read-data received from the first enterprise collectively including information read from tags bound to multiple items; means for using the tag-read-data received from the first enterprise to maintain disposition information for the items; means for receiving from a second enterprise multiple instances of second tag-read-data, each instance including information read from a tag bound to an item, the information read including a unique tag identifier read automatically from the tag, each instance also including a location of the corresponding tag and its bound item when the tag identifier was read from the tag, the multiple instances of tag-read-data received from the second enterprise collectively including information read from tags bound to at least one of the multiple items; means for using the tag-read-data received from the second enterprise to maintain disposition information for the items, where tag-read-data received from either enterprise for a particular item is used to update the disposition information; and means for making the disposition information visible to the multiple enterprises in the supply chain, including the first and second enterprises.

Advantageous implementations of the system can include additional features. The system can include means for receiving from a third enterprise multiple instances of third tag-read-data, each instance including information read from a tag bound to an item, the information read including a unique tag identifier read automatically from the tag, each instance also including a location of the corresponding tag and its bound item when the tag identifier was read from the tag, the multiple instances of tag-read-data received from the third enterprise collectively including information read from tags bound to at least one of the multiple items; and means for using the tag-read-data received from the third enterprise to maintain disposition information for the items, where tag-read-data received from any enterprise for a particular item is used to update the disposition information. The system can be implemented so that the tags bound to the multiple items include radio frequency identification (RFID) tags, each RFID tag carrying an electronic product code (ePC) as the unique tag identifier. The system can be implemented so that the visibility is controlled visibility; and the system further includes means for receiving authorization information indicating the extent to which the disposition information should be made visible to a particular enterprise within the supply chain; and means for making visible to the particular enterprise only the disposition information which is permitted by the authorization information. The system can be implemented so that the disposition information includes a plurality of item attributes; and the authorization information specifies, for at least one of the item attributes, the enterprises to which the item attribute can be made visible. The system can be implemented so that the multiple enterprises include a source enterprise and a destination enterprise; the source enterprise has an order document for an order placed by the destination enterprise and a shipping document for a physical shipment of goods prepared to satisfy the order placed by the destination enterprise; visibility includes visibility of relationships between the tag-read-data and business documents including the order document and the shipping document; and means for providing the enterprises with real-time visibility of the disposition of items further include means for receiving shipping information including the following: tag identifiers for items corresponding to goods in the shipment; information associating each tag identifier with a shipment number for the shipping document, and information associating the shipment number with an order number for the order document; means for correlating the tag-read-data with the shipping information; and means for making the correlations available to the destination enterprise such that the destination enterprise can use a tag identifier for an item in the shipment to confirm the shipment.

In general, in another aspect, the invention features methods and apparatus, including computer program products, for communicating between nodes of a distributed system that tracks items. The system includes a node hierarchy at a first enterprise, the node hierarchy including one or more parent nodes and one or more local nodes, each local node being a child of a parent node; and a node hierarchy at a second enterprise, the node hierarchy including one or more parent nodes and one or more local nodes, each local node being a child of a parent node. Within the system, each node maintains a mapping between a plurality of items and responsible nodes. The mapping specifies for each item, at least one parent node that is a designated responsible node for the item and for at least two items, different designated responsible nodes. Each node is operable to receive multiple instances of tag-read-data, each instance including information read from a tag bound to an item, the information read including a unique tag identifier read automatically from the tag, each instance also including a location of the corresponding tag and its bound item when the tag identifier was read from the tag, the multiple instances of tag-read-data collectively including information read from multiple tags bound to multiple items; and for each instance of tag-read-data. Each node is operable to communicate the tag-read-data to the designated responsible node as specified by the mapping maintained by the node.

Advantageous implementations of the system can include additional features. The system can be implemented so that the mapping established at a first node differs from the mapping established at a second node. The system can be implemented so that after tag-read-data is communicated from a node to the designated responsible node for the item, the node receives additional information about the item from the designated responsible node and updates disposition information for the item to reflect the received additional information. The multiple items for which tag-read-data is received can have a hierarchical relationship with each other. The tag identifier can specify a manufacturer or product class of the item.

In general, in another aspect, the invention features methods and apparatus, including computer program products, for communicating item disposition information in a distributed system. The system includes a monitoring system, one or more subscribers, including a system that tracks tagged items, and one or more event routers. The monitoring system is operable to detect one or more of the tagged items, generate an event, the event including a tag identifier, a reader identifier, and a timestamp, and publish the event to one or more of the event routers. The system for tracking tagged items is operable to subscribe to receive from one or more of the event routers events relating to one or more of the tagged items, and upon receiving events, use the received events to update disposition information for one or more of the tagged items.

Each event router is operable to maintain a list of subscribers, receive events from the monitoring system, and send events to the subscribers.

In general, in another aspect, the invention features methods and apparatus, including computer program products, for data transfer between sensor or actuator devices and higher-level applications. A computer program product in accordance with this invention is operable to cause data processing apparatus to receive a set of rules, the rules specifying what data to furnish to an external application; receive item data including item identifiers from one or more tag readers, each item identifier being read from a digital tag bound to a physical item, the item identifier uniquely identifying the item; receive additional item data from other sensor devices, the other sensor devices being devices other than tag readers, the additional item data containing additional physical item attributes besides an item identifier, the additional item data being related to one or more items identified by the tag readers; use the rules, item identifiers, and additional item data to determine which subset of the item identifiers and additional item data to furnish to the external application; and furnish to the external application data consisting of only the subset of the received item identifiers and additional item data. The computer program product is further operable to receive data from the external application, the data including configuration data for controlling an actuator device; convert the configuration data to a format compatible with the actuator device; and furnish the converted configuration data to the actuator device.

In general, in another aspect, the invention features systems and methods for communicating tracking information. The methods include receiving a plurality of identification codes, each identification code uniquely identifying an associated virtual item; sorting the plurality of identification codes into one or more sets of identification codes; recognizing a redundant portion of code that is common to each identification code within a set of identification codes; creating a document containing the one or more sets of identification codes; and organizing the document in a hierarchical structure such that for each set of identification codes, the redundant portion is listed once and each identification code is listed with the redundant portion omitted.

In general, in another aspect, the invention features systems and methods for filtering tracking information. The methods include retrieving a plurality of identification codes associated with a plurality of virtual items, the virtual items including items and containers of items, each identification code being a string of characters that uniquely identify the associated virtual item; locating a character within each identification code that indicates whether the associated object is an item or a container; and based on the located character, determining whether each identification code corresponds to an item or a container.

In general, in another aspect, the invention features systems and methods for communicating tracking information about items. The methods include creating tracking information for a collection of items, the tracking information representing each of the items as one or more attributes and optional corresponding values; encoding the tracking information by encoding each instance of each distinct attribute in the tracking information with its corresponding distinct coding scheme; sending the encoded tracking information to a recipient; determining which attributes the recipient is authorized to access; and providing the recipient with a subset of the coding schemes, the subset including only coding schemes for attributes that the recipient is authorized to access.

The invention can be implemented to realize one or more of the following advantages. A system in accordance with the invention can be aware of a virtually unlimited number of items as well as of other things in the real world and relationships between and among items and other things. The system can be implemented at a wide range of scales. The architecture of the system is easy to work with and can be put to a wide variety of applications simultaneously. The architecture supports the tracking of pretty much anything as an item or as a circumstance that influences an item. Similarly, the architecture permits every kind of attribute to be associated with a tracked item or circumstance. Hierarchical and other relationships can be defined between or among tracked things and used for tracking things in the relationships. The architecture is open to any kinds of data sources, including all kinds of sensors and scanners, as well as systems that provide circumstantial information, for example, weather, traffic conditions, transportation schedules such as air and rail schedules, time of arrival data, and so on. The system provides a generic and intelligent glue between the real world and a virtual world that can be used to provide context-aware and real-time tracking of items.

The system inherently integrates context-aware intelligence. Such intelligence enables the system to know which geospatial events will affect which of the items being tracked and take action in response to such events. The system can provide dynamic context-aware intelligence with generic geospatial abilities. Based on available data and telemetry, the system can understand where, how, and what items are at a specific time in relation to each other and, furthermore, invoke actions according to defined rules.

The system can be integrated with existing software and hardware systems using non-proprietary, open interfaces. With such interfaces, the system is compatible with existing systems without the need for plug-ins or upgrades into the existing systems. For example, the system can provide non-proprietary, open interfaces to integrate virtually every kind of tag, tag reader, scanner, sensor, and application. The system can be implemented to include applications that can generically read data from, and write data to, item tags. The system can include generic tracking of real-time telemetry. The system can integrate existing Geographical Information Systems ("GIS") and data.

The system supports development of a whole range of new or enhanced applications across industries. Such applications include and are not limited to those relating to supply chain management, asset tracking and management, security and access control, transportation, toll collection, point of sale, and baggage handling.

The system is scalable from a local to a global level. That is, the system can be implemented to support a business unit, a single company, or a group of companies, in one or more industries. The system can track items and circumstances in real time. The system can provide current and past state of items or groups of items and can do so remotely, for example, through wireless communication or through a network such as the Internet.

Through a variety of initiatives, in the future a large number of items of all kinds will be uniquely tagged and identifiable globally, in many cases through automatically operating sensors. The system can operate across industries and companies to provide smart, enterprise-level item tracking solutions. The system provides open, generic, and configurable business methods that can be applied across multiple industries and applications. The business methods allow customers to define generically and introduce virtual representations of items to a software system over a network, attach rules that invoke actions based on dynamic context data, and query the system for a multitude of attributes related to, or derived from, the present and past contexts of the tracked objects. Tracking data can be shared among partners based on field-level authentication definitions.

The system is accessible to users and external applications through non-proprietary interfaces, e.g., Web browsers or self-describing documents such as XML (Extensible Markup Language) documents. The system can track a large number of uniquely tagged items and their telemetry data, if any, through time and space. The system provides open, non-proprietary interfaces for sensors, devices, and services that track and provide the location of, and/or telemetry data from, items or their environment to the system. The system also provides open, non-proprietary interfaces for sensors, devices, and services that write data to physical items or their tags that can receive such data. The system provides user interfaces, application interfaces, and tools to define virtual representations of uniquely tagged items and hierarchies of them, including specific attributes and methods; to define rules that can invoke actions based on dynamic context data known to the system; to define virtual representations of physical constraints or other influences that can affect items; to define sophisticated data access filter settings on an attribute level of data objects representing items and other real-world things; to query the system for, and to visualize, a multitude of characteristic related to, or derived from, the present and past contexts of the tracked items; and to share item-related data between or among partners over a network.

The system can be used by diverse entities for their own purposes, and each entity can make part or all of the information about its tagged items, its data input devices, and its tracked circumstances visible to other entities using the system. The other entities can use this information and get the benefit of the experience and history of the entire community of users of the system, regardless of the purposes for which the information was originally gathered or provided, and without requiring in any respect that the future uses and benefits of the various contributions, or their advantageous interactions, be contemplated at the time the contributions are made.

The system enables early discovery of manual errors made during shipment process such as during the preparation of shipments or the loading of trucks. The system provides maximum visibility of the actual disposition of goods in a supply chain. The system permanently archives all history to support reliability, warrantee, customer returns, proof of theft, and other business processes. The system integrates with existing systems to avoid duplication of functionality. The system enables as much automatic functionality as possible that benefits from tags used to track items, for example, by enable billing based on sensing shipment at customer destination.

The system can operate continuously, 365 days a year, 24 hours a day. Software upgrades can be performed dynamically without taking the entire system off-line. The data can be stored in a generic structure that does not change even if the semantic structure of the data changes. In the event of failure, low-latency recovery mechanisms enable the system to recover quickly.

The system can be scaled to support a high volume of users. The mechanism for making changes to the data can operate out of band from the mechanism for making queries on the data. Queries can be limited to prior states of the data so that the current state is not overburdened by too many queries.

The system requires only a low level of data communication between nodes while ensuring an up-to date synchronized view of the location and disposition of each tracked item moving between the geographically distributed nodes of the system. The system permits continued business operations at a local node even when communications from the local node to the rest of the system are inoperative. The system ensures that once a disconnected node is reconnected, unreported data gathered by the disconnected node is reliably communicated to the rest of the system and changes received by other nodes are reliably communicated to the disconnected node. Additionally, communication volume and item history storage costs are reduced by reporting only the movements of the top-level items in a hierarchy of items.

The system can receive data from billions of smart items in real time without having to expend a lot of processing power to perform the collection and filtering. The smart items do not need to be confined to a single factory or store. The system can collect data from many geographically-dispersed locations. The system does not need to support a hardware-specific interface for every possible type of smart item. The system can be easily extended to accommodate new communication channels and new hardware interfaces. Business rules enable the system to adapt to new configurations and scenarios without the need for a software engineer to reprogram the operations.

The system can be used to enable adaptive real-time inventory management. Instead of receiving periodic reports of aggregated inventory changes, the system enables inventory changes to be reported real-time and without human intervention. Instead of replenishment planning occurring only according to a fixed schedule, the timing of replenishment planning can be adaptive, occurring more or less frequently depending on the reported real-time inventory levels.

The system can mask the redundant portion of a UID to save memory or bandwidth during communications. The system can receive a set of UIDs read from different types of items and be able determine which type of item is identified by a particular UID. From this determination, the system can filter out UIDs pertaining to certain item types and provide a recipient with a filtered set of UIDs pertaining to only certain types of items.

The system can provide selective access to tracking information. The system can provide the convenience of being able to send the same tracking information to all consumers, but at the same time, provide different levels of access to the information depending on the authorization level of the consumer. Specifically, the system can encode the tracking information, but only provide a given consumer with the means to decode a portion of the tracking information.

The encoding system can provide not only control of access but also efficient communication of the information. The system can replace descriptive text within the tracking information with coded text that is shorter than the descriptive text. If the tracking information is stored on a tag, this enables more information to be stored on the tag. If the tracking information is communicated across a network, this reduces the amount of bandwidth consumed by the information.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 9 is a flow diagram illustrating a feed operation.

FIG. 10 is a block diagram illustrating one scenario of alert recognition and data flow to and from a tag.

FIG. 11 is a block diagram illustrating another scenario of alert recognition and data flow to and from a tag.

FIG. 12 is a flow diagram illustrating one aspect of a process of data flow.

FIG. 13 is a flow diagram illustrating another aspect of a process of data flow.

FIG. 14 is a block diagram illustrating one implementation of the system.

FIG. 15 is a block diagram illustrating software components within the system.

FIG. 16 is a block diagram illustrating mechanisms for storing, changing and querying the tracking information.

FIG. 17 is a block diagram illustrating property list functionality.

FIG. 18 is a block diagram illustrating a shipment scenario.

FIG. 19 is a block diagram illustrating another shipment scenario.

FIG. 20 is a block diagram illustrating mechanisms for data recovery.

FIG. 21 is a block diagram illustrating a mechanism for responding to queries.

FIG. 22 is a block diagram illustrating a mechanism for responding to queries.

FIG. 23 is a block diagram illustrating a mechanism for responding to queries.

FIG. 24 is a block diagram illustrating a mechanism for responding to queries.

FIG. 25 is a block diagram illustrating a mechanism for responding to queries.

FIG. 26 is a block diagram illustrating a large scale implementation of the infrastructure.

FIG. 27 is a block diagram illustrating a world model structure.

FIG. 28 is a block diagram illustrating an authorization model.

FIG. 29 is a block diagram illustrating a world model structure.

FIG. 30 is a block diagram illustrating a parent node implemented as a cluster.

FIG. 31 is a block diagram illustrating an implementation of the system.

FIG. 32 is a block diagram illustrating an implementation using multiple integration engines in a hierarchical fashion.

FIG. 33 is a block diagram illustrating an integration engine.

FIG. 34 is a block diagram illustrating a hardware interface.

FIG. 35 is a block diagram illustrating an electronic tag.

FIG. 36 is a block diagram of the basic structure of an inventory management system implemented with an item tracking system in accordance with the invention.

FIG. 37 is a block diagram of an implementation that uses event routing.

FIG. 38 is a diagram of a topic structure for event routing.

FIG. 39 is a diagram of a protocol flow for publication.

FIG. 40 is a diagram of a protocol flow for subscription.

FIG. 41 is a block diagram of an object naming service for locating event routers.

FIG. 42 is an illustration of using an event router to distribute between multiple item tracking systems.

FIG. 43 is a block diagram of a system for communications between a producer and a consumer.

FIG. 44 is a block diagram of a system for communications between a producer and a consumer using a shared item tracking system.

FIG. 45 is a flow diagram of a method for communicating tracking information.

FIG. 46 is an illustration of the structure of an electronic product code (ePC).

FIG. 47 is an illustration of a shipment document without masking.

FIG. 48 is an illustration of a shipment document with masking.

FIG. 49 is a flow diagram of a method for filtering tracking information.

FIG. 50 is a flow diagram of a method for communicating tracking information.

FIG. 51 is a flow diagram of a method for accessing tracking information.

FIG. 52 is an illustration of a system of documents, index tables, and encoded documents used in communicating tracking information.

FIG. 53 is a flow diagram of a method for checking that the appropriate index table is used to create an Encoded XML document.

FIG. 54 is a block diagram illustrating and exemplary information flow between customs services and other agencies and businesses.

Like reference numbers and designations in the various drawings indicate like elements.

DETAILED DESCRIPTION

Figures 1, 2:
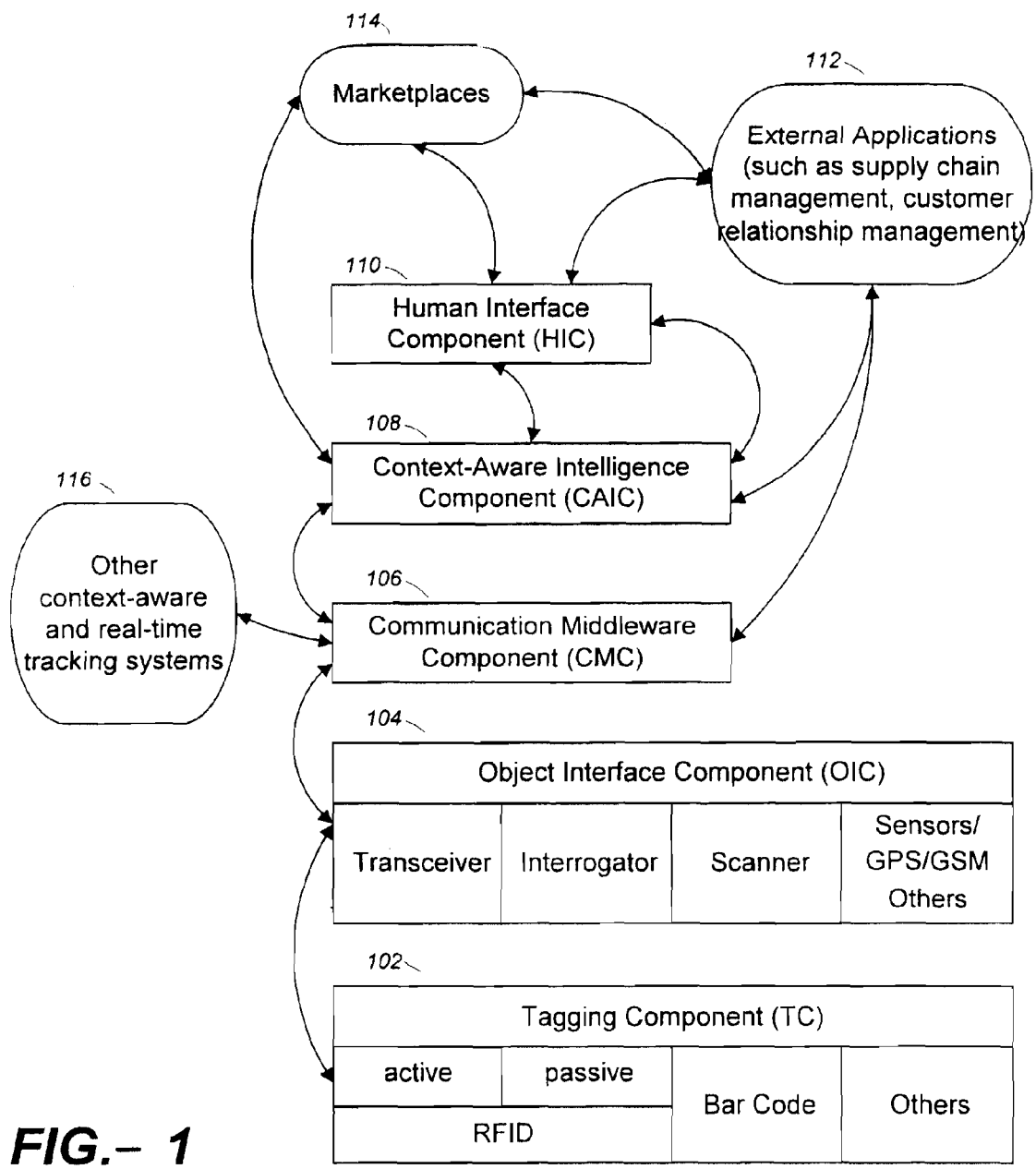
FIG. 1 is a block diagram illustrating a system in accordance with the invention.
FIG. 2 shows an example of a unique identification code.

Table of Contents
1. System Overview
2. One implementation of the System
   2.1. Cross-Enterprise Shipment Scenarios
   2.2. Bi-Directional Data Flow
3. Another Implementation of the System
   3.1. Software Upgrades
   3.2. Cross-Enterprise Visibility
   3.3. Data Communication and Coherence Between World Models
   3.4. Per-item Identification Scenario in International Trade
   3.5. Item Scenarios
   3.6. Information Retrieval Scenarios
4. Data Transfer between the Item Tracking Systems and the Tag Readers
   4.1. Event Routers
   4.2. Integration Engines
5. Compression, Filtering, and Encoding of Tracking Information 1. System Overview A system in accordance with the invention receives information in an open, non-proprietary form, concerning items and circumstances affecting items. In this specification, the term 'item' has a very broad meaning. It encompasses the meaning of the term 'item' as used in the above referenced patent applications. For compatibility with ERP (enterprise resource planning), SCM (supply chain management), and logistics systems, the notion of an item includes everything normally implied when an item appears on a bill of materials, bill of lading, packing list, pick list, and so on. Thus, it includes any physical object that might have a location, be shipped, be sold to a consumer, and so on. It can also include any asset that is likely to be referenced in a corporate accounting or other business system, such as a shipment.

A tagged item is an item that carries a self-identifying tag. The tag might be associated with a single item (in the sense above) or it might be associated with a collection of items. Thus, to give just a few examples, a tagged item can be any of the following: an individual item, like a bottle of soap; an asset, like a tagged laptop; a case containing a collection of items of possibly various types, or a pallet containing many cases, and so on; a container; a truck or trailer; an airplane; a ship; and a railroad car.

In the consumer goods and other areas, an item may not have any kind of item-specific tag. For example, a tagged case may include 48 bottles of soap, each of which has a bar code with the same UPC (universal product code) or SKU (stock keeping unit) or other product number and each of which can be sold to a customer separately. A tracking system can correlate shipments that were tracked at the tag level with point of sale receipts which track individually priced items. Bar codes will not normally carry a UID (unique system identifier), just an item type or SKU. The system can make some assumptions relating bar code data with tag data. Tagged case-level inventory at a supermarket or retailer can benefit from regular inventories using a tag reader. Once a case disappears from inventory, the system assumes that the contents have been put on a retail shelf and may be sold in arbitrary order. If individual items are not identified, there is no way to carry the accuracy of the tracking system beyond the point where the tagged cases are opened.

Generally, a tag is an RFID (radio frequency identification) tag, but it need not be based on RF technology. For example, a tag can be implemented to be read by optical, magnetic, opto-magnetic, or other technology, either with or without physical contact between the tag and the reader. Moreover, the tag can be passive (containing no internal power source for communications and data transmission) or active; and it can have processing capacity or not. In this specification, a tag should be understood to be a digitally identifiable tag, meaning that the tag has the property that a unique digital identity can be read directly from the tag using some kind of reader. Some digitally identifiable tags can also be written, these offer extra advantages in cases where information needs to be made available without dependence on a communication network.

In this specification, the term 'virtual item' will be used to refer to data that corresponds to and is used as a representation of an item. Similarly, the term 'virtual circumstance' will be used to refer to data that corresponds to and is used as a representation of tangible and intangible things, including, by way of example, relationships and events. A virtual item or a virtual circumstance can be implemented as an object in the object-oriented programming sense of the term; however, it can also be implemented in any other convenient way, for example, by a record in a database.

Generally, virtual circumstances are created and maintained because they represent something—which may generically be called a circumstance—that has the potential of affecting an item represented by a virtual item. One example of circumstances are geospatial events, which can include, for example, hurricanes which can impede the transit of a transport ship carrying the items being tracked, a labor strike which can prevent the unloading of the items from the transport ship, and a traffic accident which can delay delivery of the items.

The term hierarchies refers to associations or relationships between and among items and circumstances. For example, given a can in a pallet of cans, events that affect the pallet also affect the can. Virtual circumstances can represent hierarchies.

The system receives information from a variety of sources, which can be coupled to the system through a network such as the Internet or directly. The system can be configured to receive information from sources with proprietary or non-open interfaces, in which case the format of the information is converted to be compatible with the system. The system includes data input devices, for example, tag readers, sensors, and scanners. Through such devices, the system can continuously track and log the state of the articles and circumstances represented by physical and context objects. The state of an article can includes its status, attributes, and location.

2. One Implementation of the System

As shown in FIG. 1, an item tracking system (ITS) in accordance with the invention can be implemented with a Tagging Component ("TC") 102, an Object Interface Component ("OIC") 104, a Communication Middleware Component ("CMC") 106, a Context-Aware Intelligence Component ("CAIC") 108, and a Human Interface Component ("HIC") 110. In an alternative implementation, the HIC 110 is integrated with the other components. Each of these components can be implemented as computer programs executing on one or more computers and controlling devices performing data acquisition, output, and transmission functions. FIG. 1 also shows communication flows (represented by arrows) between and among the components of the ITS as well as between the system and external applications 112, external marketplaces 114, and other, external ITSs 116. The communication flows can be implemented in any convenient, open fashion, such as through the exchange of XML documents.

The components are arranged in a distributed, real-time, and event-based architecture. Each or all components or any combination of the system's components can be implemented on a micro up to a macro level. Micro level implementation refers to implementation on a single device and macro level implementation refers to implementation on multiple devices such as computers in a network. Each component can be distributed across multiple devices, including computers, that are interconnected by a network. Each component can be made up of, that is, implemented as, multiple different applications, which in the aggregate perform the functions of the component. The described component architecture allows the system to group and scale functionality from a local to a global level while assuring that hardware and software can be readily integrating using non-proprietary, standard interfaces.

A component can include software systems—which includes any software, applications, computer program products—and related devices. For example, a software system can be applications and servers operating on an enterprise-level. Communication between or among software systems can take place through a communications network. The components expose non-proprietary, open interfaces for services that are accessible through a network, such as one based on open standards like XML over HTTP. The following text further describes the components.

Tagging Component

Items introduced to the system are tagged with a unique identifier by any available item-level tagging technology, for example, active and passive Radio Frequency Identification ("RFID") tags, barcodes, and tags that can be applied on a molecular basis.

When the system first becomes aware of an item or circumstance, it will be said to be introduced to the system; and a corresponding object is created (i.e., virtual item or virtual circumstance). The system assigns a specific dynamic n-dimensional context and attribute space to introduced objects. For example, the system can assign owner, price, lot number, and temperature to an introduced object. Optionally, the system attaches specific rules to the introduced objects. For example, the system can attach a rule specifying that if the temperature of the corresponding item reaches level y, then cause action z.

The TC 102 of a particular implementation specifies in an open way which tagging technologies can be used with the system and how they are used. The TC 102 includes a distributed knowledge system based on Internet technology. Specifically, the TC 102 generally will include and provide a specification of the globally unique identifier and how to apply it; catalogues describing the specifications of compliant tags, their reader/writer hardware and all aspects concerning their use; specific standards and laws that apply to the tagging of items; specifications of standardized communication and context data formats and interfaces; specifications of read and write processes, processing and transmission requirements for active tags, and telemetry data specifications; best industry practices, that is, knowledge relating to selection and deployment of tags and tag content; security and authorization requirements and standards; benchmarks; implementation guides; and frequently asked questions.

In addition, the TC 102 can provide tools, content, software development kits, and applications that enable manufacturers, system integrators, and customers to identify, validate, and implement optimal item-tag-reader/writer combinations and standards for specific scenarios. The TC 102 can be built with any software development environment to fulfill the above-mentioned requirements.

Object Interface Component

The OIC 104 transforms data from attached hardware to the system and vice versa. The OIC 104 can also perform any required local processing.

The OIC 104 is a sophisticated, generic, bi-directional, and smart software interface between the system and the real world. Here, objects are introduced to the system and their status and telemetry data are received, filtered, transformed, pre-processed, and processed as necessary. Because objects can be implemented to carry rules that can trigger alert events or cause actions depending on current context or status data, the OIC 104 can be implemented to embed or link to a rule engine to process these kinds of rules. By customizing the OIC 104, customers can specify what the OIC 104 should do if one of the customer's tag readers detects an item tag—which will have an identifier that the system can map to a unique system identifier ("UID")—for the first time. Such actions can include communication with external applications, for example, ERP (Enterprise Resource Planning) applications.

The OIC 104 also generically specifies and validates how tag interface hardware, for example, RFID readers, barcode scanners, polymer tag readers, and sensors, and its operating software communicate with the system. Consequently, the OIC 104 acts as a generic software wrapper around all tag-specific read/write devices, which provides standardized integration; data validation, filtering, and transformation; bi-directional, event-based secure communication; and data pre-processing.

Because the OIC 104 is not only able to receive data but also can send data to hardware and software attached to the system, and ultimately to the tagged items themselves, the system can use the OIC to write data to such items or control them remotely, if they are configured for such control.

The OIC 104 can apply and enforce a sophisticated security scheme for all inbound and outbound communication, for example, one based on digital certificates. The OIC 104 can be built with any software development environment that fulfills the above-mentioned requirements.

Communication Middleware Component

The components communicate by sending and receiving standardized events, which the components can send and receive through a network. The CMC 106 validates and routes standardized events between the OIC 104 and the CAIC 108 (which will be described below) and, in general, between or among any of the system components. The CMC 106 can also validate and route standardized events between or among any of the system components and other applications, devices, and components.

The CMC 106 performs functions such as data and authentication validation, storage and retrieving, archiving, data decryption/encryption, and multicasting of events. The CMC 106 can apply and enforce a sophisticated security scheme for all inbound and outbound communication, e.g., one based on digital certificates. The CMC 106 can be built with any software development environment that fulfills the above-mentioned requirements.

Context-Aware Intelligence Component

The CAIC 108 includes logic that provides the intelligence for the system to receive, process, and respond to queries concerning what, where, and how tagged items represented by introduced objects are, were, or will be at a specific time in relation to each other or in relation to features of the real world. The CAIC 108 offers open internal and external interfaces to plug-in additional features such as applications and rules, extending its generic set of services.

As mentioned earlier, the system can include virtual circumstances that represent events that potentially can affect items. Examples of such events include hurricanes, points or areas of high temperatures, and slow traffic. Virtual circumstances can also describe a specific relationship between or among items. Virtual circumstances can also describe attributes of items. Examples of attributes include a geospatial route, a velocity, and a destination. Telemetry readings of sensors can also be introduced as virtual circumstances.

The CAIC 108 includes a database that allows the system to store and retrieve the current state of introduced objects as well as the history of state changes of these objects. This database can process geospatial data and can be distributed over multiple computers and multiple sites.

The CAIC 108 can apply and enforce a sophisticated security scheme, such as one based on digital certificates, for all inbound and outbound communications. The CAIC 108 can be built with any software development environment that fulfills the above-mentioned requirements.

Human Interface Component

The HIC 110 generically integrates a multitude of technologies suited to allow human beings easy access to and control of the system. These technologies include, e.g., HTML or XML-based, voice controlled, stylus controlled and multi-modal human interfaces including all kinds of data visualization technologies and the like. The HIC 110 separates the application and infrastructure layer from the representation and human interaction layer.

The HIC 110 can apply and enforce a sophisticated security scheme, such as one based on digital certificates, for all inbound and outbound communication. The HIC 110 can be built with any software development environment that fulfills the above-mentioned requirements.

Introducing Objects to the System

In operation, objects (e.g., virtual items and virtual circumstances) can be introduced to the system using standardized parameterized events that include at least a system UID. Additionally, specific attributes, methods, and rules can be attached to the introduced object (e.g., current temperature, current owner, manufacturer, temperature exceptions, alerts, rules, data access, and authority specifications).

Unique Identifier

The system maps all introduced objects to a system UID. For the system to be able to scale from a local to a global level and also integrate satisfactorily with other systems, this identifier should be globally unique. If the referent of the object has a tag with an identifier that is globally unique, that identifier can be—but need not be—used as the UID. One such unique identifier is the Electronic Product Code (ePC) of the MIT (Massachusetts Institute of Technology) AutoID Center. FIG. 2A illustrates the format of the ePC.

The system can partition the UID to enhance search performance.

One way of uniquely tagging items is to attach RFID chips to them. These electronic chips hold at least a relatively unique identifier that can be read by specific reader devices. More sophisticated chips feature dynamic data storage with external read/write abilities and smart chips include built-in processing power. One advantage of RFID technology is the ability to automatically identify a multitude of items over a distance without the need to disassemble or unpack them. Alternatively, the system can use other technologies, such as item-level bar codes, magnetic tags, and polymer tags, to tag virtual items with identifiers that can be mapped to a system UID.

Events

The system communicates internally and externally by using events. Table 1 provides an example an XML document representing such an event. Any convenient form of representing events can be used.

TABLE 1

```
<event>
    <type>SEEN_OBJECT</type>
    <parameters>
        <sender>
            <UID>xx.xxxxxxx.xxxxxx.xxxxxxxxx</UID>
            <type>RFID_READER</type>
        </sender>
        <telemetry>
            <UID>xx.xxxxxxx.xxxxxx.xxxxxxxxy</UID>
            <temperature>
                <unit>C</unit>
                <value>45.43</value>
            </temperature>
        </telemetry>
    </parameters>
</event>
```

Time, Space, Unique Identity, Context, Hierarchy

The system maps every introduced object to system-wide standardized dimensions of time, space (3-D), unique identity (UID), and context. The system saves input data with system-wide synchronized time stamps. Space refers to everything from a point (pure location) to a complex three-dimensional polyhedron in a three-dimensional space (representing, e.g., location, size, and shape of an item). Context can be n-dimensional (representing, e.g., attributes such as temperature, velocity, and weight).

Each dimension is measured in system-wide standard units, e.g., units based on international standards like Coordinated Universal Time ("UTC"), and the International System of Units ("SI").

Because time and space are universal dimensions, the system's core space is compatible with all other systems, such as GIS, that also work in these dimensions or subsets of them. Introduced objects can be part of dynamic hierarchies. Hierarchies can be described by virtual circumstances.

Based on internal or external event data, the system tracks and logs the state of items represented by introduced objects within the above-described space. It is then able to answer questions or provide alerts about the state of, and relationships between, introduced objects in that space, such as:

Where was item (UID) on Dec. 12, 2001?

Where are all items (UID) of type x within a radius of y of address z?

Which of my supplies are affected by tropical storm x?

Where are the nearest spare parts for asset x and how fast could they be delivered to plant y?

Where are all delivered products with lot number x right now?

Where is the nearest demand for my products x with an expiration date before y?

Alert! Chemical assets x and y are stored too close to each other.

Alert! Employee x is not allowed to carry laptop y out of building z.

Based on historical data, statistical or other methods, the system can also derive the future state or behavior of introduced objects or groups of them.

Direct or Derived Location Data

The location of items can be described to the system in a variety of ways. An example for a direct description is a latitude, longitude, and altitude data set configured in a standard way.

An example for a derived location description is the street address of a facility where a tag reader is located. The system maps the street address of the tag reader to the system's standard coordinate system, assumes that the item (as represented by its UID) encountered by the tag reader is near the tag reader, and associates the reader's location with the item's location.

Object-Level Data Access Authorization Model

The object model may include a UID, attributes, and a definition of which system users have read/write/change authorities of which attributes, methods, and rules. The system assigns to each of its users a globally unique identifier, which may be based on the Electronic Product Code (ePC), the EPC Manager part of the ePC, or the like.

Depending on the assigned authorization and using standardized parameterized events, system users write, read, and change data of introduced objects. Object data access is dependent on defined authorization settings. Table 2 provides an example an XML document representing a virtual item implementing the described authorization model. This is just an example, however, and any convenient representation can be used.

TABLE 2

```
<virtual_item>
    <UID>xx.xxxxxxx.xxxxxx.xxxxxxxxx</UID>
    <current_owner>
        <OUID>xxxxxxx</OUID>
        <change_authorization>
            <OUID>xxxxxxx</OUID>
```

TABLE 2-continued

```
        </change_authorization>
    </current_owner>
    <price>
        <unit>USD</unit>
        <value>230000</value>
        <read_authorization>
            <OUID>xxxxxxx</OUID>
            <OUID>yyyyyyy</OUID>
            <OUID>zzzzzzz</OUID>
        </read_authorization>
        <write_authorization>
            <OUID>xxxxxxx</OUID>
        </write_authorization>
        <change_authorization>
            <OUID>xxxxxxx</OUID>
        </change_authorization>
    </price>
</virtual_item>
```

Communication Security Scheme

The system includes a generic authentication and security scheme (such as one based on digital certificates and encryption) for communication with and between the components and for communication to other systems and external devices.

2.1 Cross-Enterprise Shipment Scenarios

One scenario will now be described in which the system tracks and logs location and temperature of high quality fish products that a Shipper Y is transporting from a Manufacturer X to a Retailer Z.

The following generally describes how the system accomplishes the described functions. Manufacturer X boxes the products and attaches a RFID tag to each box. The RFID tag includes a UID and, in addition, can store an expiration date, a maximum temperature threshold, and a maximum encountered temperature reading ($T_{max}$). Manufacturer X loads the boxes on pallets and attaches an active, recyclable temperature-sensor device to each pallet. Alternatively, and at greater expense, such a sensor could be attached to each box. These devices have an RFID tag attached that includes a UID and, in addition, can store temperature readings and a maximum encountered temperature reading ($T_{max}$). The devices periodically measure the current temperature and store the readings on their attached RFID tag. Alerts are triggered when temperature exceeds a specific threshold. Upon arrival at the retailer, updated expiration dates and maximum encountered temperature data based on the temperature history logs of the sensor devices is written to the RFID tags of each box.

Manufacturer X wants to decrease the number of boxes rejected by Retailer Z ("rejects") for which Shipper Y is to be held responsible, for example, boxes exposed to high temperatures during shipping. Shipper Y wants to gain market share by providing better customer satisfaction by ensuring full visibility of the current location and temperature of shipments. In addition, Shipper Y wants to detect quality problems and theft caused by contractors. Retailer Z wants to be able to identify and reject spoiled products upon arrival and, thus, cut costs by decreasing returns while, at the same time, achieve higher customer satisfaction.

Figure 3:
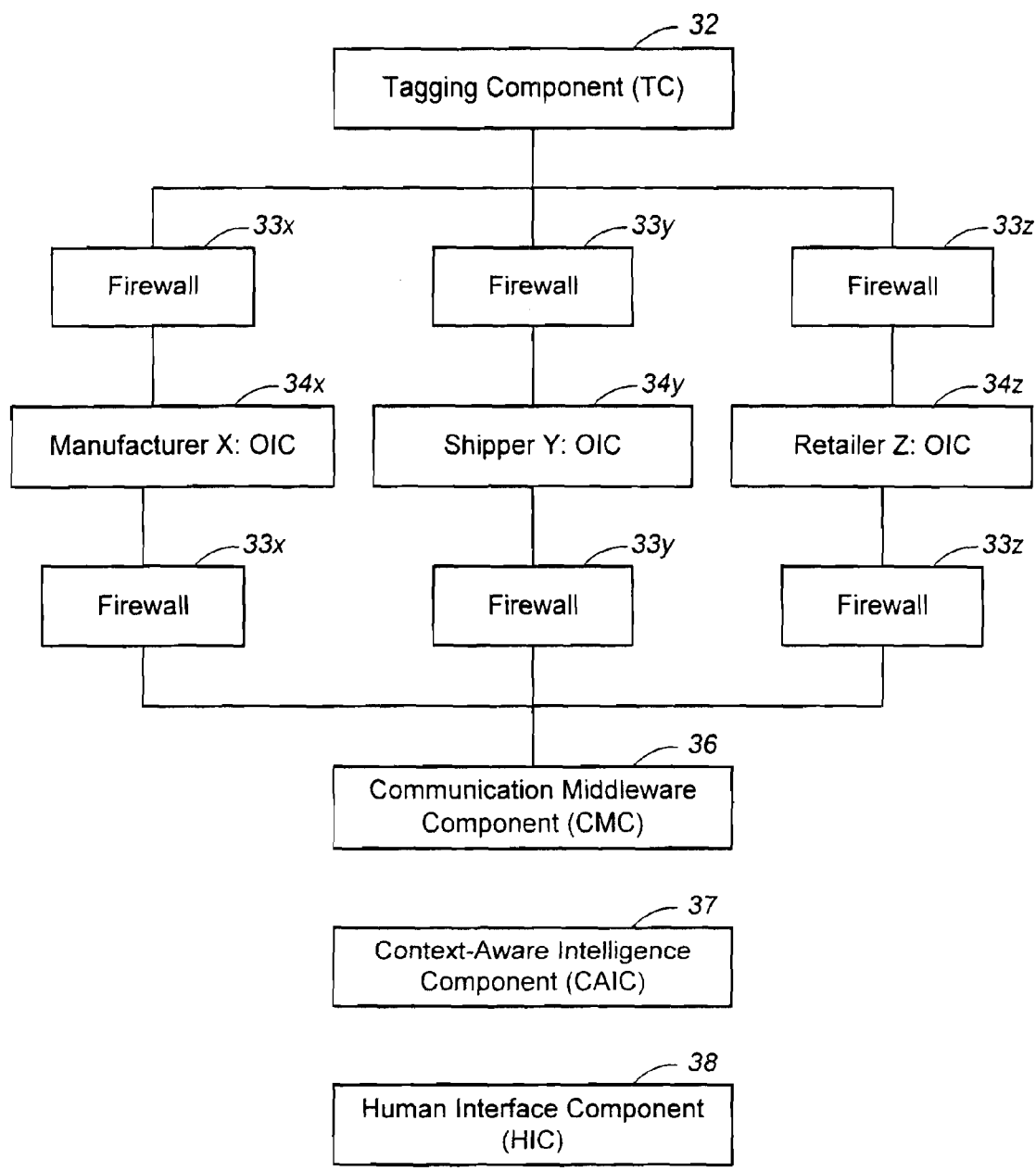
FIG. 3 is a block diagram illustrating one implementation of the system.

The following describes in detail how the system helps each party achieve its goals. FIG. 3 illustrates one implementation in which Manufacturer X, Shipper Y, and Retailer Z procure and implement a local installation of the Object Interface Component (OIC) 34*x*, 34*y*, 34*z* of the system behind their respective firewalls 33*x*, 33*y*, 33*z*. In addition, they jointly use the Tagging Component (TC) 32, Communication Middleware Component (CMC) 36, Context-Aware Intelligence Component (CAIC) 37 and Human Interface Component (HIC) 38 of an external application service provider, who provides these services through a network such as the Internet. Alternatively, each party can subscribe to an implementation of the system that is provided by a service provider. In this latter case, each party need not procure and install an OIC. In yet an another alternative, one or more of the parties can install all five component of the system for use by all of them. In this case, the parties need not subscribe to a service provider; their CMCs can communicate by sending events over a network such as the Internet.

Based on the specifications, standards, best industry practices, and other information obtained from the TC, Manufacturer X procures read-write RFID tags and interrogators compliant with the above-described product and scenario requirements (e.g., active or passive RFID tag, frequency, reader range, temperature sensor built-in, memory size, price point, case material, and bonding requirements). Based on the specifications, standards, best industry practices, and other information obtained from the TC, Shipper Y and Retailer Z each procure a number of RFID interrogators (which can be read-only) that are compliant with the RFID tags of Manufacturer X and the system.

Figure 4:
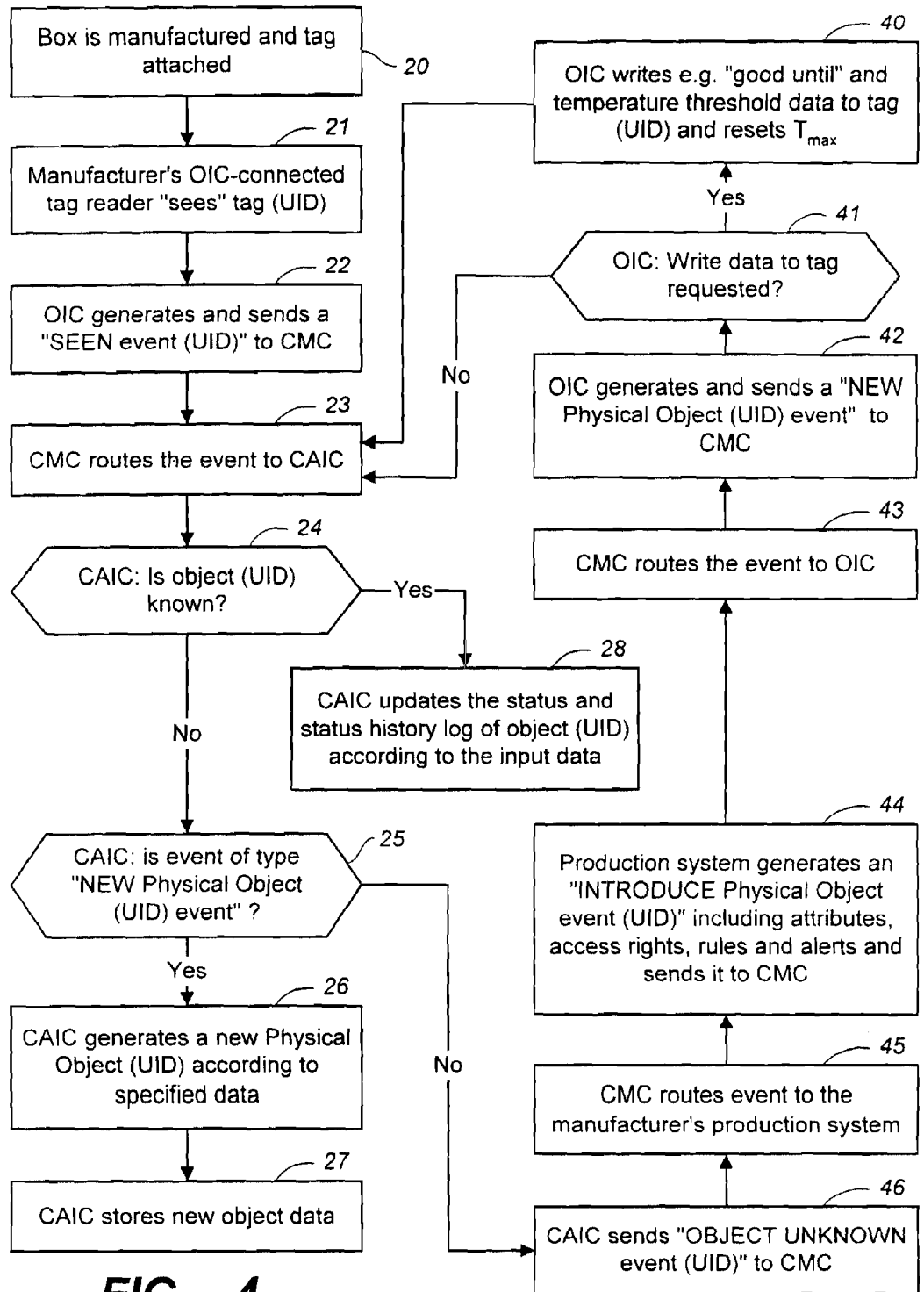
FIG. 4 is a flow diagram illustrating an item introduction process.

When Manufacturer X produces a box of products, Manufacturer X attaches one RFID tag and introduces to the system its unique identifier, allowed temperature ranges, and initial expiration date to the system. FIG. 4 illustrates this introduction operation. A box is manufactured and a tag is attached (step 20). The manufacturer's OIC-connected tag reader senses the tag and reads its UID (step 21). The OIC generates and sends a SEEN event including the UID to the CMC (step 22), which routes it to the CAIC (step 23). If an object for the UID is known, the CAIC updates the status and status history log of the object according to the input data ("yes" branch of step 24; step 28); otherwise, the CAIC determines whether the event is a NEW virtual item event (decision step 25). If the event is a NEW object event, the CAIC generates a new virtual item for the UID according to the specified data (step 26) and stores the new virtual item data (step 27). Otherwise, the following actions occur. The CAIC sends an OBJECT UNKNOWN event for the UID to the CMC (step 46). The CMC routes this event to the manufacturer's production system (step 45), which generates an INTRODUCE virtual item event for the UID with attributes, access rights, rules, and alerts and sends this event to the CMC (step 44). The CMC routes this event to the OIC (step 43), which generates and sends a NEW virtual item event for the UID to the CMC (step 42). The OIC also determines whether there is a request to write data to the tag (step 41). If there is, the OIC writes the data to the tag (step 40). In this illustration, the data is a "good until" date, a temperature threshold, and a maximum encountered temperature reading (step 40). In any case, the NEW virtual item event is routed by the CMC to the CAIC (step 23) for handling as has been described.

Figure 5:
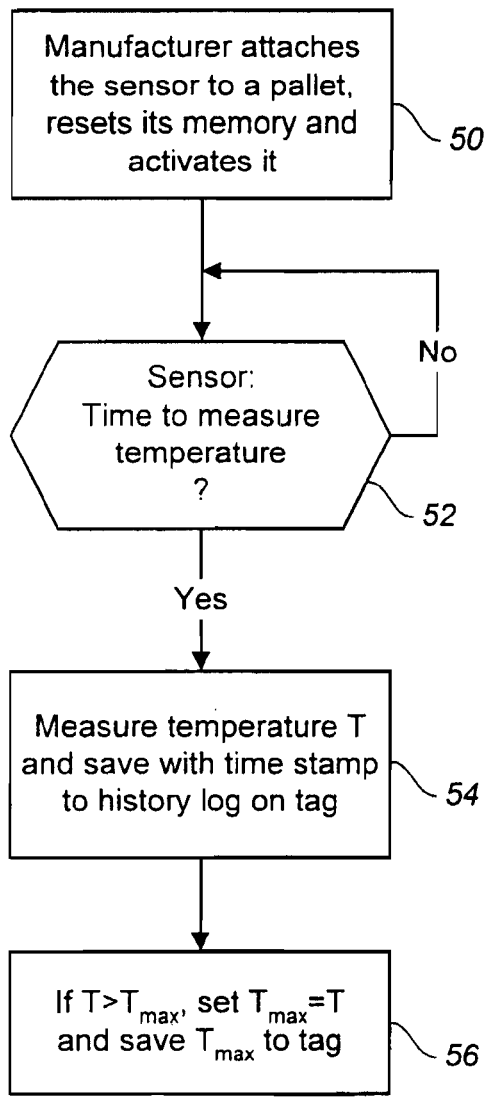
FIG. 5 is a flow diagram illustrating the operation of a temperature sensor device and an RFID tag.

As shown in FIG. 5, when Manufacturer X loads a pallet for delivery, Manufacturer X attaches an active temperature sensor to the pallet, resets the memory of the sensor and activates it (step 50). The sensor measures temperature on a time schedule (step 52), saving the measured temperatures with time stamps to a history log on the tag (step 54). If the temperature exceeds the maximum encountered, this new maximum is also stored on the tag (step 56).

Figure 6:
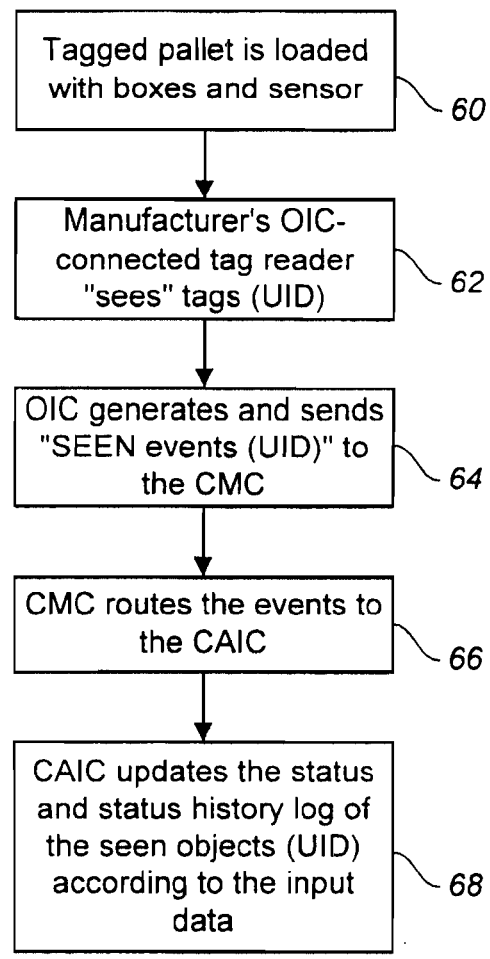
FIG. 6 is a flow diagram illustrating the system's response to an event such as the loading of boxes onto a pallet.

FIG. 6 illustrates the system's response to the loading of boxes onto the pallet with a sensor (step 60). The manufacturer's OIC-connected tag reader senses the tags and their UIDs (step 62) and generates SEEN events for the UIDs that it sends to the CMC (step 64). The CMC routes these events to the CAIC (step 66). The CAIC updates the status and status history log of the virtual items identified by the sensed UIDs according to the input data from the events (step 68).

Figure 7:
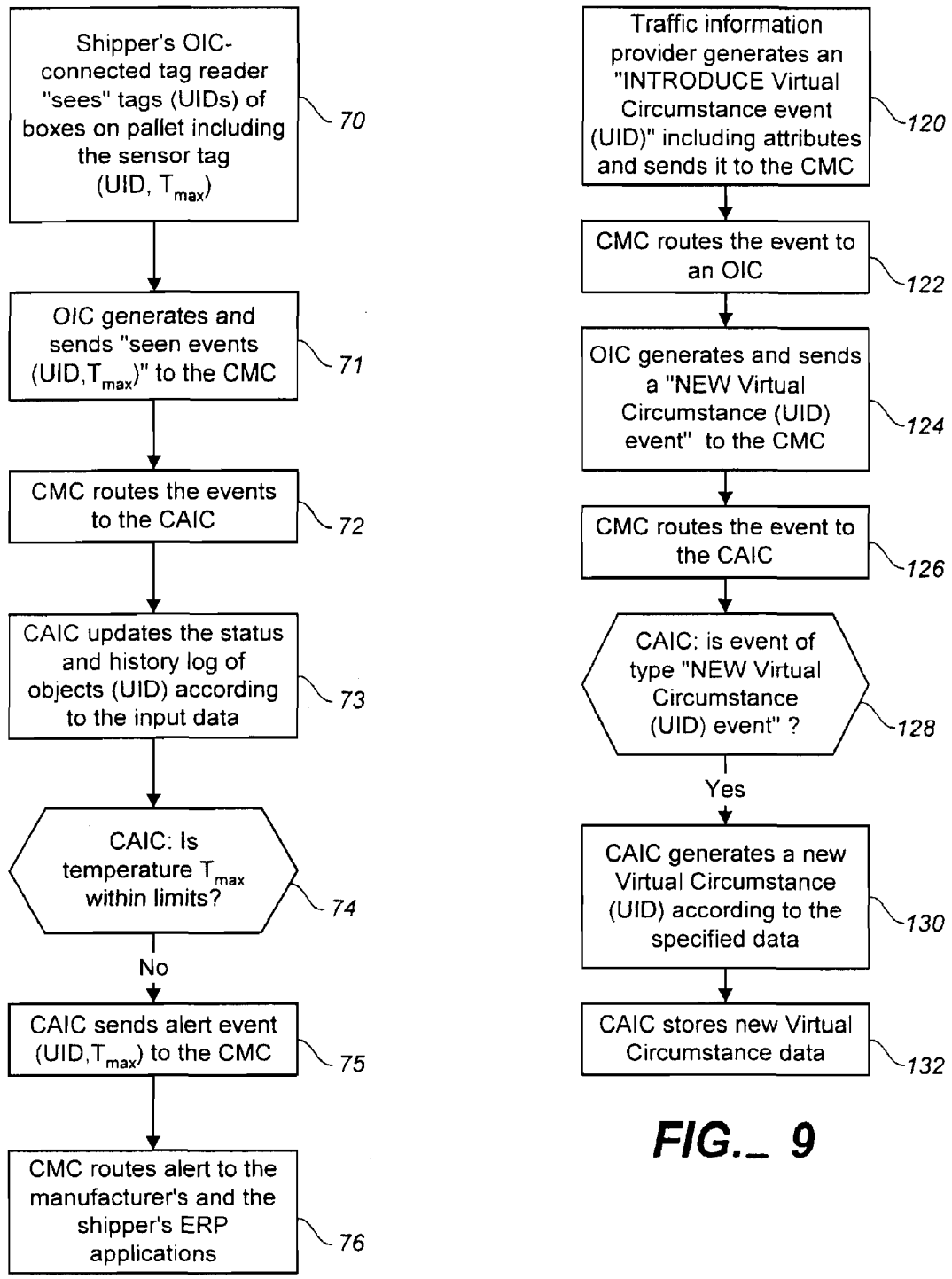
FIG. 7 is a flow diagram illustrating an update operation.

When Shipper Y's OIC-connected readers sense a tag, the CAIC updates the system. FIG. 7 illustrates this update operation. The shipper's OIC-connected tag reader senses the tags of the boxes on the pallet including the sensor tag, reading their UIDs and $T_{max}$ data (step 70). The OIC generates and sends SEEN events to the CMC with the data (step 71). The CMC routes the events to the CAIC (step 72). The CAIC updates the status and history log of the corresponding virtual items according to the received input data (step 73). The CAIC determines whether the $T_{max}$ is within limits (step 74). If not, the CAIC sends an alert event to the CMC ("no" branch from step 74; step 75), and the CMC routes the alert to the manufacturer's and the shipper's ERP applications (step 76).

On receipt of the shipment, Retailer Z reads and validates the products' actual maximum temperature data from the attached RFID tags and expiration date. FIG. 9 also illustrates this reading operation.

Figure 8:
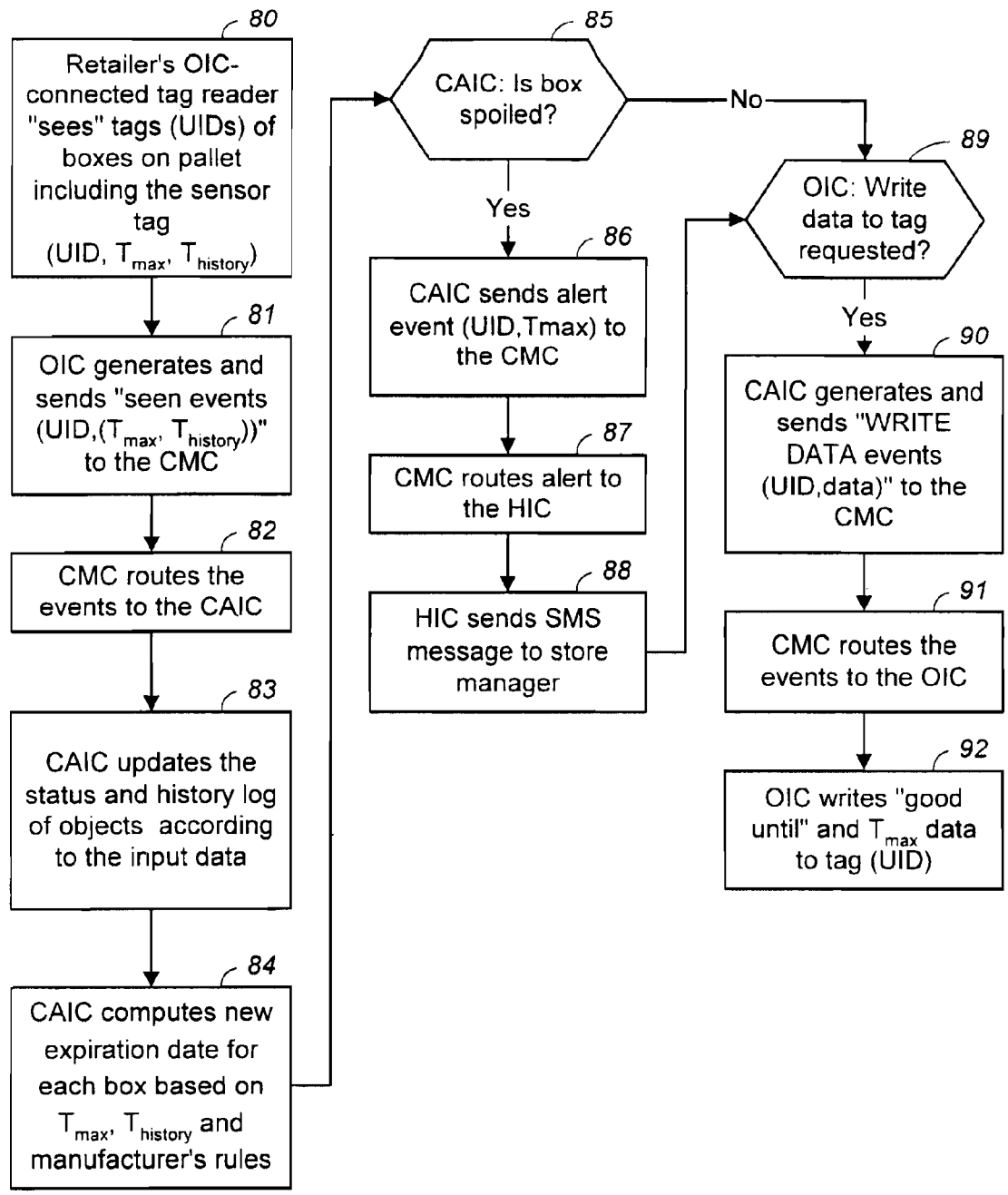
FIG. 8 is a flow diagram illustrating update, reading, and alert operations.

When spoiled boxes are detected, they are identified and the CAIC alerts the store manager using the HIC component. SMS (Short Message Service) messages, pager messages, or any other convenient form of message transmission, can be used for this purpose. FIG. 8 also illustrates this alert operation where a retailer's OIC-connected tag reader senses and reads the UIDs of tags of boxes on a pallet include a sensor tag carrying a UID, a maximum temperature $T_{max}$ and a temperature history $T_{history}$ (step 80). The OIC generates and sends to the CMC SEEN events with the UID, $T_{max}$ and $T_{history}$ information (step 81). The CMC routes the events to the CAIC (step 82). The CAIC updates the status and history log of virtual items according to the input data (step 83). The CAIC also computes a new expiration date for each box based on the $T_{max}$ and $T_{history}$ information and the manufacturer's rules (step 84). If the CAIC determines that the box is spoiled ("yes" branch from decision step 85), the CAIC sends an alert event with UID and $T_{max}$ to the CMC (step 86), which routes the alert to the HIC (step 87). The HIC then sends an SMS message alerting the retail store manager (step 88). Whether or not the box is spoiled, the OIC determines whether there is a request that data be written to the tag (step 89), and if it there is, the CAIC generates and sends WRITE DATA events with the UID and data for the tags to the CMC (step 90). The CMC routes these events to the OIC (step 91), which writes "good until" and $T_{max}$ data to the tags (step 92).

The system can receive context information from third party providers, for example, traffic or weather information. In general, information can be brought into the system either by having the providers push the information, or having the system pull the information. Having such information enables the system to report or forecast shipping delays or other situations that can affect the movement or condition of introduced items. FIG. 9 illustrates this implemented with the providers feeding information into the system. In this illustration, a traffic information provider generates an INTRODUCE virtual circumstance event with a UID and attributes and sends the event to the CMC (step 120), which routes the event to an OIC (step 122). The receiving OIC generates a NEW virtual circumstance event with UID to the CMC (step 124), which routes the event to the CAIC (step 126). The CAIC determines that the event is of the type NEW virtual circumstance event ("yes" branch of decision step 128), generates a new virtual circumstance for the UID according to the specified data (step 130), and stores the new virtual circumstance data (step 132).

2.2 Bi-Directional Data Flow

The system can provided data flow and bi-directional data flow on tags. FIG. 10 illustrates one scenario. A tag 152 is attached to a box 150. The tag contains a UID, and, in addition, can store an expiration date, a maximum temperature threshold, a maximum encountered temperature reading, and a price. The temperature data on tag 152 can be updated as often as the temperature of box 150 is measured, e.g., at a temperature measuring station that can write its readings to tag 152 or, by a temperature sensor operably coupled to tag 152.

The data on tag 152 can be automatically read by tag reader 158, e.g., using RFID technology. In one embodiment, tag reader 158 periodically "scans" its environment within a specific range. In another embodiment, tag reader 158 is triggered to scan its environment, e.g., by a proximity sensor. If a scan returns valid read data (through communication 154), e.g., because tag 152 has been moved into the scanned range, tag reader 158 will send the received data to system 166 (through communication 162). For this example, it is assumed that the system 166 maintains a virtual item 168 previously introduced by an external application 174 (through communication 172) and that the external application 174 also defined and attached a rule 170 to virtual item 168. Rule 170 is defined as "if the maximum encountered temperature of the box as stored on its tag is higher than 45 degrees Fahrenheit, then write the current date as new expiration date to its tag." Rule 170 can be defined in any format, syntax or computer code that is compatible with system 166. Whenever system 166 receives new data read from tag 152, it will execute rule 170. If rule 170 returns a positive result, system 166 will compute a new expiration date, such as the current date, send the new expiration date and the UID of tag 152 to tag writer 160 (by communication 164), and cause tag writer 160 to write the new expiration data to the expiration data field on the tag 152 (through communication 156).

FIG. 11 illustrates another scenario, in which external application 174 periodically queries system 166 for the latest status of the maximum encountered temperature of the box 150 as stored on its tag 152. In this scenario, the logic, which may again be identified as a rule 171, is part of the external application 174. The external application 174 transmits an event to system 166 that contains the UID of tag 152, a new expiration date, an updated price, and updated regulatory information. This event triggers system 166 to send the received expiration date, price, and UID to a tag writer 160 (through communication 164). The system 166 then causes the tag writer 160 to write the received data to the corresponding data fields on the tag 152. The communications that have been mentioned can take place through any communication medium, including over a network, for example, the Internet.

In these scenarios, with a tag reader that is able to read the data stored on the tag 152, a receiver of the box 150 will be able to identify an expiration date and price that is based on the temperature that the box 150 has been exposed to during tracking.

FIG. 12 illustrates one aspect of the process of data flow. In an illustrative example, the system receives attribute information for a first item including its UID by reading a first tag bound to the first item (step 1202). The system similarly receives attribute information for a second item and context information derived from data read automatically from a sensor coupled to the second item (step 1204). The system maintains a virtual first and second item using this information (step 1206). The system also receives relationship information specifying a relationship between the items and maintains a virtual relationship (step 1208). Having this information, the system can recognize an alert condition relating to the first item based at least in part on one of the virtual items (step 1210). In response to the alert condition, the system generates updated attribute information to be written to the first item (step 1212). The system then detects the presence of the first tag at a tag writer station (step 1214) and causes the tag writer station to write the updated information to the first tag (step 1216).

In these scenarios, the alert condition can be recognized, and the rules for responding to the alert and computing updated information, in the system itself, or this can be done in an application external to the system. In the latter case, the application receives from the system information from objects maintained by the system and generates the updated attribute information and provides it to the system with a request that it be written to the first tag.

FIG. 13 illustrates another aspect of the process of data flow. In an illustrative example, the system receives attribute information for a first item derived from tag data read automatically by a first tag reader from a first tag bound to the first item (step 1302). The system also receives updated attribute information for the first item (step 1304). The system later detects the presence of the first tag at a different tag writer station (step 1306) and causes the tag writer station to write the updated information to the first tag (step 1308). In this scenario, the updated information can be computed in the system itself, or this can be done in an application external to the system. In the latter case, the application receives from the system information from objects maintained by the system and generates the updated attribute information and provides it to the system with a request that it be written to the tag.

3. Another Implementation of the System

As shown in FIG. 14, a system in accordance with the invention can be implemented with a shared ITS (item tracking system) and multiple local, usually private, ITSs. The system need not have an explicit top level, shared node. Some implementations of the system will be a federation of corporations with no hierarchy above the corporations. Other implementations will have multiple top level, shared nodes, each perhaps supporting a particular industry segment, above the corporate level. In general, the structure will be driven by a variety of considerations, including agreements within the industry supported.

In FIG. 14, existing ERP (enterprise resource planning) systems 1401 can be any local enterprise software that is used for managing the movement and storage of goods. The ERP system for each enterprise (or part of an enterprise) may vary.

Each enterprise has multiple tag readers 1402 that feed digital information from digitally identifiable tags into a local ITS. Generally a tag reader is any combination of hardware and software capable of feeding digital data collected from any item or container. Readers can be positioned on the manufacturing line, in storage locations, in shipping and receiving areas, at loading docks, within trucks or other moving vehicles, and can also be hand-held wireless-connected devices. Some implementations optionally have intervening hardware and software between the actual physical readers and the ITS.

In FIG. 14, each local ITS 1403 is a system of hardware and software that can be implemented on one or more computer systems. This system is typically geographically local to the other parts of the enterprise but physically may be located anywhere provided it has appropriate connections to the local ERP system and the tag readers. Normally, an ITS services a single enterprise or a portion of that enterprise. Thus, when there is more than one local ITS, each can be operated by a different enterprise. An ITS can also connect to other existing enterprise software systems, such as those used for supply chain management, logistics, customer relationship management, and new software services which are enabled by the kind of data available form the ITS.

A shared ITS 1404 is an item tracking system that is shared by multiple local ITSs. It connects generally to multiple local ITS systems and can also connect to multiple other shared ITS systems. A shared ITS can also connect to other new and existing enterprise software systems.

Local and shared ITSs communicate over a network connection 1405 which can be any computer-to-computer communications technology. Generally, between enterprises, the communication will be encrypted for security, and digital security certificates or other security means will be used to authenticate participants in the communication. The communication medium may include the public Internet. This connection normally passes real-time, or close to real-time, messages representing the disposition of tagged items and other information representing shipping documents, transport vehicles, and so on.

An individual site 1406 is the collection of hardware and software needed at an individual site to support local operations. A site can be a manufacturer, a distributor, a retail establishment, a private home, a repair depot, or any other location, or portion of a location, that deals with tagged articles.

New and existing applications 1407 can be existing enterprise software systems, such as those used for supply chain management, logistics, customer relationship management, as well as new software services that are enabled by the kind of data available form the ITS. Through a network connection 1408, these applications can interrogate the ITS about the current state and past history of the items tracked by the ITS and other information. These queries do not change the state as recorded in the ITS system, and so can be handled—with little or no loss of usefulness—by processing a log of the states of the ITS kept in a persistent store, rather than by processing the queries on live data in the ITS.

FIG. 15 shows basic software components within the item tracking infrastructure. A real time input processing software 1501 accepts disposition and other messages from tag readers, existing ERP systems, and other ITS systems. These messages can be in XML or other format. The messages can represent creation of physical or logical items, or changes in the disposition or status of these items. This part of the software interprets the incoming messages, consults the data storage element 1502, undertakes the appropriate action based on the message content and the stored data, updates the data structures as specified and potentially returns error messages or other reports to the source of the message.

Data structures and persistent storage 1502 records and maintains a representation of the relationships, state and history of logical and physical items tracked by the ITS. For example this software may record that a certain unique tag corresponds to a specific bottle of detergent. The detergent may be physically contained within a box (another unique tag and item known within the ITS), which may be on a truck (another unique tag and item within the ITS) and the location of the truck item may be periodically updated in response to real-time messages and software action from real time input processing software 1501. The data structures may also record that the detergent is part of a certain shipment (a logical item with a UID). The data structures and persistent storage preserve the data structures over any hardware of software failures. Any robust method of building persistent storage can be used; for example, one can use software database technology and magnetic disk drives to record information in a non-volatile manner.

A software interface 1503 for queries provides the interface between an ITS and outside enterprise software applications. For example, if a conventional ERP (Enterprise Resource Planning) or SCM (Supply Chain Management) system requires an update on the current actual locations of certain items, it would send a query. The ITS persistent storage can provide the information necessary to handle, and the interface for queries can use this information to handle, queries like: "Report all batteries of a specific type (identified by a product code) that are currently within a given geographical region." Or a query like: "Report all milk cartons that are within 48 hours of exceeding their shelf life."

3.1 Software Upgrades

The core 310 of the ITS infrastructure (shown in FIG. 16) should operate continuously, 365 days a year, 24 hours a day. It is impractical to take the system down for maintenance or system upgrade when substantial economic activity depends on some part of the system. However, the system will need to be upgraded in various ways. The architecture that will be described addresses this need.

Three classes of software upgrade will be considered: adding or deleting fields (i.e., properties), adding or changing code (i.e., computer program instructions) that takes semantic notice of field contents, and major system upgrades. Each is discussed here in turn.

Manufacturers, distributors, retailers and others may need to add or delete data fields to representations of individual items or groups of items for the convenience of local operations. For example, it may be desirable to add a field that indicates the temperature at which the item was processed. This information might be important, for example, for long-term reliability and product return studies. This processing temperature field contains different information than existing temperature fields, such as the current temperature or maximum temperature sensed during transportation or storage of the device. It may be treated differently, as well. For example, the manufacturer may want the processing temperature value stored long term, for the reliability study, but not revealed to other manufacturers, and perhaps not to any other organization.

Other examples of adding or deleting data fields include: A retailer wants to record items purchased and then later returned. A regulation changes and some jurisdictions now require a sell-by date on this class of product; the field is completed by the manufacturer and acted upon by the distributors and the retailer.

In another example, a distributor is responsible for providing return-freight for items that are to be returned to the manufacturer by the consumer. The distributor wants to add a field "Return-Freight-Responsible-Party" that will be filled automatically with the name of the distributor, so that the legally responsible party is charged when the item is returned. Such distributor information may or may not be available from history. Nonetheless, the additional field makes it explicit who is responsible for this charge without doing a query to history.

In general, the system is able to add a new data field (i.e., property) dynamically to any existing object. Moreover, the object record is accepted by any higher or lower hierarchical system with no programming changes and no need to change prior or future objects of the same type.

Deletions may be desirable for data fields that are meaningful only when the object is in a certain state. For example, fields associated with a shipment list or packing list are only valid when the object represents an item that is part of a current shipment. Once the shipment is officially received, shipment information fields are deleted from the active data structure (but retained in history). Alternatively, if invalid fields are not deleted, they are marked invalid.

Adding or changing code that implements semantic behavior allows the system to be upgraded. It is generally desirable to add new capability to the system continuously and revise older functionality. Such changes require many decisions, such as: where the new capability is added, who does the programming, how it is tested, and how impact on other activity is minimized.

Examples of situation requiring additions or changes to semantic behavior include: A new member joins a consortium and needs new functionality for handling its kinds of goods. Existing functionality changes; for example, a method of handling the setting of a sell-by date changes, or a better procedure for loading a truck is developed.

Adding functionality to any element of the infrastructure may require the addition of new data fields.

Changes to semantic behavior have the potential to crash the total system. Thus it is vital to have very controlled ways of testing and introducing new code that changes semantic behaviors. In general, one can change the semantic processing of a specific item type and specific items without halting the operational system. Moreover, there is a high-level of assurance that the behavior for other objects will be unchanged.

Major system upgrades are possible, including upgrades to change all the software, upgrade disk formats and upgrade hardware. In general, the system is able to transparently switch central system operation from one hardware/software configuration to another without any loss of service being visible. This procedure should be rare.

For system reliability reasons, a shadow system can be run. Such a system also provides a mechanism for major system upgrades.

As shown in FIG. 16, active data storage is separated from all semantic methods. The core 1610 provides a small set of basic functionality but is otherwise independent of any object-specific processing. Consequently, the core 1610 does not need to change when new data fields or new semantic processing is added. Such a core is very general and can be optimized for its basic functionality and for very high reliability. The core 1610 programming will rarely change.

Other parts of the system communicate through inter-process communication or document exchange, so that the core 1610 can continue to operate even if other components fail and must be restarted.

The core 1610 can be restarted from a prior snapshot. It can then be made current either by replaying prior events (assuming idempotency) or by using what is available from persistent storage to reconstruct the current state. As discussed below, changes that have not been committed to persistent storage 1620 must be re-executed.

The small set of functions that will support all the diverse needs of the system in an efficient manner are described below.

Shown in FIG. 16, the stateless real time semantics section 1630 performs the following actions: (1) It accepts disposition messages from the network. A disposition message always specifies at least one item. (2) It retrieves the object(s) corresponding to the specified item. Locking can generally be avoided. (3) It can use information from the object to select the appropriate semantic processing method. (4) It retrieves any further objects needed and, if necessary, locks them. (5) It computes the updated object record. (6) It passes the changes to the core 1610, and may unlock all object records.

The real time semantics section 1630 is entirely stateless. Thus, it is possible to shut down any portion of it at any time, restart, and have operations continue. This greatly facilitates dynamically loading new semantics methods, for example, using Java mechanisms, and recovering from any failure.

There are several ways to choose the method applied to an incoming disposition message. The appropriate code depends on both the type or class of the object and the disposition indicated. For example, loading a transport vehicle will probably be very similar for most objects, but the "sold to end-user" disposition may be highly dependent on the item type. At least two alternative implementations are available. (1) Rely on the explicit product-type field used in the ePC proposed by the MIT Auto-ID center. (2) Look up the designated object, and possibly its root-type object, to gain an item type identifier.

The second approach does not depend on the ePC numbering scheme be deployed, and will work with any tag system. Furthermore, its level of indirection allows broad classes of objects to be processed by the same software. For example, all detergent products of one manufacturer may be processed with the same code, while those of another could have different code. Finally, it is possible to set up the core 1610 so that individual items can be flagged to trigger different code. Doing so permits live testing of new code that is limited to a small set of objects. To achieve high performance, this code is multi-threaded. This enables the object (and possibly any root object referenced by the object) to be fetched before the semantic code is dispatched.

The core 1610 can be advantageously implemented so that it does not provide persistence. To provide flexibility and speed, the core 1610 can be a computer memory subsystem. Alternatively, the core 1610 can be mapped directly to the persistent storage mechanism 1620.

The persistent storage mechanism 1620 is a module that takes a stream of object change notifications from the core 1610 and commits them to persistent storage. It is possible to build a current snapshot of the system state quickly from the stored information.

The history mechanism 1640 is provided as follows. There are two sources of activity for the system: disposition messages, which typically represent the beep or signal from an individual item, and queries against the accumulated object movement data by external systems. The object movement beeps update the core 1610, since they represent changes to the state of the universe of items, but no access to prior history is needed. The external queries are concerned with movement history and current disposition but do not need to change the state.

The system can accumulate the history and also has a recent view of the current state, so it can be optimized for large non-real time search intensive queries. Because it is essentially read-only, it can be easily duplicated to support high volumes of queries.

The history mechanism also needs persistent storage. The history functions therefore are typically subsumed into the persistent storage mechanism 1620.

The core 1610 has a minimal set of functionality. It is able to create and extend objects, including functions to:

(a) create an object, and (b) add or delete a property name-value pair.

All object names are unique and of arbitrary size. A name is taken from an extensible name list, to prevent proliferation and avoid creation of conflicting names with inconsistent semantics.

The core 1610 can access and change property values. In particular, it can:

(a) return all properties (name-value pairs), and (b) update property name-value pairs.

The core 1610 has specialized (built-in) property list 1710 functionality, such as named collection ownership and membership, including:

(a) the ability to make object owner (root) of a new type-name collection, and (b) the ability to add and delete members of a named collection.

Finally, the core 1610 has object locking, which is very rarely used, including the ability to:

(a) lock object—provide signature, and (b) unlock object—provide matching signature.

This very small set of core 1610 functionality has little to do with tags and readers or with item locations in the real world. This is a primary virtue. The data structures are sufficiently general that they will not need to change with the semantics of the items passing through the supply chain and other applications. The core 1610 software is highly optimized to perform a small set of operations, while semantic changes are accommodated in the stateless semantic methods. Of course, many conventions may be locked into the data structures as they grow, and certain semantic changes may require current object structures to be re-constructed. However, this can be done on a live system and without software changes to the core 1610.

The following table provides a simplified example of how these structures can be used.

1147: {ObjectID: #1147} {Obj_Type:Base_EPC_Type} {Software_Version: 2} {Class:"Detergent"} {PML:"http:...."}
{EPC_Type_Collection_Root: #341,#576 .........}
341: {ObjectID: #341} {ObjType:EPC_Object_Instance}
{EPC_Type_Collection_Member:#1147} {Container_Collection_Member: #3328}
576: {ObjectID: #576} {ObjType:EPC_Object_Instance}
{EPC_Type_Collection_Member:#1147} {Container_Collection_Member: #3328}
621: {ObjectID: #621} {ObjType:EPC_Object_Instance}
{EPC_Type_Collection_Member:#1147} {Container_Collection_Member: #3348}
2287: {ObjectID: #2287} {ObjType:ERP_Shipment}
{Shipment_Collection_Root:#3328 .........}
{Shipment_Enterprise_Member: #3347}
{Shipment_System_Source: "R/3_4.6"}
3328: {ObjectID: #3328} {ObjType:Container}

-continued

```
{Container_Description: "14 × 18 × 10 Cardboard Box"}
{Immediate_Location_Type: Follow_higher_level_container}
{Container_Collection_Root: #341, #576}
{Shipment_Collection_Member: #2287}
{Container_Collection_Member: #4421}
#4421: {ObjectID: #4421} {ObjType:Container}
{Container_Description: "10,000lb Truck"}
{Immediate_Location_Type: GPS Long-Lat-Alt}
{Container_Collection_Root: #3328}
{Latitude: 32N} {Longitude: 60.45} {Altitude: 327 M} {Location_Last_Update:
1/12/2002 14:27}
    #3348: {ObjectID: #3348} {ObjType:Container}
    {Container_Description: "Warehouse Shelf"}
    {Immediate_Location_Type: Fixed Storage Location}
    {Storage_Location_LOcal: "Shelf 3"
    {Container_Collection_Root: #621 ...}
    {Container_Collection_Member: #4462}
    #4462: {ObjectID: #4462} {ObjType:Container}
    {Container_Description: "Warehouse Region"}
    {Immediate_Location_Type: Fixed Storage Location}
    {Storage_Location_Local: "Region 16"}
    {Container_Collection_Root: #3348 ...}
    {Container_Collection_Member: #4481 ...}
    #4481: {ObjectID: #4481} {ObjType:Container}
    {Container_Description: "Warehouse"}
    {Immediate_Location_Type: Top Level Fixed Location with Lat/Long/Alt}
    {Container_Collection_Root: #4462 ...}
    {Latitude: 31N} {Longitude: 60.45} {Altitude: 100 M}
```

The above table describes a fairly complex situation, also illustrated in FIGS. 18 and 19.

As shown in the table, #1147 refers to the product class "detergent". Specific bottles of detergent are represented by object instances #341, #576, and #621.

As shown in FIG. 18, two of these detergent bottles 1810 are inside a cardboard box 1820. The box is on a truck 1830 and the truck has a GPS location system for real time location reporting. The box is part of a specific shipment. There is a third bottle of detergent 1940, which is stored in a shelf 1960 in a region 1970 of a warehouse 1950.

The collection mechanism gives the data structure a great deal of power. For example:

Given the ObjectID of the Detergent EPC base type (#1147) one can interrogate the collection, and get to all the instances of Detergent and their current locations.

Given the ObjectID of the warehouse, one can find all the items in the warehouse and their stocking locations.

Given the ObjectID of any instance of the detergent, one can find the corresponding shipment number, if there is one.

Given the ObjectID of a Shipment, one can find all the items and their locations.

Given the ObjectID of the Truck, one can find all the items in the truck and their associated Shipment documents.

Data Recovery

Data recovery is a key issue. FIG. 20 illustrates the latency in the system from the time when a beep is detected at the leaves of the network 2010, until the implications of that beep are recorded to persistent storage 2020. Assuming a catastrophic failure at a shared (central) site 2030, recovery implies starting with the information that is currently on disk and then taking into account all the changes that have not been processed.

One approach to recovery is to record a certain amount of history within the network infrastructure itself 2060. For example, publish-subscribe distribution mechanisms can be built to have reliable internal persistent data storage. Another approach is to have persistent storage at each leaf node of the network.

The total storage needed 2040 is equal to the total latency through the system from the tag readers to the system persistent storage.

In general it is not easy to be certain which events were acted upon and which were lost. Furthermore, there is no inherent ordering of the processing of events through the real time semantics section 1630 and the core 1610. Replaying sufficient events to cover the largest possible loss works, provided all processing is idempotent and order independent. If this condition is met, the semantics of the operations invoked 2060 are such that if events are processed in different orders or if the same event is processed more than once, the ultimate system state will be identical.

Location Updates

Some high valued items and also transport vehicles, such as trucks, can be tagged with Real Time Location Systems (RTLS) that provide for periodic updates of location. For example, WhereNet Corporation of Santa Clara, Calif., offers WhereTag tags that periodically broadcast their identity to a local area in the 2.4 GHz band and the location is determined by triangulation. These tags broadcast at fixed intervals, from seconds to minutes, that can only be changed by physical access to the tag.

In addition, wide area systems can use GPS (global positioning satellite) receivers in association with a conventional communication system, such as a cell phone or a low-bandwidth satellite uplink system, to provide periodic location updates. The communication systems may be polled for the current location from a base station or they may call in at intervals that can be remotely programmed.

A basic capability of a tracking system is to receive reports of location information. While it would be convenient to have a single method of reporting location, use of latitude and longitude within a narrow area such as a building or a warehouse risks requiring many extra calculation steps that are unnecessary, and so an offset from a local frame of reference would generally be used. For wide area usage, the latitude, longitude, and altitude available data from a GPS system are appropriate.

Batch Identification

In general, the item tracking system will be provided more information than just the beep that an item was seen at a certain reader. Such information might be the planned disposition of an upcoming batch of items being read. For example, "the following items are being taken out of stock and are being packaged for shipment x". Elsewhere, the system will be provided information about this shipment.

Such information can come from a terminal close to a tag reader that connects directly to a system application (e.g., a Web browser based application) or indirectly from a local system that can transmit an appropriate message to the tracking system.

Because items often come in batches, beeps can be cached locally until the end of the batch is recorded. The reader or local system then sends the tracking system a message that includes information about all the items in the batch. The message may be formatted in a markup language such as XML.

Each batch can be given a unique ID. A batch number (batch-ID) is a way of concisely communicating common information about a group of items. Each reader may have a default batch-ID, which is used if no batch-ID is specified. If batch-IDs are used, the message from the reader may be of the form:

Timestamp, Batch-ID (e.g., 96 bit ePC), Item-ID.

Such use of batches can support a sorting function, for use when items are not batched before they are read. For example, an assembly line may have a sequence of items and a series of bins. The reader reads the tag on each item, and decides, for example, whether to put the item in bin 1, 2 or 3. Each bin may indicate, for example, a different disposition. The reader associates a different batch-ID with each bin, and each item is associated with the batch-ID of the bin into which it is placed.

The primitives for batch designation can include the reader, which has a unique ID, and the shipment, which also has a unique ID. The reader is associated with the shipment to produce a particular batch, which has a unique ID. Multiple batches, from the same or different readers, may be associated with the same shipment. The necessary primitives for shipment may include a unique ID, a local shipment number (e.g., the number used in a local ERP), a destination of goods, a target delivery date, and a target delivery time.

The association of each item with a batch rather than with a reader allows information to be repeated safely and without confusion. For example, if disposition messages are re-transmitted, due for example to a system failure and restart, the state of the system will not change if batch-item pairings are used rather than reader-item pairings.

Disposition Action

A disposition action describes a state change for the hierarchy of objects and items related to or associated with a tagged item. Disposition actions include, for example: creation of item or first introduction of an item to tracking, location change, inventory check, shipment, loading, unloading, and end of tracking.

The disposition action "creation of item" records the initial properties of an item, such as manufacturer, type, birth date and location, and so on. This action may include initializing the tag with certain data provided. It generally includes an indication of an initial stocking location for the item.

The disposition action "location change" indicates that the item will be or already has been moved to a new given location. "Inventory check" indicates that the item is recorded as being sensed at a stocking location.

The disposition action "shipment" indicates that the item is designated as part of a certain shipment. The shipment number that is known to the local ERP system may be given.

The disposition action "loading" indicates that the item is sensed while loading a certain transport vehicle. The truck or other transport ID may be tied to a shipment ID.

The disposition action "unloading" indicates that the item is sensed while unloading a certain vehicle. The vehicle ID may be tied to the shipment ID.

The disposition action "reversal" is an action that effectively cancels any prior disposition for the same item and same batch. It is often needed to reverse a prior disposition. For example, a reversal may occur when too many items are loaded. This action is not idempotent.

The disposition action "end of tracking" indicates that the item is not expected to be seen again by the tracking system. This action may occur, for example, at retail sale or when a package of items is opened and the case is recycled. The system may archive item data for later warranty or history purposes.

There are many other possible dispositions. A flexible designation of dispositions is preferred.

Shipment

A shipment identifies a packing list, typically of the form: Item-Type Quantity list. A shipment also defines a planned movement of these item-types to a destination. The destination may be a customer, with a street address, or another location for the same company. The tracking system determines location, e.g., latitude and longitude, from the street address, or receives this information as part of the shipment description.

The shipment is known to the local ERP system. The tracking system can retrieve the shipment information, match specific items to the generic item-types in the shipment list, and report discrepancies.

One or more planned shipments may be associated with a particular transport vehicle. For example, several different shipments, some going to the same address and some going to different addresses, may be loaded onto the same truck. The system can verify that the truck was correctly loaded. Also, the system can track the truck or estimate its location, and respond to queries about the location of the goods.

A particular logical shipment may, in actuality, be spread over several transport vehicles. This division can occur at a level above the system. In this situation, the system tracks the physical shipments rather than the logical shipment.

The system can identify the transport vehicle and indicate how to communicate with it. The system can thus respond to questions such as: "Tell me the driver's name and mobile phone number for my contaminated meat shipment heading for San Francisco."

Transport-route

The 'transport route' information is information about the expected geographical path of a transport vehicle, such as a ship or truck. It can be a series of way-points, such as cities or highway intersections, individual highway or street names, latitudes and longitudes, and so on. The transport route may be provided explicitly. For example, it may be entered manually. Alternatively, it may be calculated or otherwise inferred, as described later. A transport route applies directly to a transport vehicle, and only indirectly to a specific shipment.

Disposition Message

A disposition message indicates that a certain item was sensed at a stated time and was part of a batch intended for a specific deposition, for example, movement to another stocking location, shipment to a customer, and so on. A disposition message may be of the form:

Timestamp, Batch-ID, Item-ID.

This concise message ties together an item, a reader, and a shipment number that is known to the local ERP system. Repeated transmissions of the same disposition message has the highly advantageous property that it will not change the state of the tracking system.

Tag Memory

The described objectives and functionalities of the system concern only the tracking of tagged items. However, particular applications may require writing data to an item tag at some stage where the tag is sensed. The system can write and read such tag data at any site.

The system can provide large scale event reporting. For example, the system can report to other applications when particular milestone events occur. It can, for example, send a message when a shipment reaches a customer, and thereby trigger billing.

3.2 Cross-Enterprise Visibility

The system can enable cross-enterprise visibility of items in a supply chain. The system can receive, store, and make visible disposition information for the items, such as the location of the items as the items move within a single enterprise or across multiple enterprises. Additionally, the system can receive, store, and make visible correlation information that relates the items to customer orders, shipment documents, and other business transactions. The system can receive the correlation or disposition information from any participant or enterprise in the supply chain and can make the information visible to other participants or enterprises in the supply chain.

As shown in FIG. 26, the system can track items and provide access to the tracking information on a very large scale. For example, the infrastructure can track items that are located in many diverse settings, including factories, warehouses, retail outlets, and homes across the country or the world.

Controlling Visibility

In one implementation, the system can provide controlled visibility. In other words, only a subset of the item tracking information is made visible to a particular participant in the supply chain. As shown in FIG. 28, the system can receive authorization information that specifies authorization settings for various attributes of the item. The system can use the authorization information to determine which attributes to make visible to which enterprises. For example, the authorization model shown in FIG. 28 specifies that the destination attribute of the item should be made visible to the sender, but should not be made visible to the manufacturer. Controlling visibility will be discussed in more detail below under the heading "Controlling Access to Tracking Information".

World Model Structure

FIG. 27 shows a world model (WM) structure shared by multiple enterprises. The world model is a structure that records and maintains a representation of the relationships, state, and history of the items being tracked by an ITS. The world model can be implemented as a two-tier structure: A higher tier parent WM 2710 that keeps track of items located within a particular enterprise and a lower tier local WM 2720 that keeps track of the items located at a physical site within the particular enterprise. The local WM can be contained within a local ITS 1403 (as shown in FIG. 14) and the parent WM can be contained within a shared ITS 1404. Through a network connection 1405, a parent WM for one enterprise can communicate with the parent WM of another enterprise, or the parent WM of other divisions or tiers in the enterprise.

FIG. 27 depicts a federation or peer cooperation arrangement where each enterprise shares information directly with other enterprises. The system can support other kinds of arrangements as well. For example, FIG. 29 shows a hierarchy or consortium arrangement where the parent WM 2920 of each enterprise provides information to a central WM 2910. Alternatively, the federation and hierarchy arrangements can be combined. For example, one of the parent WMs 2710 in the federation model could also represent the central WM 2910 for a consortium of parent WMs 2920.

In FIG. 27, each enterprise is depicted as having a single parent WM 2710. However, in some cases, for example, for scalability purposes, the parent WM 2710 can be implemented as a cluster of parent WMs 3010, as shown in FIG. 30. Each parent WM 3010 can correspond to a different set of product classes within the enterprise. Each parent WM 3010 maintains connectivity to the local WMs 2720, to other parent WMs 2710 at other enterprises, and also to higher-level business applications such as ERP systems.

3.3. Data Communication and Coherence Between World Models

The following paragraphs describe a system and method for communicating data across multiple nodes of a distributed architecture such as the federation architecture depicted in FIG. 27.

The method provides two-way communication between local WMs 2720 and parent WMs 2710. Parent WMs 2710 can report to other WMs changes pertaining to the items being tracked (e.g., a recall notice for contaminated meat or a price change). Conversely, local WMs 2720 can report item disposition changes (e.g., item creation, movement, or termination) to parent WMs 2710.

For each item, at least one parent WM 2710 is designated as the responsible WM for that item. Typically, the responsible WM is the parent WM for the enterprise where the item was created (e.g., the manufacturer). Any information received about the item by any local WM 2710 throughout the federation is reported to the responsible WM. In this way, the responsible WM maintains a complete history of the item. The responsible WM can be duplicated to improve data recovery. For example, a second WM 2710 can also be designated as a responsible WM for the item and any information received about the item is sent to both responsible WMs.

Other non-responsible WMs holding information about an item are free to purge the information once any "business significant" changes have been reported to the responsible WM. Hence, any individual local WM 2720 may be restarted with a blank WM. However, changes which were not reported prior to restart would be lost unless these changes had been saved in local storage prior to restart.

Routing Data to the Responsible WM

A local WM 2720 receives multiple instances of tag-read-data, each instance including information read from a tag bound to an item that has been detected at the local node. The multiple instances of tag-read-data can collectively include information read from tags bound to multiple items in a shipment of items. Shipments in a supply chain often contain one or more levels of items contained within the shipment (e.g., a shipment may contain pallets which contain cases which contain individual items). Thus, in some cases, the local WM 2720 can receive both data read from a shipment tag, and also data read from tags for the items contained within the shipment (e.g., the pallets, cases, and individual items).

For each item, the local WM 2720 reports the tag-read-data to the responsible WM for the item. To determine the responsible WM for the item, the local WM 2720 can consult a mapping table that maintains associations between items and designated responsible nodes. The mapping table can be queried using all or any portion of the item's UID.

Each item within a shipment can be mapped to a designated responsible WM. Items belonging to different product classes can be mapped to different designated responsible WMs. For each item, the designated responsible WM can be the same across all nodes, or can vary from node to node. In other words, each node can maintain its own mapping table and the associations within each mapping table can vary from node to node.

For example, within a single enterprise, operational rules can determine that all business significant item movements are reported to a parent WM for that enterprise. The parent WM can be single WM or a cluster. Once the movements have been reported to the parent WM, the parent WM can be configured to report certain item movements to other WMs outside the enterprise. For example, a retailer can report item movements to the manufacturer in order to enable more efficient supply chain operations. Hence, when a widget is sold at a retail level, the local WM can determine the responsible WM to be a parent WM within the same enterprise. However, at the parent WM node, the parent WM can determine that the responsible WM for the same widget is a parent WM of a different enterprise. In an example case, the remote WM can correspond to the manufacturer of that particular widget. In another example, the remote WM might represent a business combination of all makers of widgets, and so on.

In some cases, a node can be configured to act as a forwarding and routing agent for other nodes. For example, a manufacturer can identify a single externally accessible node for all updates from outside the enterprise. Once the updates are received at this node, the node can consult its own, internal, responsible-WM mapping table and disperse the updates according to the product class. This can spread the computational and data storage load in a way which is not visible outside the enterprise.

The following paragraphs describe one implementation of a protocol to exchange state information between WMs. This implementation uses a state exchange message to exchange state data between WMs. The message parameters include the UID of the item, the current state of the item, and the time stamp of when the state last changed. The recipient of the state exchange responds with an acknowledgment message that indicates the current known state and time stamp. The State exchange message is resent until an acknowledgement is received.

Item Creation

When an item is first created at a physical site of a manufacturer (Enterprise A), the local WM for the physical site (world model WM_AL1) receives a "creation of item" disposition action. WM_AL1 then creates a logical representation, for example, an object representation of the item and designates the object as being in the "active, dirty" state.

An object's state can be designated using a combination of flags that include: "active", "deferred", "pending" or "dirty" flags. "Active" implies that the object represents the most recent version of the object. "Deferred" implies that some other world model has the unique active version. "Pending" is a temporary designated used while the system fetches the correct designation. "Dirty" implies that the status has changed in a business significant way since the last report to the responsible WM.

WM_AL1 then reports the item creation to the responsible WM (WM_AP). This report can take the form of a state exchange message.

WM_AP creates a local object that is designated as "deferred". WM_AP then places the object in a WhereUsed list for WM_AL1. The WhereUsed list is a mapping that keeps track of which objects are located in which local WM.

WM_AP then sends a state-exchange-and-acknowledgment message to WM_AL1. This state-exchange-and-acknowledgement message may also include information that the Parent wishes to be associated with the newly created item. Upon receipt of the acknowledgement, WM_AL1 removes the "dirty" designation from the object.

Subsequent Business Significant Changes

Once an item is created, subsequent business significant changes are also reported to the responsible WM. WM_AL1 changes the object's state to "active, dirty", sends a state exchange message to the responsible WM (WM_AP), and clears the "dirty" flag upon receipt of acknowledgment from WM_AP that the change has been recorded.

Movement Out of the Site

When WM_AL1 detects the item at the exit gate of the site, WM_AL1 reports this to the responsible WM as a business significant event. WM_AL1 sets the object state to "deferred, dirty" and sends a state exchange message to WM_AP. WM_AP updates the local object to be "deferred" and sends an acknowledgment to WM_AL1. WM_AL1 clears the dirty flag upon receiving the acknowledgement.

Gathering and Communication Destination Information

In some cases, the destination of the item is known. The destination could be another site within the same enterprise or the destination could be another enterprise. For example, the business documents associated with the item may contain destination information. Business document information is obtained by communication with conventional Enterprise Software systems, such as ERP (Enterprise Planning Systems). For example, business information can relate particular shipments, represented by a hierarchy of item tags with shipment and order numbers understood by conventional systems. Organizations, sites, shipping addresses are all associated with unique UIDs similar to the UIDs assigned to physical items. The target WM to receive advance notice of a shipment can be explicitly specified within a field of a shipment record or may preferably be calculated using the same mechanism as used for finding the responsible WM for a physical item.

For example, the responsible WM routing and update mechanisms can be used to direct advanced notice of the shipment hierarchy in the following way. A shipment destination record can be created with a UID whose responsible WM calculates out to be the WM which is expected to receive this shipment. Once this shipment is physically assembled and the specific item tags are known for the shipment, this tag hierarchy can be recorded as a change to the shipment destination record. Any change to this record can be automatically communicated to the responsible WM, which has been set up to be the actual target destination WM. Once the physical shipment reaches that WM, it can have all the tag information to fully verify the precise shipment contents.

In other cases, the destination of the goods is not known within the system. This can be the result of a lack of integration with ERP Systems. The overall system can handle both cases.

Movement to Another Site within the Same Enterprise (Site AL2)

If the destination is known, WM_AP places the object in the WhereUsed list for WM_AL2 and sends a state exchange message to WM_AL2. When the item reaches site AL2, WM_AL2 changes the object's state to "active, dirty" and sends a state exchange message to the WM_AP. WM_AP updates the local object and responds with a state-exchange-and-acknowledgment message.

In some cases, the destination is not known in advance. When the item reaches the destination site AL2, WM_AL2 creates a local object with "pending, dirty" state and sends a state exchange message to WM_AP. WM_AP updates its local object, moves its local object to the "WhereUsed" list for WM_AL2 and responds with a state-exchange-and-acknowledgment message to WM_AL1.

Movement to Another Enterprise (Site BL1)

If the destination is known, WM_AP sends a state exchange message to the parent WM of the destination site (WM_BP). WM_BP creates a "deferred" object and places it in the WhereUsed list for WM_BL1. WM_BP responds with a state-exchange-and-acknowledgment message an acknowledgment to WM_AP and also sends a state exchange message to WM_BL1. WM_BL1 creates a "deferred" object and places it in an incoming list. WM_BL1 responds with a state-exchange-and-acknowledgment message to WM_BP.

Once the item reaches site BL1, WM_BL1 changes the object's state to "active, dirty" and sends a state exchange message to WM_BP. WM_BP updates the local object and responds with a state-exchange-and-acknowledgment message. WM_BP then sets the dirty flag and sends state exchange to the responsible WM, namely WM_AP. WM_AP updates its local object and WhereUsed list and responds with a state-exchange-and-acknowledgment message to WM_BP.

If the destination is not known in advance and the item reaches BL1, WM_BL1 creates a "pending, active, dirty" object and sends a state exchange message to WM_BP. WM_BP creates a "pending, active, dirty" object, places it in the WhereUsed list for WM_BL1 and responds with a state-exchange-and-acknowledgment message to WM_BL1. WM_BP then sends a state exchange to the responsible WM, namely WM_AP. WM_AP updates its local object and WhereUsed list and responds with a state-exchange-and-acknowledgment message to WM_BP.

Reducing the Volume of Data Communication Between WMs

In an alternate implementation, as between a particular local WM and a particular responsible WM, the two WMs can be configured such that not every item within a shipment or hierarchy of items needs to be reported to the responsible WM. Which items get reported can vary between different pairs of WM.

Information defining the item hierarchy can be provided to both the local WM and the responsible WM. For each item that is detected at the local node, the local WM can verify each item against the provided hierarchy information. However, when reporting to the responsible WM, the local WM can report only items for a certain level (e.g., the top-most level) in the hierarchy with an additional indication that all items under this hierarchy have also been verified.

Reliability Under Message Loss or Duplicate Transmission

"Pending" or "dirty" states are reliably converted to "active" or "deferred" states because the state exchange message is automatically retried until an acknowledgement is received. In some cases, a duplicate transmission can occur, for example, after a WM reboots from persistent storage. Because state exchange messages carry a timestamp, they are acted upon only if the deferred entity is older than the incoming update.

Conventional mechanisms, such as NTP (Network Time Protocol) or GPS clock receives can be used to synchronize clocks across networks. However, the system can operate without a high degree of clock synchronization.

Cold Restart of the System

The system can be rebuilt from blank local WMs. Any subsequent detection of an item causes the creation of a "pending" object. Once all items have been seen, the WM will be complete.

Periodic Cleanup

The local WMs can periodically request updates for "pending" or "dirty" objects or objects that have not been updated for a certain period of time. Objects that have not been referenced for a certain period of time can be purged to free memory. The responsible WM can purge or move to long-term storage objects that are not referenced for a certain period of time.

3.4. Per-item Identification Scenario in International Trade

The following scenario describes a system and method for tagging and tracking technology to the needs of a government customs service in handling information related to imports, with reference to FIG. 54. The application described below is based on a core networked information environment for an item tracking system (ITS) that will be referred to as the ITS core. The ITS core provides the following functionality to support the present application of handling information related to the import of goods across international borders.

It receives and maintains information from tag reader systems identifying individual items read by the reader and, generally, provides context information such as the intended disposition of the items.

It receives and maintains information specifying the physical relationships between and among items, including changes in such relationships, such as that one item is in or on another (e.g., a bottle is in a box; the box is on a pallet; the pallet is put in a container; a container is put on a ship).

It receives and maintains property information relating to items in an extensible form, allowing applications using the core to add new kinds of information to the information maintained by the core about items without requiring any reprogramming of the core.

It provides such information in a universally-accessible form—such as in the form of self-describing XML (Extensible Markup Language) documents—across enterprise boundaries.

The ITS core provides receives and maintains information specifying the logical relationship between and among items and more generally between and among logical as well as physical items. For example: The ITS receives information about a planned shipment that specifies (a) the exporting source factory, (b) the destination recipient, (c) the responsible importing agency, (d) the list of specific products to be imported with the unique tag identifiers, and (e) unique references to specific customs rules for each type of item.

The logical items (a, b, c, e) are treated like physical items and have specific entries in the ITS. The ITS uses the incoming information to build and maintain the logical relationship among the physical and logical items. This allows any reading of a physical item tag in the shipment, for example by a customs officer at the port of entry, to immediately relate to the corresponding shipment document and to the claim relevant customs rule. Similarly any reference to any of the importing parties can immediately lead to a list of the items in the shipment (or shipments). The logical item structure includes relationships with pallets, containers, vehicles, and other units of packaging, storage, or transport. The position of ships can periodically get updated, thus giving a real knowledge of the location of goods planned to enter a certain port. Hence, as a ship comes into port the customs service can know the precise goods and their transportation and custody history without need for consulting paper documents. This information can be used to schedule appropriate personnel, give focus on suspect importers, and otherwise support customs operations.

The ITS maintains a history of all movements of items as reported by tag readers and other information sources. This information can be used by the customs agency for its own surveillance and statistical purposes. This information is also very valuable to importers, shippers, and others who need to track the current location and disposition of their shipments.

In the implementation to be described, the ePC contains the unique item identifier and item class as an extension of EAN (European Article Number) or UPC (Universal Product Code) information, while PML (Physical Markup Language) documents are used to contain the physical description of an item.

The ITS core is an open, highly-scalable, real-time asset tracking infrastructure that collects, integrates and distributes real-time asset information from an infrastructure of networked item-unique tags into enterprise applications. This infrastructure is built with suitable tag readers and these readers are connected through a network into one or more ITS systems. Thus the movement of these tagged items can be tracked real time from a central location each time the item is reported by a tag reader. Networked tags create a bi-directional communication path between enterprises and a universe of uniquely identified tangible and intangible items, called smart-items, and the stakeholders that hold and manage them. Some of the tags may be smart, resulting in smart items. Smart items and machines have tags that contain and communicate any information end-users write to the tags.

In addition to commercial information written to a tag, such its ePC, PML, size, weight, price, warranty, history; tags can also contain regulatory and customs information, such as product-level rules and regulations, taxes and tariff information, updated trade agreement rules, preferential treatment instructions, the tariff schedule for one or more countries, import restrictions for one or more countries, storage instructions, hazardous material management information, and any other information required by a customs service to process shipments rapidly and achieve modernization objectives.

The ITS has information about location, state, customs processing status, and other information about all the tagged items processing through the system. This information can be provided either directly from the ITS or through existing and new applications which gather data from the ITS. Because the ITS core is open, generic, application agnostic and independent, it can handle the huge number of events that a customs service expects to deal with, greater than 20,000,000 events per second for the U.S. alone, without burdening core enterprise software systems, such as conventional supply chain management and logistics systems. The ITS tracks very large quantities of individual items and shipping units, whereas conventional supply chain management systems are normally only concerned with tracking quantities of items. For example, the ITS may track 20,000 individual cameras, where the conventional supply chain management system would see this as a single entry.

The ITS core and the applications described here provide certain crucial functionality:

Detailed, item-type specific communication from a customs service to source manufactures and importers;

Secure, authenticated, detailed (pallet and item level, serial number specific) communication about items and planned shipments from source manufacturers to a customs service;

Automated, paperless tracking of goods from point-of-origin to port-of-entry and beyond;

The tag on each pallet or item ties pre-reported shipment plans directly to the physical imported goods without need to consult paper documents; and When widely implemented, networked instances of ITS core-based systems can show a real-time view of where many of the goods in the world trade system are located, the intended port of entry, and the pre-negotiated planned customs treatment of those specific items.

An ITS core-based customs system can act as a networked real-time asset data repository for national trade and customs agencies and PGAs (Participating Government Agencies), as well as authorized external stakeholders such as importers and exporters, trade expediters, foreign PGAs, shipping and logistics service, retailers and manufacturers.

Because the ITS core is an application agnostic and open network system, its data can be utilized by and seamlessly integrated into any enterprise application environment much like a database. The multi-dimensional real-time asset data can be used by any application for a variety of operational and analytical uses, such as supply chain management, customer and supplier relationship management, product lifecycle management, financial management, human resources management, security and business intelligence, to name a few. The real-time asset data is multi-dimensional in that it can have many components. For example, the ITS can track the time an item was moved, the relative position of the item in a container, the position of the container, the logical status, e.g., "checked and approved", the responsible shipper, the intended destination, and so on.

One or multiple instances of the ITS core and supported applications can be served on mainframes, client-server and distributed network environments and deployed as both a local private network as well as a global collaborative network, much like the Internet is used today. End-users are able to access ITS data through multiple touch-points, including desktop enterprise portals within private networks, the Internet, direct encrypted telephone connections, personal digital assistants (PDAs), and mobile devices and voice-over-telephone connections.

FIG. 54 illustrates stages of automated ITS information flow in a scenario involving the importation of goods into the U.S. and the use of ITS information by the U.S. Customs Service and other agencies and businesses—which generically will be referred to here as enterprises.

In FIG. 54, enterprises or groups of enterprises are represented by rectangles, their respective local ITS resources are represented by attached rounded oblongs, and the flow of information is represented by numbered arrows, the numbers in the figure corresponding to the numbers in the headings in the following description of the stages of the scenario. The local ITS resources for each enterprise can be one or more instances of an ITS core and supporting applications, which together make up a local ITS network. Single and multiple networks are illustrated only to simplify the figure. The scenario corresponding to FIG. 54 proceeds as follows.

5401:

The Retailer/End-user places order with an international manufacturer or supplier and specifies product classifications, quantity, pricing and contract terms, and so on.

5402:

The manufacturer produces products to the retailer's/end-user's specifications, assigns and writes ePCs and PML documents (PMLs) to each product's item-unique tags and provides this information to the ITS. (Alternatively, the PMLs and other information beyond the ePC could be recorded only in the ITS data store if the tags do not have the required storage capacity.)

The manufacturer writes relevant commercial data to each product's tag, such as price, warranty, date created, product category, weight, size, manufacturer, shipping conditions and instructions, and so on; places tags on packing and shipping containers of a shipment in appropriate hierarchy (boxes, palette, crate, barrels, and so on); and provides an item-ID for the shipment. All of this information is provided to the ITS in any event so that it is visible to every application that can use the information. Storage on tags is done for convenience of customs officials and others with hand-held readers who do not have convenient access to a network connection to an ITS site.

The manufacturer seals the shipment and confirms that the shipment is tagged and that the information on the tags is the same as for items intended to be shipped, uploads data to central and collaborative U.S. Customs Service ITS network. At the same time, the manufacturer sends order information to global shipping and logistics services for pickup and delivery. Finally, the manufacturer notifies retailer of shipment status in real time.

5403:

The U.S. Customs automatically sends updated tariff, special treatment and storage instructions, import rules and regulations and other pertinent regulatory information to PGAs, global shipping and logistics services.

5404:

The Global Shipping/Logistics Services automatically write U.S. Customs's regulatory and tax information to the ITS and to tags, to the extent the tags support this, on shipment boxes, pallets, crates, and so on associated with shipped products in appropriate shipment hierarchy. The Global Shipping/Logistics Services then groups and categorizes the shipment by ePCs and U.S. and foreign customs's specifications and regulations. The products and shipments are batched and placed in appropriate hierarchy and assigned to pallet, box, crate and delivery vehicle (truck, ship, air, car, and so on).

The shipment information is sent to appropriate local/foreign PGAs and customs; this information generally includes vehicle identifier information, import/regulatory information, weight, potential hazards, manufacturer, ePC, volume, and so on; data is assigned to items/boxes/crates being shipped. The shipment ID information can be uploaded to, or made available to, delivery vehicle GPS (global positioning satellite) and a customs smart-pass (similar to toll-road automobile smart passes) system that can be used for electronic clearing of the shipment. If needed, the Global Shipping/Logistics Services an provide real-time location, state and context information on all shipments in progress to U.S. and local customs, U.S. brokers, importers and logistics services, manufacturer, and retailer. The shipment is then executed and the logistics services uploads the shipment location and an estimated time of arrival to foreign customs service and PGAs

5405:

The foreign PGAs/Customs gives real-time advance shipment notice to all approved stakeholders, confirms and records outgoing shipment timing, location, and date with U.S. Customs. The foreign PGAs/Customs further automatically ensures that the shipment is in compliance with latest export requirements by product and shipment category, industry and shipment location. The appropriate PGAs and private stakeholders are notified of shipment. The foreign PGAs/Customs also ensures that the shipment is up to date with all export regulations and requirements, and that appropriate PGAs monitor shipment as appropriate. Finally, the foreign PGAs/Customs sends shipment storage and handling instructions to the appropriate shipment ports and agents.

5406:

The foreign customs agents/port ensures that the appropriate agents are notified of the shipment and are available when the shipment will be executed. The foreign and U.S. agents communicate special handling and storage instructions as required for the particular goods.

5407:

At the U.S. Customs Agents/Port, the following activities take place. Compliant shipping/logistics services' shipments are automatically scanned by local, non-intrusive reading systems while entering the port/border entry location. Non-intrusive tag readers automatically confirm that the products received are same as products identified and shipped by the manufacturer according to the ePC and PML. Compliance to all regulatory and security information written to original tags is also confirmed. If the shipment is incorrect or fraudulent, local agents are given an alert to perform manual inspection and take appropriate containment actions. Appropriate agents and PGAs are notified of shipment and are available when shipment is executed. The U.S. Customs Agents/Port can also automatically ensure that the shipment is in compliance with all current tariffs, preferential treatments, storage requirements, restrictions, regulations, and so on. The U.S. Customs is notified of inbound shipment and given real-time shipment information by product category, price, volume, industry, and so on as required for U.S. Customs statistics. Appropriate and correct tariffs and taxes are automatically charged and credited. All relevant shipment information is sent to the U.S. broker/importer. Some tags may be able to relay and confirm composition of items being shipped (for example, tires contain only tire material, not drugs or smuggled goods).

5408:

The Broker/Importer automatically confirms correct tariffs are charged, and notifies local logistics service and U.S. Customs of shipment status and terms. The broker/importer further ensures that the shipment is correct and in compliance with the retailer and manufacturer shipping terms and conditions.

5409:

The Local Shipping/Logistics Services notifies U.S. Customs of the shipment status and location, and delivers the shipment to retailer/end-user.

5410:

The Retailer/End User can log onto U.S. Customs ITS, or has access to another system which has access to status information from the Customs ITS, at any time, to identify exact shipment status, state, and location. Finally, the retailer/end user confirms correct shipment, notifies manufacturer and executes automatic payment; and confirms the shipment and tag information against shipping documents from manufacturer, shippers, and customs.

The foregoing scenario and system described with reference to FIG. 54 provides the follow benefits.

1. Trade and Economic Growth

Real-time and seamless customs processing can be achieved through use of non intrusive, tag-based inspection and examination. Shipment and tariff compliance levels can be increased. A real-time automated commercial processing and asset tracking network is presented and integrated with risk and security management systems across PGAs and private stakeholders. Networked public-private cooperation and coordination to and automatic assurance of fair trade practices is achieved. International trade agreements can be automatically administered and enforced. The prevention of predatory and unfair trade practices can be substantially improved through item-unique and smart tag technology and counterfeit alert. Fiscal management associated with revenue collection is automated through automatic tariff applications and updates.

2. Border Security

High risk travelers can be automatically identified and intercepted in advance of arrival through use of smart-cards or tags imbedded in passports, travel tickets, drivers licenses, or other forms of national and international ID. Non-intrusive individual identification systems can be deployed through remote tag readers. Advanced and real-time awareness of hazardous materials, weapons, and munitions shipments can be achieved. The exchange of information with private industry and PGAs regarding export and import of sensitive or controlled commodities can be improved.

3. Narcotics Trafficking

Automatic, non-intrusive identification of potential narcotics shipments can be achieved through use of shipment and product telemetry (state, temperature, chemical composition, and so on) of high-risk shipments. Real-time data on identified or likely narcotics shipments from identified high risk shippers and countries can be obtained, thereby enabling better PGA notification, coordination and resource allocation. Advanced and automated deployment of tags to identified carriers, improving targeting techniques and interdiction tools can be achieved.

4. Criminal Finance

A non-intrusive investigative infrastructure can track automatic shipment payments, match actual payments against actual shipment prices and terms. False or incorrect shipment payments; potential real-time disruption of criminal financing activities can be automatically identified. Several countries, including the European Union, are considering imbedding tags in actual currency notes, enabling real-time tracking of large cash shipments.

5. Public Protection

A substantial reduction and improved advanced management and real-time tracking of potentially hazardous, harmful, and/or life threatening situations caused by forbidden or illegal commodities can be achieved. U.S. embargoes and sanctions against certain industries, organizations and/or foreign countries can be enforced automatically in real-time. A substantial reduction in fraudulent and/or counterfeit goods imports can be achieved through automatic and real-time shipment identification and confirmation systems. Non-intrusive inspection technologies, such as x-ray vans, RF and microwave airport security systems can be extend and maximized by enabling them to read select tags. Tag information can be associated with video-detection-based image recognition technologies for multi-media asset tracking.

6. Management Accountability

Agent allocation can be optimized based on expected shipments, the nature of shipments (hazardous materials, perishable goods, origin and so on), thereby ensuring that the right agent is available at right time, right location, for right shipment. Agent and port accountability can be increased through more reliable and rapid information by shipment. Real-time, automatic and accurate financial data, import statistics, resources and assets for every private and public stakeholder can be tracked. Annual and interim status and inspection reports can be automatically updated and completed. GAO (U.S. General Accounting Office) recommendations across all PGAs and stakeholders can be automatically implemented. Real-time border situational awareness can be achieved through: real-time import-export information by UPC, product category, industry, manufacturer, geography; Real-time U.S. balance of payments updates, U.S. Customs service information for Congressional Budget Office and Treasury; Full history of inspections, shipments, and so on; and Improved quality of service—automatic tariff, regulatory updates, statistical information can be shared private and public stakeholders.

In addition to the above-mentioned advantages, the following cost savings can be realized: perfect or almost perfect data accuracy and substantially reduced data-input redundancy and paperless processing for all tag compliant shipments; fewer customs agents required for manual inspections; substantially improved processing cycle times through automatic shipment identification and tariff application; reduction in production verification team visits for all tag system compliant manufacturers; automatic identification of fraudulent/counterfeit shipments, improved IPR (intellectual property rights) seizures on all tagged shipments; fewer tariff errors, ensures correct tariff is charged; fewer tariff/customs and trade disputes; resource optimization through improved customs information; automatic shipment confirmation/status information shared with importers/exporters—save money from expediters; increased real-time coordination of PGAs for investigations and prosecutions on all tracked and targeted assets; and substantial increase in the number of cargo enforcement examinations utilizing non-intrusive inspection technology for all tag compliant shipments.

A customs service can also realize increased revenue from the use of such a system in the following ways: Automatic trade compliance consistent with all current trade agreements and revenue collection for all tagged shipments; Less border leakage and smuggling; improved tariff collection; Improve existing quality of service for higher and/or new service fees; Increased seizure of criminal assets, stolen and counterfeit goods; enable next generation services, such as real-time trade and balance of payment information that can be sold to private companies and other government agencies.

3.5 Item Scenarios

The following paragraphs describe item scenarios.

When an item is created, the following scenario can take place. The item is manufactured and then associated with a specific Item-ID. As the item moves from manufacturing, it enters the tracking system at the first reader. The steps are: (1) create disposition indicating "new item" and all desired item properties; and (2) create a batch-ID binding reader and disposition. The system sees a sequence of disposition messages that are processed to create the system data for the new items.

When the item is transferred in a warehouse, the following scenario can take place. Prior to the transfer, the warehouse workers indicate to the system the planned action with the item. If the reader is in a fixed location and there is no ambiguity about the intended location—if, for example, a reader is on the door of a small storeroom or on a conveyor belt leading into a storeroom—then all this information can default. The steps are: (1) create disposition indicating "disposition—location change" and the location. (2) create batch-ID binding reader and disposition. The system sees a sequence of disposition messages that show the location changes.

When the item is shipped the following scenario can take place. Typically, the local ERP or logistics system has an entry that says a certain list of item types and quantities should be shipped to a certain customer at a given destination. The customer may be self. The system may provide the following identification and verification capabilities: (1) Identify the specific items to be shipped. (2) Verify that all the item types and quantities designated are in fact associated with the shipment. For example, verify the shipping and packaging process against the internal ERP system. (3) Identify all shipments intended to go onto a specific transport vehicle, for example the shipments to be loaded onto a specific truck. (4) Verify that all items are indeed loaded onto the correct transport vehicle.

During delivery, the system reports the estimated or actual location of the transport vehicle. In more complex scenarios, the goods may be resold and redirected while they are being transported. The system verifies that the correct items are unloaded at each destination. The system can optionally allow RFID sensing of shipment at its destination to act as proof of delivery and trigger billing. The system can optionally capture delivery time for shipment dynamically and update internal delivery time estimation.

Using these primitives, the following steps can be performed in going from stockroom to shipping. The local ERP system reports a planned shipment to a local ITS. The stockroom clerk uses a system application to: select shipment ID from list; select disposition type of SHIPMENT; identify local reader ID; and produce unique batch-ID. The clerk uses existing procedures to pull items from stock and passes them by the reader. The reader sends a sequence of disposition messages to the system, of the form:

Timestamp Batch-ID Item-ID.

The clerk indicates completion of the batch on the system application. The system application can immediately indicate any discrepancies, such as missing items or extra items. These discrepancies can be fixed locally using the reversal disposition.

Using these primitives, the following steps can be performed in going from shipping to transport. The shipping clerk uses the system to confirm that certain shipments (already known to system) will be loaded onto a certain transport vehicle (e.g., a truck). This action associates a certain reader (at the loading dock for the truck) with a vehicle and, indirectly, with a set of shipments. The result is a batch-ID. The reader sends to the system a sequence of disposition messages of the form:

Timestamp Batch-ID Item-ID.

The clerk indicates completion of the batch on the system application. The system application can immediately indicate any discrepancies, such as missing items or extra items. The system knows the full set of shipments that should be loaded on this truck. These discrepancies can be fixed locally using the reversal disposition. Any query to the system about any specific item shows that it is on this truck and is part of a designated shipment-ID known to the local ERP system. Hence, if an item falls off a truck, all information, both from the system and the local ERP system, can be discovered.

Using these primitives, the following steps can be performed in going from transport to receiving. The truck pulls into a loading dock at one of the shipment points. The system associates the shipping destination address for any given shipment with a known system location. The receiving clerk pulls up the system application and is shown a collection of shipments scheduled for delivery by a certain vendor. Alternatively, the shipping clerk enters the ID of the truck and is given a list of associated shipments. If the tractor part of a tractor-trailer truck changed en route, the driver may carry a shipment designation, or even a tag, to identify unambiguously the shipment(s). Ultimately the clerk uses the same transport data object used by the original shipping clerk(s). Multiple sources may load shipments onto the same truck.

The system application knows precisely which items should be unloaded from the truck, even when multiple shipments are involved. The disposition type is indicated as "unloading at default location". The result is a batch-ID. The reader sends a sequence of disposition messages to the system of the form:

Timestamp Batch-ID Item-ID.

The clerk indicates completion of the batch on the system application. The system can immediately tell whether extra material was unloaded or if part of a shipment is still left on the truck.

Finally, the system knows that the shipments have been delivered, and can trigger a billing message.

Reliability Issues

All messages are delivered, but they may appear in arbitrary order and some may be replayed. The system can accommodate crashes of various computers in the system and the possible replay of accumulated messages. For example, each computer in a chain can accumulate and record to disk a set of messages. When an upstream system crashes and restarts, it can request replay of prior messages or replay what appear to be unsent messages stored locally.

The system can be immune to an arbitrary replay of events. For example, the system may encounter the following:

Timestamp-1 Item X is read and reported as part of batch B1.

Timestamp-2 Item X is read and reported as part of batch B1.

This sequence is a simple repeat and is typically filtered at the lowest level possible, but may be passed to the system.

Next, an operator may discover that moving Item X was a mistake, and enter a reversal:

Timestamp-3 Reversal Item X

Some part of the system may then crash, producing the following replay:

Timestamp-2 Item X is read and reported as part of batch B1.

If the reversal is not replayed, perhaps due to some aspect of how the system crashed, the system will see:

Timestamp-1 Item X is read and reported as part of batch B1.

Timestamp-3 Reversal Item X (batch B1)

Timestamp-2 Item X is read and reported as part of batch B1.

The correct interpretation, however, is no movement of Item X. To get such an interpretation, the reversal is made sticky—for example, reversals are accumulated and effectively replayed after every no-replay event of a given batch.

With an accurate distributed clock (+/−a few milliseconds), the system records the time stamp of each disposition with each item—including reversals. The system could ignore disposition messages that are younger than the latest message received, producing the correct result in the previously described sequence. However, this method does not always produce the correct result.

For example, suppose the events and corresponding timestamps are as follows:

Item X is moved:
Timestamp-1 Item X is read and reported as part of batch B1.
Item X moves again:
Timestamp-2 Item X is read and reported as part of batch B2.
Operator thinks that moving Item X was a mistake:
Timestamp-3 Reversal Item X (batch B2)
The system crashes or some other event causes scrambling, such that the system sees:
Timestamp-2 Item X is read and reported as part of batch B2.
Timestamp-3 Reversal Item X (batch B2)
Timestamp-1 Item X is read and reported as part of batch B1.

The simple algorithm of ignoring all but messages that are newer than the most recently received message for this item means that the system will ignore the batch B1 message and the batch B2 message will be (correctly) ignored. However, the system will think that item X is in the state prior to batch B1, which is wrong. A more effective algorithm during system recovery is to sort all available messages from within the recovery time window by their time stamp and then process all messages in order.

3.6 Information Retrieval Scenarios

The system can be implemented to provide a human level query interface, or this can be done by associated systems, or both.

Examples of queries and some capabilities for the query interface, independent of where it is implemented, are as follows.

The basic query is: Where is a specific item? For example: Where is this specific vial of medicine? This query is low cost and easy to implement using conventional query building techniques. Such techniques can also provide a query building mechanism that allows interactive selection of qualifiers like item time, manufacturer, and so on to isolate an individual item. That is, the user may not know the actual item-ID, and may have to query the system to identify medicine manufactured on a certain date and shipped to a certain pharmacy, and so on.

Another query is: Where are the items of a specific type? For example: Where are all the D-cell batteries in the world? There may be numerous item-types (eUPCs) for D-cell batteries, given multiple manufacturers, multiple chemistry types, packaging, and so on. A reasonable interface allows building a query that spans multiple types.

Other queries are: Where are the items in a given geography? For example, Where are all the size D batteries that are within 100 miles from Seattle? Or: Where are the items in a given shipment range? For example: Where are all the size D batteries that are within 4 hours of Seattle? Such queries can be supported by first building a table of expected shipping delays from different geographical locations to Seattle. With this complex geography defined, the system could then search for items within the geographic table.

The system can also support queries such as: Where are all the items with given properties? For example, Where are all the medicine bottles that have (Current date—Creation Date) >2 years? Where are all the radial tires made by Firestone between Jan. 1, 2000 and Jan. 1, 2001? What is the average storeroom-waiting period for this item-type? How long do size D batteries sit in storerooms prior to transfer to a retail location? How long do size D batteries sit on retail shelves until sold?

The system can be implemented to provide various statistical options, for example, to provide for the calculation of the mean, standard deviation, distribution, minimum, and maximum values. Thus, the system can support queries such as: What is the average shipping time between location X and Location Y? For example: How long does it take to ship from Chicago to Seattle for products made by Acme?

Implementation Strategies for Advanced Queries

An overall system, consisting of a federation of ITS implementations that communicate with each other plus additional application software—including a geospatial application—is able to use data gathered from the simple scanning of passive tags to predict dynamically the location of items and answer complex queries. Such queries might otherwise require much more expensive location tracking technology for each item.

Examples of advanced queries include: Where are the Duracell batteries that can be shipped to Seattle within 4 hours using normal shipping methods? All roads through Colorado are closed; which shipments may be affected? What are the estimated current locations of all shipments of ground beef?

Shipping Delay Related Queries

The system knows when a shipment is loaded onto a truck, the destination of the shipment, and when unloading of the shipment at the destination is complete. Hence the system can record and log this information for every pair of starting-location and ending-location appearing in the system. The accumulation of this data allows the system to compute statistics on shipment time, e.g., mean, mode, standard deviation, maximum, minimum, and so on. Hence, time-based queries are possible, such as: Where are the Duracell batteries that can be shipped to Seattle within 4 hours using normal shipping methods?

There are several possible methods for responding to shipping delay queries. For example, in a first method, the steps are as follows: (1) Identify all item-types corresponding to Duracell batteries. (2) Identify, based on item-type, all the stocking locations for Duracell batteries within a certain maximum geography (e.g., Canada and the U.S.) which have available stocks of batteries. (3) Identify all destinations within the Seattle statistical area that have received Duracell batteries in the past. This action is a simple geographical search based on Seattle, battery item types, and accumulated history. (4) Based on the list of destinations from step 3, find all mean shipment time entries with those destinations. Note the starting-location for each shipment delay. (5) Find the intersection of the starting-locations in step 4 with the available stock locations from step 2. (6) Sort the starting-location/destination-location/mean-delay records identified in step 5, based on the delay. Select those where the mean-delay meets the criteria of 4 hours or less. (7) Step 6 gave the answer to the query; the resulting locations may be shown on a map. (8) Other information, such as shipping cost may be available to refine the choice, so that, for example, the system returns the possible sources in order of the lowest shipping cost.

This method only considers starting-locations that have been used in the past to ship to Seattle. The search could be expanded to examine combined historical shipment segments, where the total expected delay, within some tolerance, of the sum of the segments does not exceed the goal given.

The above method can also be easily modified to find the cheapest source of batteries for Seattle, independent of shipment time.

The first method identifies the shipping delays and possible sources of goods based on historical shipments of batteries. A second method uses commercially available route planning software and services. These established solutions estimate an optimized route and driving (or other transportation) time between any two locations in the U.S. or in other countries. Using this technology as a base, the following steps can be used to answer the query: (1) Identify all item-types corresponding to Duracell batteries. (2) Identify, based on item-type, all the stocking locations for Duracell batteries within a certain maximum geography (e.g., Canada and the U.S.) that have available stocks of batteries. (3) Using route-planning software, build a table of driving times from each location with stocks of batteries to Seattle. (4) Sort the table and identify those stock locations that are within 4 hours driving time of Seattle.

This second approach identifies shipping paths that are possible but not often used in practice. For example, for tax and other reasons, Duracell may never ship batteries from Canada to the U.S. The above method might show that the quickest source of batteries from Seattle was Vancouver. It would then be a business judgment whether to use this source.

Shipment Interruption Queries

The system knows the source and destination of all current shipments. The system also knows the start time and average delivery time of each shipment for every pair of starting-location ending-location. Hence, it can respond to queries such as: All roads through the state of Colorado are closed. Which shipments may be affected?

There are several possible methods for responding to shipment interruption queries. For example, in a first method, illustrated using FIG. 21, the steps may be as follows: (1) Identify the geographical region of the travel disruption, for example, the state of Colorado. Approximate the region with a rectangle 2110. (2) Identify all current shipments and those planned for time period of interest. (3) For each shipment perform the following steps: (a) Form the bounding box 2120 of the starting-location 2130 and ending-location 2140. (b) Determine whether the bounding boxes intersect or overlap. (c) If they intersect in any way, there is considered to be a potential for disruption. As described later, there may be disruptions even in the absences of an intersection, depending, for example, on highways, mountains, waterways, and so on. See below.

This method provides a basic and general indication of potential disruption. A more specific indication may be formed by looking at the straight-line path 730 from starting-location to ending-location. If the travel disruption intersects this line, there is a stronger indication of potential disruption.

In a second and more precise method, illustrated using FIG. 22, there is the notion of a transport route.

In the second method, steps 1 through 5 of the first method are used to indicate whether the travel disruption 810 is likely to affect a specific shipment. If the bounding box intersects the travel disruption, the details of the planned transport route are examined, for example, by considering way-points 2220. If planned route intersects the travel disruption rectangle then there is substantial potential for a disruption. The diagram shows that while the travel disruption blocks the straight-line path, it does not actually block the planned path 810.

In a third method, illustrated using FIG. 23, more detailed routes can be provided. Such routes can be provided either by direct entry of the details of each route, by street name, or by use of route-planning software. Such detailed information allows for more exact detection of disruptions to vehicle transport on established roadways. The steps are: (1) Define the travel disruption 2310 in terms of highway or road segments that are blocked. (2) Find all transport-routes 2320 for all shipments within the time-window. (3) Match the travel disruption road segments against the planned routes. Where they match, the indicated route will be disrupted.

Real Time Location Presentation and Queries

A Real Time Location System (RTLS) can provide continuous tracking of objects. Such tracking is normally done with a transponder, which may be expensive. The system can take items which carry inexpensive passive RFID tags and give the approximate capability of a RTLS.

Thus, there are two fundamental approaches to location queries. In the first approach, the transportation system (for example, truck, boat, plane) has an RTLS. The real time location of all transportation is monitored, and the system associates from a specific item to the transportation and thence to the location. In the second approach, information gathered from reading passive tags at fixed locations and information about planned shipments is used to approximate the current location of items. This approach is much cheaper and provides many of the benefits of the transportation RTLS approach without needing any RTLS infrastructure. It can also work with third party carriers.

If there are RTLS capabilities on the transportation, the formal shipment process associates a shipment with a mode of transportation. If the transportation is itself a tagged-object, such as a truck with a RTLS-style tag, the system knows the exact location of the shipment at the time of the most recent RTLS update.

An example location query is: Show the estimated current location of all shipments of ground beef. The RTLS method follows these steps: (1) Lookup the item-type of the desired ground-beef shipments. (2) Find all current shipments of this item-type. (3) Identify the transport vehicle associated with each shipment. (4) Find the location of the transportation tagged-object by finding the most recent RTLS update for that tag. (5) Show the current locations graphically, based, for example, on latitude and longitude.

Without RTLS capabilities, the system knows when a shipment is loaded onto a truck, the destination of the shipment, and when unloading of the shipment at the destination is complete. Hence the system can record and log this information for every pair of starting-location ending-location appearing in the system. The system can then compute mean, or average, shipment time. This information allows the system to estimate the current location of a shipment, optionally with confidence ranges.

This method addresses the sample query (show the estimated current location of all shipments of ground beef) as follows: (1) Lookup the item-type of the desired ground-beef shipments. (2) Find the average shipping time for these shipments based on prior history. (3) Find all current shipments of this item-type. (4) Compare, for each shipment, the difference between the recorded start time and the current time, and the average delivery time. This quantity estimates the percentage of the journey completed.

The current location can be estimated and displayed in several different ways.

In the straight-line method, illustrated using FIG. 24, the entire delivery journey is approximated by a direct straight line path from the starting location to the ending location. By computing the estimated percentage 2410 of the journey completed and assuming a straight line path, the location 2420 of the shipment can be estimated. This method does not correspond to real world roads and highways, but it gives an acceptable approximation of the location of the goods relative to the destination.

In another approach, illustrated using FIG. 25, a detailed route for each shipment is constructed, as discussed above. This approach may provide, for example, a detailed sequence of path segments 2510-2518, which can be highlighted on a map. Route planning software can estimate travel time to any give point on the path. For example, in FIG. 25, the estimated drive time to each interchange point is estimated and illustrated. Based on a knowledge of the actual start time, the system can estimate the current position of a delivery vehicle at the level of a specific position on a specific road. This approach is particularly useful for determining the affect of a known transport interruption, such as a closed bridge.

4. Data Transfer Between the Item Tracking Systems and the Tag Readers

The following paragraphs describe implementations of the system which have intervening hardware and software between the tag readers and the ITS. Alternatively, the functionality of the intervening hardware and software can be integrated into the ITS, for example, as part of the OIC 104 shown in FIG. 1.

4.1 Event Routers

One implementation of the system uses one or more event routers to forward information between the ITS and the tag readers. Events are messages that are passed from one software entity to another. Events can be used to notify the recipient of the event about some occurrence or to send a request to the recipient. An event router can be used to distribute events between various entities. Examples of suitable event routers include the topic-based KnowNow® event router, available from KnowNow Incorporated of Mountain View, Calif., or the content-based Elvin messaging service available from the Distributed Systems Technology Center of Queensland, Australia. The topic-based and content-based event routers can also be used in combination.

For illustrative purposes, the system will be described in terms of its use in a specific scenario, an inventory management scenario.

FIG. 36 illustrates a retail location in relation to an item tracking system (ITS) used as part of an inventory management system. The retail location is a store. The store has inventory that includes tagged items. When tagged items are brought into or removed from the store, this can be detected by a monitoring system 3610.

The monitoring system 3610 includes multiple tag readers positioned at one or more locations within the store. The monitoring system 3610 also includes memory that stores the current state of each item in the inventory. The state indicates whether the item exists at the given location or has been removed from the location. The monitoring system 3610 also includes computer logic that determines when the state of the item has changed, e.g., when the item has been added or removed from the given location.

The logic can be further configured to send an update whenever it detects a change in the state of an item. The inventory update can take the form of an event that includes the ePC of the item, the ePC of the tag reader, and a timestamp. The event can also include an IN/OUT parameter that specifies whether the change is an addition or a removal of the item.

In one implementation, the monitoring system 3610 includes one or more smart shelves. Smart shelves are shelves that are capable of reporting when physical items are added to or removed from the shelf. A smart shelf contains multiple tag readers positioned at one or more locations on the shelf. A smart shelf also includes computer logic for determining whether an item has been added to or removed from the inventory.

An ITS 3620 maintains tracking information for multiple items including the items belonging to the store inventory. Whenever items enter and leave the store, the ITS receives an event from the monitoring system 3610 and updates its data storage to reflect the event.

An inventory planner 3640—a computer program solution—normally operates on a periodic schedule to perform inventory management functions. In the operations that relate to the store, the inventory planner 3640 retrieves inventory data from the ITS 3620 and determines whether to replenish the store inventory. The inventory planner 3640 can receive alerts from an early warning agent (EWA) 3630 that can cause the inventory planner to perform at least some inventory management functions, at least in relation to the store, outside of its normal periodic schedule. In particular, the EWA 3630 can send an alert to the inventory planner 3640 to cause the inventory planner to determine whether replenishment of store inventory is needed. Whenever items enter and leave the store, and optionally even when they more from one part of the store to another, the EWA receives an event from the monitoring system 3610. Using the information received in such events, the EWA determines when to send alerts to the inventory planner 3640.

The Early Warning Agent

The EWA 3630 includes logic for determining when to send an alert. The determination of whether to send an alert includes applying one or more rules to the information received in inventory updates. A rule specifies a certain condition and a certain action to be performed when the condition is met. For example, a rule can specify that an alert should be sent whenever the inventory level drops below a specific value.

The EWA 3630 can apply a predetermined set of rules, or alternatively, the EWA 3630 can include artificial intelligence logic that enables the EWA 3630 to adapt its behavior in response to current or historical inventory patterns. The artificial intelligence logic enables the EWA to estimate potential variation in inventory levels in the near future in order to identify potentially risky situations early enough to allow for corrective measures. For example, initially the rules may specify that an alert should be fired when the inventory drops below 10. However, if the EWA 3630 detects that it sends alerts much more frequently during the summer season than during other seasons, the EWA 3630 may adapt to this seasonal variation by increasing the threshold from 10 to 20 during the summer season so that the inventory planner 3640 is notified earlier of the impending inventory shortage. This adaptive behavior occurs with minimal human intervention, and with minimal need of parameter adjustment or any other kind of manual calibration.

The EWA 3630 can retrieve and analyze current and historical inventory data to detect trends such as deviations between planned replenishment and actual replenishment and to build a predictive model of future inventory needs. These trends and predictions can be determined using linear regression, classification and regression trees, or other stochastic algorithms.

In one implementation, the EWA 3630 estimates the potential variation for each planned replenishment or consumption activity that may affect the inventory (e.g., given historical performance data, it estimates that a planned truckload of 12 oz Bottles from Bob's Bottles will arrive any time within 4 hours prior to 6 hours after the planned delivery time, with a quantity that is between 95% and 100% of the requested quantity). The EWA 3630 compares the promised and actual delivery time for various quantities of inventory delivered in the past to generate predictions for actual delivery dates and quantities for future replenishment activities that are planned but not yet completed. The EWA 3630 combines the estimates of potential variation for several individual activities into an estimate of the potential variation for an entire inventory. These algorithms can be implemented using decision trees such as classification and regression trees.

In another implementation, instead of considering individual activities, the EWA 3630 builds the predictive model based on aggregate data that represents cumulative levels of replenishment and consumption. These algorithms can be implemented using a probabilistic inference model such as conditional Gaussian approximation.

Further details regarding the algorithms used by the EWA 3630 can be found in commonly-owned, co-pending U.S. patent application for Inventory Early Warning Agent, U.S. provisional application Ser. No. 60/384,638, filed May 31, 2002, the contents of which are incorporated by this reference.

Inventory Planner

The inventory planner 3640 can be any application that generates inventory replenishment plans. One such inventory planner 3640 is the Advanced Planner and Optimizer (APO) available from SAP AG.

The inventory planner 3640 includes logic for generating replenishment plans. The logic includes logic for receiving an alert from the EWA 3630 and, in response to the alert, determining whether replenishment is needed.

In one implementation, the inventory planner 3640 generates replenishment plans for an entire inventory. An EWA 3630 monitors a portion of the inventory. Multiple EWAs 3630 can be combined to cover the entire inventory. An alert pertaining to one portion of the inventory triggers the inventory planner 3640 to make a determination as to whether the planned replenishment for the entire inventory needs to be re-planned.

The determination can include retrieving inventory data from the ITS 3620 and determining or forecasting demand based on the retrieved inventory data. For example, a trend of high demand for product X may cause the inventory planner 3640 to plan for not only more product X but also more product Y, a product for which product X is known to be a leading indicator.

As shown in FIG. 3700, an event routing middleware such as an event router (ER) 3710 can be used distributes events between various entities, for example, between the monitoring system 3610, the ITS 3620, the EWA 3630 and the inventory planner 3640. Examples of suitable event routers include the topic-based KnowNow® event router, available from KnowNow Incorporated of Mountain View, Calif., or the content-based Elvin messaging service available from the Distributed Systems Technology Center of Queensland, Australia. The topic-based and content-based event routers can also be used in combination.

Content-based Event Routing

In one implementation, messages are routed from the publishers to subscribers based on the content of each message. The content of each message can be partitioned into multiple content fields. For example, a message relating to an item having the ePC, 01.0037F2.001508.000319F827 can be split into the following content fields:

| | |
|---|---|
| (1) Header: | 01 |
| (2) Manufacturer: | 0037F2 |
| (3) Product class: | 001508 |
| (4) Serial number: | 000319F827 |

(5) Message type: seen@, request, response—A seen@ message is a message reporting that the item has been detected at a particular location. A "request" message is used to send a request to a subscriber and a "response" message is used to publish the requested information. Other message types can also be defined.

The subscriber can specify message filters based on the value of the content fields (e.g., manufacturer=0037F2 & message type=seen@).

Topic-based Event Routing

In an alternate implementation, events can be categorized according to topics. A software entity may only be interested in events pertaining to certain topics. The software entity can subscribe to only certain topics and it will only receive events pertaining to those topics and not to others.

FIG. 38 shows a topic structure based on the structure of an ePC. A separate topic can be created for each of the data fields of the ePC, namely, the manufacturer, product class and serial number. For example, for an item having the ePC 01.0037F2.001508.000319F827, the following topics can be created:

(1) \centauri\0037F2\001508\000319F827\seen@—This topic covers "seen@" events relating to the item.

(2) \centauri\0037F2\001508\000319F827\*—This topic includes both the events reported to topic 1 and also other kinds of events relating to the item, such as "request" and "response" events.

(3) \centauri\0037F2\001508\*—This topic includes both the events reported to topic 2 and also events relating to other items within the same product class, 001508.

(4) \centauri\0037F2\*—This topic includes all the events reported to topic 3, and also events relating to other items having the same manufacturer, 0037F2.

Separate topics can also be created for events pertaining to readers. For example, for a reader having the ePC 01.0B39C2. 000815.004711F827, the following topics can be created:

(1) centauri\0B39C2000815004711F827\Have-Seen-ePC—This topic covers events relating to a particular reader having detected a particular ePC.

(2) centauri\0B39C2000815004711F827*—This topic covers events relating to a particular reader having detected any ePC.

A topic-based event router has a topic set and each topic has an address, e.g., a URL. An event can be published to a topic by sending the event to the address for that topic. To determine the URL of the appropriate topic to publish an event to, a publishing entity such as the monitoring system 3610 (FIG. 37) can consult an extended object naming service (EONS) 3720. An EONS 3720 maintains mappings between item ePCs (or a reader ePCs) and one or more ERs, along with their corresponding topics. An EONS takes as input an ePC of an item (or reader) and returns the URL(s) for one or more identified topics. The EONS 220 can be implemented by extending a conventional ONS such as the ONS developed by Oat Systems and the MIT Auto-ID Center, which is further described in the Object Name Service Technical Manual (published by MIT Auto-ID Center). Conventional object naming systems are similar to and are based on the well-known Domain Name System (DNS) for the Internet.

Protocol Flow for Publication

In operation, as shown in FIG. 39, the monitoring system 3610 identifies that an item has been added or removed from the inventory. The monitoring system 610 generates an event which includes a tag identifier, a reader identifier and a timestamp. The tag identifier identifies the item that has changed. The reader identifier identifies the reader that detected the change. And the timestamp identifies when the change was detected.

The monitoring system 3610 then consults the EONS 3720 to determine where to send the event. The monitoring system 3610 provides the EONS with the ePC of the item and the ePC of the reader and receives back from the EONS the URLs for the item topic and the reader topic. The monitoring system 3610 then sends the event to both topics.

The ER(s) for the item topic and the reader topic routes the events to one or more subscribers. For example, the ITS can be a subscriber to the item topic and the EWA can be a subscriber to the reader topic. The EWA receives the event from the ER and determines whether to send an alert to the inventory planner.

If an alert is sent, this triggers the inventory planner to re-plan the replenishment of the inventory. To obtain the current data for the inventory, the inventory planner can send an event to the ER requesting inventory data. The ER then routes the event to the ITS, which responds by sending the requested inventory data to the inventory planner.

Protocol Flow for Subscription

As shown in FIG. 40, for each topic for which the subscriber wishes to subscribe, the subscriber first consults the EONS to determine the address of the ER for the given topic and then listens for events to be published to the topic.

Upon receiving an event, the subscriber can use the reader identifier contained in the event to determine the location of the item. The location can be a physical location (e.g., a specific latitude, longitude and altitude) or a logical location (e.g., inside container XYZ or truck ABC). The subscriber can also use the tag identifier to locate additional information about the item. For example, the tag identifier can be used to retrieve a PML (product markup language) document for the item.

As shown in FIG. 41, an EONS can maintain mappings between multiple tagged items (or readers) and multiple ERs. As discussed above, the mappings support multiple keys, including an item key and a reader key. The EONS can service multiple monitoring systems 3610 and other tag reader applications. In one implementation, the EONS is a distributed subsystem that includes mapping information, query servers for responding to queries requesting information location, and name resolvers that can receive an ePC and resolve the ePC into an ER location.

As shown in FIG. 42, a particular ER can distribute to multiple ITSs (as well as to other subscribers) and a particular ITS can subscribe to multiple ERs. A user can define a desired scope for each ITS and configure the distribution scheme accordingly.

4.2 Integration Engines

As shown in FIG. 31 an implementation of the system can use an integration engine 3110 that acts as an intermediary between the ITS and the tag readers. The integration engine 3110 can be implemented as intervening software and hardware between the tag readers and the ITS. Alternatively, the integration engine 3110 can be integrated into the ITS, for example, as part of the OIC 104 of FIG. 1.

The integration engine 3110 can communicate with the tag readers 102 as well as with other kinds of smart items. In this specification, a 'smart item' is an item or machine that can store and communicate data about itself to an external system. Any communication channel (e.g., radio frequencies, infrared) can be used. The communication process can lead to changes in the data stored in the smart item. More sophisticated smart items also have processing capabilities that enable them to interact with other smart items directly and, for example, negotiate a common behavior. Smart items can store and communicate different kinds of data including a unique item identifier (UID) and other item attributes for the item. Some have sensors that can record environmental data such as temperature, humidity, acceleration, or location. The communicated data can be real-time data or historical data, or both.

Examples of smart items include tagged items, RFID interrogators, actuator devices, aware goods and embedded Internet appliances. An interrogator is a tag reader and writer. An actuator device is a machine that moves or controls something (e.g., a conveyer belt, a vending machine). Aware goods are goods that can detect information about their environment (e.g., goods equipped with location or temperature sensors).

Support for a given sensor or actuator device is implemented using a hardware interface such as the exemplary hardware interface shown in FIG. 34. The integration engine 3110 collects data from different types of smart items 3120 and furnishes the collected data to higher-level applications 3130 including the ITS 103. The integration engine 3110 can also write data to the smart items 3120.

Integration Engine

The integration engine 3110 reads and writes data from various smart items 3120, processes the data, and furnishes the processed data to the higher-level applications 3130 in real time. Doing so in real time means that the data is processed as it is received and furnished as it is processed. The integration engine 3110 can also receive data from the higher-level applications 3130 and write the data to the smart items 3120.

Processing the data can include data filtering. For example, one application may only be interested in receiving UIDs and location data while another application may only be interested data collected from certain smart items. A separate filter can be provided for each application requesting data.

Processing the data can also include data aggregation. Data aggregation involves combining data together to produce higher-level data. For example, combining the UID of an item located within a truck with the temperature reading from the truck to produce a temperature reading for the item. Aggregating data can make the data more meaningful than if the data were treated individually. Aggregation can also involve accumulating real-time data into a batch and sending the batched data at pre-defined intervals instead of in real time. The data can be time-stamped with the date and time of collection.

The integration engine 3110 is configured to interface with different kinds of hardware interfaces that provide basic read and write functionality. The integration engine 3110 translates between hardware-specific data formats and a generic format, or, in some cases, application-specific formats. In this way, the integration engine 3110 hides the hardware specifics from the applications 3130.

FIG. 32 shows how multiple integration engines 3110 can be used to manage a large number of smart items. Each integration engine 3110 can be assigned to transfer data to and from particular locations (e.g., factories, loading docks, stores) where smart items are found. The applications 3130 can subscribe to one or more of the integration engines 3110. Each integration engine 3110 can be implemented as multiple integration engines 3110 that are nested. The output of one integration engine 3110 can be the input into a higher-level integration engine 3110.

FIG. 33 shows an exemplary implementation of an integration engine 3110. The integration engine 3110 manages all resources and objects involved in interacting with smart items and controls the overall process. The integration engine 3110 includes a control manager 3310, an interrogator agent 3320, a processing agent 3330, and a communication agent 3340. The components can be implemented using conventional programming technologies including component-based technologies such as Java, C# or C++ objects.

The control manager 3310 provides the programming interface between the integration engine 3110 and the applications 3130. The programming interface implements a generic (non-implementation-specific) communication interface to which various adapters can be plugged-in. The adapters translate between a specific communication interface (e.g., RPC, COM, CORBA, JMS, HTTP) and the generic communication interface.

The control manager 3310 receives rules from the applications 3130, interprets the rules, receives client commands, interprets client commands, and instantiates the appropriate interrogator agents, processing agents, and communication agents to execute the rules. The rules can define or constrain various aspects of the behavior of the interrogator agents, processing agents, and communication agents. For example, the rules can define what data to furnish to an application (e.g., only furnish data if it is UID or location data), what data to write to the hardware (e.g., if the temperature of the truck drops below a pre-determined threshold, then write a command that turns the air conditioning off), or when to furnish the data (e.g., once a day). Rules can also define how to combine collected data to generate higher-level data (e.g., combine the UID of an item located within a truck with the temperature of the truck to determine whether the item is overheated). The control manager 310 interprets and applies the rules as data is received.

In one implementation, the control manager 3310 contains or is coupled in some way to a rules repository for storing the rules received from the applications and a rules engine for executing the stored rules. The rules received from the applications can be represented as UML (Unified Modeling Language) models, EJB (enterprise JavaBeans) beans, or XML (Extensible Markup Language) documents. If necessary, the control manager 310 converts the rules into an internal format used by the rules engine.

An interrogator agent 3320 is responsible for overall control over a single hardware device interface such as an RFID controller interface. An interrogator agent 3320 interfaces with a hardware interface, the control manager 3310, and a processing agent 3330. The interrogator agent 3320 receives data from the hardware interface. The interrogator agent 3320 can be configured according to the requirements of the hardware interface. For example, some hardware interfaces require asynchronous polling whereas other interfaces generate events or interrupts. The interrogator agent 3320 generally does not perform any processing on the collected data; instead, it simply forwards the data to a processing agent 3330 for processing.

A processing agent 3330 is responsible for data filtering, aggregation and transformation operations. The processing agent 3330 interacts with the control manager 3310 and an interrogator agent 3320.

To perform data filtering, the processing agent 3330 receives sensor data collected by one or more interrogator agents. The processing agent 3330 invokes the rules engine to determine whether any of the data satisfies the conditions specified in the rules. Any data that does not meet the conditions is not forwarded. The data that meets the conditions is forwarded to the communication agent 3340.

To perform data aggregation, the processing agent 3330 stores the received data in a buffer until it has received all the data required by a given rule.

The processing agent 3330 receives data in a hardware-specific format. The processing agent 3330 uses mapping tables to convert between the hardware-specific format and the generic format that the integration engine 3110 outputs to the applications 3130.

The data load can be shared among multiple processing agents. Some processing agents 3330 may only process data containing a certain kind of information, such as purchase order numbers, for example. In such cases, the interrogator agent 3320 determines the kind of information it has collected based on either the type of hardware (e.g., a bar code scanner emits bar code information) or metadata describing the data (e.g., as defined in the logical tag type described in reference to FIG. 34). Some processing agents 3330 may process complex data—data that is aggregated from the output of several processing agents 3330. The same processing agent or agents 3330 can serve applications that request the same kind of data.

A communication agent 3340 is responsible for furnishing data to the applications 3130 using either a push or pull model. An application can explicitly request a read or write operation be performed on the smart items 3120 (pull model), or an application can request to be notified when the integration framework receives data from the smart items 3120 (push model).

The communication agent 3340 receives processed data from one or more processing agents 3330 and furnishes the data to all subscribing applications 3130. The communication agent 3340 maintains a list of subscribing applications 3130 and their respective destination parameters. The communication agent 3340 can be a collection of communication agents 3340 with each communication agent implementing a specific communication interface or protocol (e.g., RPC, COM, CORBA, JMS or HTTP).

Instead of furnishing the processed data directly to the subscribing applications 3130, the communication agent 3340 can use an intermediary, e.g., an event router. The event router would appear on the list of subscribing applications. An event router is a service that routes messages (events) between software entities. The messages can be used to notify the message recipient about some occurrence or to send a query to the recipient. Examples of suitable event routers include the KnowNowÒ event router, available from KnowNow Incorporated of Mountain View, Calif., or the Elvin messaging service available from the Distributed Systems Technology Center of Queensland, Australia.

In one implementation, the communication agent 340 furnishes the data in the format of a data object (or collection of objects) that has methods that the external applications can invoke to retrieve the UID and additional item data. In another implementation, the data format is XML. The advantage of XML is that it is flexible, extensible, self-describing, and widely used for data exchange.

Hardware Interface

FIG. 34 is a block diagram of an exemplary hardware interface 3400. The hardware interface 3400 is software that enables higher-level software to interact with the underlying hardware. Currently, a wide range of RFID technologies are available from multiple vendors. Depending on the application scenario, a specific type of tag needs to be chosen (active/passive, read-only/rewritable and so on). Advantageously, the hardware interface is implemented using open standards so that it can be used with a variety of RFID technologies from a variety of vendors. The hardware interface can receive requests to read data from, or requests to write data to, the hardware device. The data from the hardware device can be sent to either an interrogator agent 3320 or a processing agent 3330.

The interface 3400 includes an abstraction layer, server 3410, that hides the details of the interrogator 3420. The server 3410 communicates with the interrogator 3420 through a hardware-dependent interface. At run time, a specific server 3410 instance is responsible for one and only one interrogator 3420. However, several applications can communicate with the same server 3410 instance simultaneously.

A server 3410 supports at least two different kinds of reading requests. A discrete reading request returns information on only the tags that can currently be read. A continuous reading request returns information on all tags that have been read and buffered since the previous reading request was made.

A server 3410 can accept data to be written. The data to be written can be data to be stored on a tag or can be control data that controls the behavior of the hardware. For example, a smart conveyer belt can receive control data that switches between a left belt and a right belt; a smart vending machine can receive control data that adjusts the price of an item or adjusts the temperature of the machine.

Additionally, a server 3410 makes the following functions available:

Initialize

This function initializes the interface 3400 for use. All hardware is initialized, as are necessary communication ports and software objects and processes. This is a generic initialization function. Hardware-specific details can be set in hardware-specific configuration files.

Terminate

This function terminates the use of the interface 3400. This is the inverse function to Initialize: All hardware is freed, communication ports are closed and all involved software objects and processes are terminated (unless they are in use by another process). This is a generic termination function. Hardware-specific details can be set in hardware-specific configuration files.

Detect Tags

This function detects whether and how many tags can currently be read.

Define Logical Tag Type

This function defines the logical tag type for a given tag. The logical tag type describes the organization of data on the tag. The exemplary electronic tag 3500 shown in FIG. 35 illustrates this. As shown, the user data on the tag consists physically of n 32-bit data blocks. Logically however, it has three named data fields: the article number ("ARTNR") 3510, a description of the article ("ARTDESC") 3520, and its price ("PRICE") 3530. As shown, the lengths as well as the starting addresses of the fields are not necessarily the same as the block lengths and starting addresses.

The logical tag type defines the name, starting address and length of each data field, its data type (in order to map the field easily to application data) and a description for each data field. The logical tag type also defines a location for storing a tag identifier. The logical tag type definition can be extended to include other information.

Get Logical Tag Type Description and Field Names

This function gets information about a logical tag type. This will generally be used to obtain the field names as well as the fields' lengths and data types.

Start/Stop Continuous Reading

This function starts or stops the continuous reading mode of operation.

Read Fields from Multiple Tags

This function reads data from specific fields of all tags that can be read at the time the function is performed. A parameter specifies whether a reading mode of discrete or continuous is requested. For continuous mode, the server will buffer the information of all tags read. Each call to the read function in continuous mode clears this buffer. However, a call in discrete mode does not clear the buffer.

Read Fields from a Specific Tag

This function is similar to the previous function. The difference is that only fields from a single tag with a specific tag ID are read. Multiple tags may need to be read in order to identify the tag having the specified tag ID.

Write Fields to Multiple Tags

This function writes the same data to specific fields of all tags that can be written at the time the function is performed. The fields are named and depend on the tag type defined for the tag. The same data is written to all tags. This function can be used for mass writing of tags, e.g., at the end of a production line.

Write Fields to a Specific Tag

This function writes data to specific fields of a specific tag in the field of operation of the tag reader-writer. The fields are named and depend on the current tag type. The tag written to is specified by its UID. Data is only written to the specified fields. All data in tag fields not specified in this operation are left unchanged.

Data fields can also be locked with any of the two writing functions as long as the hardware supports that functionality. A field can be written and locked at the same time, or a previously written field can just be locked without overwriting its data.

Hardware-Specific Calls

Some hardware might offer some functionality beyond the scope of this interface. In order for customers to be able to make use of that functionality, this function provides a mechanism to pass through hardware-specific calls directly from the application.

Error Handling

When a communication error occurs, the hardware device 3420 or the server 3410 tries to solve the problems by itself first, e.g., by retrying a certain operation a number of times. When that low-level error handling fails, the interface 3400 provides information about what went wrong so that the application can take appropriate action.

In addition to a generic error code that defines the type of error, a detailed description of the error is also provided. The interface 3400 recognizes at least the following types of error conditions:

(1) Interrogator not responding: Fail to initialize interrogator.

(2) Read errors: n tags detected, but only m were read correctly (m<n). Having no tags in the field is not an error condition.

(3) Write errors: Tag could not be written, either because no tags were in the radio field, or there was some specific writing problem, e.g., locked fields or general failure.

(4) No hardware support. Functions like data locking might not be supported by all hardware.

5. Compression, Filtering, and Encryption of Tracking Information

The following paragraphs describe an implementation where the tracking information is compressed, filtered, or encrypted before it is communicated from one enterprise to another. The implementation will be described in the context of a scenario involving a producer and a consumer. A producer or consumer can be a manufacturer, a distributor, or a retail establishment, or any other location or portion of a location, that deals with tagged items.

As shown in FIG. 43, a producer 4301 sends a shipment 4303 to a consumer 4302. The shipment 4303 includes several tagged items 4304 in a tagged container 4305. When the consumer 4302 receives the shipment 4303, the consumer's tag reader system 4306 reads the information from the container tags 4307 and the item tags 4308. In order to verify the shipment 103, the consumer 102 needs shipment content information 4309 from the producer 4301. This shipment information 4309 can include the UID of the container and the UIDs of all the items in the container. Other information associated with each item, such as the color of the item, can be packed with the UID of the item or stored externally to the tag. Through a communications network 4310, e.g., the Internet, the consumer 4302 can receive shipment information 4309 from the producer 4301 and can also send status update information to the producer 4301. The local ITS 4311 at the consumer's site retrieves information from the tag reader system 4306 and matches the tag information against the shipment information 4309.

As shown in FIG. 45, a method 4500 for communicating tracking information between a producer and a consumer can begin with a producer receiving a plurality of identification codes, each identification code uniquely identifying an associated item (4510).

The identification codes can be read from tags bound to the items. To make cross-enterprise object tracking possible, each tag carries a unique identification code for the associated item, for example, the electronic product code (ePC) 4500 shown in FIG. 46. An ePC 4500 is 96-bits, partitioned into an 8-bit header (bits 0-7) 4510 and three data fields: ePC Manager (bits 8-35) 4620, Object Class (bits 36-59) 4630, and Serial Number (bits 60-95) 4640. Each organization that can tag items has a unique code for the ePC Manager field. Each product category in an organization has a unique code in the Object Class field. Each individual item of a product has a unique code in Serial Number., UIDs other than ePCs may be used similarly.

The producer sorts the identification codes into one or more sets of identification codes (4520). Each set of identification codes can correspond to a particular type of item (e.g. all the basketballs from a given manufacturer).

For each set of identification codes, the producer recognizes a redundant portion of code that is common to each identification code in the set (4530). For example, as shown in FIG. 47, the ePCs for all basketballs from a given manufacturer contain a redundant portion 4701—specifically, the ePCs share the same ePC Manager and Object Class. This redundancy is inherent in the hierarchical structure of the ePC.

The producer creates a document containing the one or more sets of identification codes (4540). However, in such a document, the ePCs can account for a large percentage of the document size. For example, as shown in FIG. 47, a shipment document contains item-level information, including the ePC for every item shipped. When the number of items increases, the ePCs become a significant part of the document's size.

To reduce the size of the document, the producer 4301 organizes the document such that for each set of identification codes, the redundant portion of the code is listed once and each tag is listed with the redundant portion of the code omitted (4550). In this way, the hierarchical design of the ePC can be leveraged to compress the information associated with each ePC. For example, for all basketballs packaged and shipped to one location, there is no need to include the entire ePC of each basketball in the shipping document. Instead, as shown in FIG. 48, the shipment document can include just one entry for the ePC Manager and Object Class in an ePC prefix 4802, and just the Serial Numbers 4803 for each of the individual basketballs that are shipped.

A masking technique similar to method 4500 can be applied to other contexts besides shipping. For example, masking can be applied in the production context to reduce the size of production orders. In preparation for manufacturing a new line of items, a factory typically generates a production order which lists the ePC for each of the items. This is the case even when the header, ePCManager, and object class portions of each ePC are the same. By applying method 4500 to the production order, this redundancy can be eliminated and instead of listing the full ePCs for each item, the redundant portion can be omitted and only the serial number be listed.

Further reduction in the size of the document (shipping, production or otherwise) can be obtained by recognizing that when the serial numbers are sequential, it is not necessary to list the serial numbers for every item produced. Instead, as shown below, all that needs to be listed is the serial number for the first item created ("EPC_BASE") and the total quantity of items produced (e.g., 1000). Additional information for each item, such as the color of the item, can be listed individually for each item as shown below.

```
<PRODUCTION_ORDER ID=1234566>
  <ITEM_LIST QUANTITY=1000 EPC_PREFIX=01.000A89.00016F>
    <EPC_BASE>00168123</EPC_BASE>
    <ITEM>
      <COLOR> RED </COLOR>
    </ITEM>
    <ITEM>
      <COLOR> BLUE </COLOR>
    </ITEM>
    <ITEM>
      <COLOR> RED </COLOR>
    </ITEM>
  </ITEM_LIST>
</PRODUCTION_ORDER>
```

Along a supply chain, there will generally be items that are tagged and items that are not tagged. Furthermore, only some types of items, such as pallets or packages, may be tagged with RFIDs. Additionally, each enterprise may tag items. For example, a transportation company can tag its shipment packages to automate its own logistic processes. Thus, there may be RFID tags at the item, the package, the pallet, and the container level, and these tags may be from different enterprises. However, a simple reader/interrogator cannot distinguish, for example, a container of items from an item. As a result, all UIDs that are read must be reported to a central system and filtered. This process is inefficient and very burdensome to a system that must handle millions of reports in a day.

The ePC manager for an enterprise controls the assignment of object class and serial numbers. The enterprise may define its own schema for physical objects that serve as accessories to the items produced by the enterprise. For example, pallets and packages produced by manufactures may or may not have their own ePC tags. However, within the context of a transportation company, there are containers for the actual items shipped. The process of transferring shipments from one dock to another is expedited by checking only the pallet or package, not the entire contents of the pallet or package. This approach requires that the transportation company tag the containers with its own ePC.

Readers can be configured to acquire only a certain type of ePC pattern. For example, readers may be configured to register only containers that start with character '1' in the object class portion of the ePC. The actual XML filtering schema would look like:

<Container_Class>01.1234566.1XXXXX </Container_Class>

In this example, the Xs are wildcards within the string of characters that form the ePC; the reader will accept any data at these positions. Configuring a reader in this way allows the reader to filter the ePCs that it reads, and check only the container type that is indicated in the schema. Thus, filtering can reduce the messages sent from the reader to the monitoring application or process, such as a shipment confirmation process.

FIG. 49 shows a method 4900 for filtering tracking information. Filtering can occur by readers or reader systems at various stages within the delivery process (i.e., by various consumers) and also at various levels within a particular consumer. For example, as described above, filtering can occur at the tag-reader-level. Alternatively, or additionally, a consumer's ITS can also filter the data it receives from the tag readers.

Identification codes associated with a plurality of items, including individual items and containers of items, are retrieved (4910). Each identification code (e.g., ePC) is a string of characters that uniquely identifies the associated item. The identification codes can be retrieved from various sources such as from a tag reader, from a shipment document, or from an ITS (shared or local).

A character is located within each identification code that indicates whether the item is an individual item or a container of items (4920). As described above, the containers can be distinguished from individual items in that containers have a "1" as the first character of the object class portion of the code; however, other characters and character positions can be used. Based on the located character, a determination is made as to whether the identification code corresponds to an individual item or to a container (4930).

When such a determination is made at the tag-reader level, the tag reader can distinguish individual items from containers of items, and use this distinction to filter out reads that are not relevant to the recipient of the read information. For example, if the recipient is a shipping company, it may only want to know the tag information for each container of items, but not for the items themselves. In such a case, the reader itself or a component at a high level in the system can filter out the codes for individual items and only send the tag information pertaining to containers to the recipient.

Controlling Access to Tracking Information

In a cross-enterprise computing environment, the tracking information can be consumed by multiple consumers. However, the producer may not necessarily want all consumers to share the same degree of access. For example, the manufacturer may record information about a shipment, such as "responsible person" or "quality grade", which some consumers (e.g., customs offices) are authorized to access, but which other consumers (e.g., retailers) are not authorized to access.

In one implementation, access to tracking information is controlled by providing the consumer with only a portion of the document. For example, a shipping company may only need to know the total quantity of goods shipped, but the shipping company may not need to know (or be authorized to know) other attributes of the goods (e.g., color, price).

However, it can be more efficient simply to send the same encoded document to all consumers. Thus, an alternate implementation provides the same document to all consumers, but in an encoded format. Then each consumer is separately provided with a selective means for decoding only a portion of the document. The encoding and decoding can be completely transparent to external systems 4312, e.g., an ERP system. In other words, the input and output of the tracking system can be a plain unencoded document.

As shown in FIG. 50, in performing a method 5000 for controlling access to tracking information, a producer creates tracking information for a collection of items, the tracking information representing each of the items as one or more attributes and optional corresponding values (5010). The producer encodes the tracking information by encoding each instance of each distinct attribute in the tracking information with its corresponding distinct coding scheme (5020). The producer sends the encoded tracking information to a recipient (5030), determines which attributes the recipient is authorized to access (5040), and provides the recipient with a subset of the coding schemes (5050), the subset including only coding schemes for attributes that the recipient is authorized to access.

Method 5000 can be performed at various points during the tracking process, such as before the tracking information is stored on a tag or before the tracking information is deposited in a shared ITS. Method 5000 can be performed whenever tracking information is being released and the sender desires to control access to the tracking information.

As shown in FIG. 51, in performing a method 5100 for accessing tracking information, a consumer receives encoded tracking information for a collection of items, the tracking information representing each of the items as one or more attributes and optional corresponding values, the tracking information encoded by encoding each instance of each distinct attribute in the tracking information with its corresponding distinct coding scheme (5110). The consumer also receives a subset of the coding schemes, the subset including only coding schemes for attributes that the recipient is authorized to access (5120). Finally, the consumer decodes the attributes that the recipient is authorized to access (5130).

The tracking information can be stored in an XML document as part of a tag associated with a physical object. Through a reader, a consumer can retrieve the XML document from the tag. Alternatively, the consumer can also retrieve an XML document from another location, for example, from a shared ITS or another computing system.

A Document Type Definition (DTD) or an XML schema defines the metadata of an XML document. A DTD can be included in an XML document or stored separately. For example, a DTD called Product, shown in the following table, the attribute fields of ProductType, ProductID, Version, Vendor, SalePrice, ProducePlace, ProduceTime, ExpireTime, ResponsiblePerson, QualityGrade, and Weight:

```
<?xml version="1.0" encoding="UTF-8"?>
    <!ELEMENT Product (ProductType, ProductID, Version, Vendor,
SalePrice, ProducePlace, ProduceTime, ExpireTime, ResponsiblePerson,
QualityGrade)>
    <!ELEMENT ProductType (#PCDATA)>
    <!ELEMENT ProductID (#PCDATA)>
    <!ELEMENT Version (#PCDATA)>
    <!ELEMENT Vendor (#PCDATA)>
    <!ELEMENT SalePrice (#PCDATA)>
    <!ELEMENT ProducePlace (#PCDATA)>
    <!ELEMENT ProduceTime (#PCDATA)>
    <!ELEMENT ExpireTime (#PCDATA)>
    <!ELEMENT ResponsiblePerson (#PCDATA)>
    <!ELEMENT QualityGrade (#PCDATA)>
    <!ELEMENT ProductSet (Product+)>
```

An XML document based on this DTD file is shown in the following table:

```
<?xml version="1.0" encoding="UTF-8">
<!DOCTYPE ProductSet SYSTEM "ProductSet.dtd">
<ProductSet>
    <Product>
        <ProductType>XXXX</ProductType>
        <ProductID>45EF76345</ProductID>
        <Version >E3DF67</Version>
        <Vendor>AAA</ Vendor>
        <SalePrice>1988-12-28</SalePrice>
        <ProducePlace>621</ProducePlace>
        <ProduceTime>2000-12-28</ProduceTime>
        <ExpireTime>2002-12-28</ExpireTime>
        <ResponsiblePerson>Kelly De</ResponsiblePerson>
        <QualityGrade>6</QualityGrade>
    </ Product >
    < Product >
        <ProductType>XXXY</ProductType>
        <ProductID>45E003123</ProductID>
        <Version >9FD56</Version>
        <Vendor>BBB</Vendor>
        <SalePrice>3.4</SalePrice>
        <ProducePlace>621</ProducePlace>
        <ProduceTime>2000-02-28</ProduceTime>
        <ExpireTime>2002-02-28</ExpireTime>
        <ResponsiblePerson>Kevin Smith</ResponsiblePerson>
        <QualityGrade>8</QualityGrade>
    </ Product >
</ ProductSet >
```

FIG. 52 shows a system of documents, index tables, and encoded documents used to communicate tracking information in a network 5240 with tagged items 5245. A producer 4301 uses an index table 5230 to convert a Producer XML document 5210 to an encoded XML document 5215. The index table can also be used to convert a producer DTD file 5220 to an encoded DTD file 5225. The consumer receives the encoded XML or encoded DTD file 5260/5270 from the producer over the network. The consumer uses a destination index table to convert the encoded XML document to a consumer XML document 5265, or the encoded DTD file to a consumer DTD file 5275. The consumer uses the consumer XML document or the consumer DTD file.

The index table 5230 is used to generate XML documents on the producer side. An index table relates tag names to index values. Each attribute field has a corresponding tag name that describes the attribute. Optionally, each attribute field also has a corresponding value. The tag name is generally descriptive and the index is a coding of the tag name. The coding should selected so as be efficient for the anticipated number of tags. An index table for handling the ProductSet XML document discussed above could be as follows:

| Tag Name | Index |
|---|---|
| Product | 1 |
| ProductType | 2 |
| ProductID | 3 |
| Version | 4 |
| Vendor | 5 |
| SalePrice | 6 |
| ProducePlace | 7 |
| ProduceTime | 8 |
| ExpireTime | 9 |
| ResponsiblePerson | 10 |
| QualityGrade | 11 |
| ProductSet | 12 |

The index values in the index table can be arbitrary, thereby making the encoded XML document hard to interpret without an index table.

Based on the index table, an XML document is transformed into an intermediate data document referred to as an Encoded XML Document 5215. An encoded XML Document corresponding to the XML document above, produced with the Index Table above, is:

```
<?xml version="1.0" encoding="UTF-8">
<!DOCTYPE 12 SYSTEM "12.dtd">
<12>
    <1>
        <2>XXXX</2>
        <3>45EF76345</3>
        <4>E3DF67</4>
        <5>AAA</5>
        <6>1988-12-28</6>
        <7>621</7>
        <8>2000-12-28</8>
        <9>2002-12-28</9>
        <10>Kelly De</10>
        <11>6</11>
    </1>
    <1>
        <2>XXXY</2>
        <3>45E003123</3>
        <4>9FD56</4>
        <5>BBB</5>
        <6>3.4</6>
        <7>621</7>
        <8>2000-02-28</8>
        <9>2002-02-28</9>
        <10>Kevin Smith</10>
        <11>8</11>
    </1>
</12>
```

Also, an encoded DTD file is generated based on the original DTD file. An encoded DTD file corresponding the DTD file shown previously and produced with the index table shown previously, is:

```
<?xml version="1.0" encoding="UTF-8"?>
    <!ELEMENT 1 (2, 3, 4, 5, 6, 7, 8, 9, 10, 11)>
    <!ELEMENT 1 (#PCDATA)>
    <!ELEMENT 2 (#PCDATA)>
    <!ELEMENT 3 (#PCDATA)>
    <!ELEMENT 4 (#PCDATA)>
    <!ELEMENT 5 (#PCDATA)>
    <!ELEMENT 6 (#PCDATA)>
    <!ELEMENT 7 (#PCDATA)>
    <!ELEMENT 8 (#PCDATA)>
    <!ELEMENT 9 (#PCDATA)>
```

-continued

```
<!ELEMENT 10 (#PCDATA)>
<!ELEMENT 11 (#PCDATA)>
<!ELEMENT 12 (1+)>
```

When the consumer decodes the document, the consumer can change the tag names to better correspond with consumer's own naming conventions.

In addition to controlling access, a further advantage of encoding the information is that the encoded tag names take up less space than the unencoded tag names, which are generally descriptive and can be quite long. The index values can be chosen to be compact such as in the simple numerical indexing scheme illustrated above.

Tags have limited memory or space. Thus, by using compact index values, more tracking information (e.g., attribute fields) can be included in the tag. Similarly, when the tracking information is being communicated across a network, the encoded information can be transmitted using less bandwidth than the unencoded version.

FIG. 53 shows a method for checking that the appropriate index table is used to create an encoded XML document. The system first checks to see if the index table needs updating (5310). If not, an encoded XML document or encoded DTD file is created with the existing index table (5320). If the index table need updating, a new index table is created and then used to create the encoded XML document or encoded DTD file (5330).

The encoded XML document is transformed over a network or stored in a smart tag associated with a physical object. On the consumer side, a destination index table is used to decode the document. As for the index table and as shown in the following example, the destination index table relates tag names to index values:

| Tag Name | Index |
|---|---|
| Product | 1 |
| ProductType | 2 |
| ProductIdentification | 3 |
| VersionNumber | 4 |
| VendorName | 5 |
| ProduceTime | 8 |
| ExpireTime | 9 |
| ProductSet | 12 |

All the indexes in the destination index table must appear in the corresponding source index table, which was used to create the encoded document. However, all the indexes in the index table may not appear in the corresponding destination index table. The consumer of the XML document receives the tag names and indexes for only those attribute fields that the producer authorizes the consumer to share. For example, if the XML document is created by a manufacturer and the consumer is a retailer, and the manufacturer does not want the retailer to see the attribute fields called ResponsiblePerson and QualityGrade, then these indexes do not appear in the destination index table of the retailer.

The tag names associated with a particular index in the destination index table and its corresponding index table can be different. Therefore, the consumer can modify the tag names in order to make them consistent with its applications. For example, the consumer can replace ProductID with ProductIdentification, VersionNumber with VersionNumber, and VendorName with Vendor, as shown above. However the meaning of these tags in their associated applications should be the same.

Based on the destination index table and the encoded DTD file shown above, the consumer will see the following DTD file:

```
<?xml version="1.0" encoding="UTF-8"?>
<!DOCTYPE ProductSet SYSTEM "ProductSet.dtd">
<!ELEMENT Product (ProductType, ProductIdentification,
    VersionNumber, VendorName, SalePrice,
        ProducePlace, ProduceTime, ExpireTime)>
<!ELEMENT ProductType (#PCDATA)>
<!ELEMENT ProductIdentification (#PCDATA)>
<!ELEMENT VersionNumber (#PCDATA)>
<!ELEMENT VendorName (#PCDATA)>
<!ELEMENT SalePrice (#PCDATA)>
<!ELEMENT ProducePlace (#PCDATA)>
<!ELEMENT ProduceTime (#PCDATA)>
<!ELEMENT ExpireTime (#PCDATA)>
    <!ELEMENT ProductSet (Product+)>
```

Based on the destination index table and the encoded XML document shown above, the consumer will see the following XML document:

```
<?xml version="1.0" encoding="UTF-8">
<!DOCTYPE ProductSet SYSTEM "ProductSet.dtd">
<ProductSet>
    <Product>
        <ProductType>XXXX</ProductType>
        <ProductIdentification>45EF76345</ProductIdentification >
        <VersionNumber>E3DF67</VersionNumber>
        <VendorName>AAA</VendorName>
        <SalePrice>1988-12-28</SalePrice>
        <ProducePlace>621</ProducePlace>
        <ProduceTime>2000-12-28</ProduceTime>
        <ExpireTime>2002-12-28</ExpireTime>
    </ Product >
    < Product >
        <ProductType>XXXY</ProductType>
        <ProductIdentification >45E003123</ProductIdentification>
        <VersionNumber>9FD56</VersionNumber>
        <VendorName>BBB</VendorName>
        <SalePrice>3.4</SalePrice>
        <ProducePlace>621</ProducePlace>
        <ProduceTime>2000-02-28</ProduceTime>
        <ExpireTime>2002-02-28</ExpireTime>
    </ Product >
</ ProductSet >
```

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments and scenarios. Other embodiments are within the scope of the claims. For example, the steps of the invention can be performed in a different order and still achieve desirable results. The system is flexible and offers many business methods for tracking items. In one method, one or more customers subscribe to the system, which is provided by a service provider who distributes the services over a network such as the Internet. In this case, the customers need not procure components or the entire system, thereby saving capital costs. Alternatively, the customers procure components of or the entire system, thereby saving operational cost. Alternatively, the system can support any combination of the described business methods. For example, some customer can subscribe to the system and some customer can procure components or the entire system.

Other scenarios are within the scope of the claims. The system supports the development of a range of new and enhanced applications across industries on a local to global scale. Other applications of the system includes supply chain management, asset tracking management, security and access control, transportation, toll collection, point of sales applications, and baggage handling. These examples are further described below.

Supply Chain Management

RFID systems are ideally suited for the identification of high-unit high-value products moving through an assembly process (such as automobile or agricultural equipment production). RFID systems also offer the durability essential for permanent identification of product carriers such as boxes, crates, and pallets. Other applications within supply chain management include work-in-progress tracking and parcel delivery.

Asset Tracking and Management

Asset tracking and management applications include those for monitoring the flow of equipment, people, and documents within a space such as a building, yard, or terminal, for example, to tighten control over assets and keep good track of items, including individuals. Specific applications within asset management include: Records/document tracking, people tracking, yard management, and equipment tracking.

Security and Access Control

The movement and use of valuable equipment and personnel resources can be monitored through transponders attached to equipment or carried by the equipment or personnel. Transponders can also be embedded in credit card size security badges. Home security call systems and building access are two examples of security and access control applications.

Transportation

Transponders can be attached to vehicles (e.g., aircraft, rail cars, trucks) and can contain important information about the vehicle and its contents. Transportation applications include aircraft identification, rail car and shipping container tracking, public transportation ticketing, and weigh station applications.

Toll Collection

Toll collection applications involve attaching a transponder to a vehicle. The transponder transmits a code, which identifies a prepaid account, to a reader which automatically deducts the toll from the prepaid account.

Point of Sale

These applications include electronic surveillance of retail items, forgery prevention, and sales transactions and usually involve tagging individual retail items with low cost transponders, which are essentially active tags.

Baggage Handling

In a baggage handling application, airline luggage is tagged with RFID transponders such as smart labels to allow airline baggage handling operations to track baggage from the moment a traveler checks into an airport to the moment the traveler reaches his final destination.

What is claimed is:

1. A method of receiving identification information identifying a physical object, the method comprising:
receiving at a generic user interface component, identification information from an identification capture system that obtains the identification information from a tracking component associated with a physical object, the identification information identifying the physical object to which the tracking component has been associated, wherein the identification information is encoded in a first format compatible with an input device for the identification capture system and wherein the generic user interface component lacks functionality to format input for subsequent insertion in one or more data fields of a virtual representation of the physical object; and transmitting the received identification information to a universal decoding module that includes logic for reformatting identification information from a plurality of different types of identification capture systems, wherein the universal decoding module is configured to:
  determine the virtual representation of the physical object, the virtual representation being predefined by a process flow to receive the identification information, wherein the virtual representation has at least one data field to store the identification information;
  identify a second format used for the at least one data field and;
  convert the first format compatible with the input device for the identification capture system into the second format of the at least one data field.

2. The method of claim 1, wherein the input device of the identification capture system comprises a barcode scanner.

3. The method of claim 2, wherein the tracking component comprises a bar code.

4. The method of claim 1, where in the input device of the identification capture system comprises a radio frequency identification (RFID) reader.

5. The method of claim 4, wherein the tracking component comprises an RFID tag.

6. The method of claim 5, wherein the RFID tag is a smart label.

7. The method of claim 1, wherein the identification capture system comprises a voice recognition system and the tracking component comprises a human readable label that a worker can read into the voice recognition system.

8. The method of claim 1, further comprising linking portions of the identification information to the corresponding data fields of the virtual representation when the virtual representation includes more than one data field.

9. The method of claim 1, wherein the conversion identifies a data format with the input device of the identification capture system using header information included in the received identification information.

10. The method of claim 9, wherein the conversion further comprises using the identified data format and an index table comprising format conversions to determine how to convert the first format compatible with the input device into the second format of the at least one data field.

11. The method of claim 1, wherein the conversion is performed by one of multiple tag readers each configured to perform different conversions.

12. The method of claim 11, wherein the conversion further comprises using header information included in the identification information compatible with the input device to identify a tag reader configured to read the identification information.

13. The method of claim 1, wherein the physical object identified by the identification information is a location, stock, or storage receptacles used to contain or move the stock.

14. The method of claim 1, further comprising storing previously received identification information that identifies events and the previously received corresponding identification information that identifies a virtual circumstance for the event.

15. The method of claim 14, further comprising verifying whether the event corresponds with the virtual circumstances by comparing the identification information received from the identification capture system with the previously stored identification information corresponding with the virtual circumstances, wherein the physical object specified by the identification information received from the identification capture system comprises the virtual circumstance, the event, or both.

16. The method of claim 1, wherein the generic user interface component comprises a tagging component.

17. The method of claim 1, wherein the universal decoding module comprises an object interface component.

18. A computer-implemented method for transmitting identification information identifying a physical object, the method comprising:
  determining a data field specified by a process flow, the data field having one or more fields to store an identification information to be encoded in a tracking component using an object interface component, the identification information to identify a physical object that is associated with the tracking component;
  receiving, at a generic user interface component that lacks functionality to format input for subsequent insertion in data fields of a virtual representation of the physical object, the identification information in a first format compatible with one or more data field fields, and identifying a second format used by the object interface component to encode the identification information in the tracking component; and
  converting the first format compatible with the one or more data field fields into the second format used by a universal decoding module, and forwarding the encoded identification information to the universal decoding module for encoding in the tracking component.

19. The method of claim 18, wherein the identification information is encoded into a bar code format or an RFID format.

20. A system for receiving and transmitting identification information identifying a physical object, the system comprising:
  an identification capture system to receive identification information encoded in a tracking component associated with a physical object and to transmit the identification information to the tracking component, the identification information identifying the physical object to which the tracking component is associated;
  a universal decoding module to receive the identification information from a data field from multiple data fields, the data field having one or more fields to store the identification information in a first format compatible with the data field fields, and to encode the first format into a predetermined second format used by the identification capture system; and
  a context-aware intelligence component to determine the data field from the multiple data fields to receive the identification information encoded in the second format from the identification capture system, and to decode the second format into the first format used by the one or more fields of the determined data field.

* * * * *